United States Patent
Eshel et al.

(10) Patent No.: US 12,379,503 B2
(45) Date of Patent: *Aug. 5, 2025

(54) LIDAR SYSTEM WITH VARIABLE RESOLUTION MULTI-BEAM SCANNING

(71) Applicant: INNOVIZ TECHNOLOGIES LTD., Rosh Ha'Ayin (IL)

(72) Inventors: Ronen Eshel, Herzliya (IL); Nir Goren, Herut (IL)

(73) Assignee: Innoviz Technologies Ltd., Rosh HaAyin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,247

(22) Filed: Apr. 2, 2024

(65) Prior Publication Data

US 2024/0264313 A1    Aug. 8, 2024

Related U.S. Application Data

(63) Continuation of application No. 17/686,499, filed on Mar. 4, 2022, now Pat. No. 11,971,488, which is a
(Continued)

(51) Int. Cl.
*G01S 17/931* (2020.01)
*G01S 7/481* (2006.01)
(Continued)

(52) U.S. Cl.
CPC .......... *G01S 17/931* (2020.01); *G01S 7/4812* (2013.01); *G01S 7/4814* (2013.01); *G01S 7/4815* (2013.01);
(Continued)

(58) Field of Classification Search
CPC .... G01S 17/931; G01S 7/4812; G01S 7/4814; G01S 7/4815; G01S 7/4817;
(Continued)

(56) References Cited

U.S. PATENT DOCUMENTS

| 7,209,271 B2 * | 4/2007 | Lewis | G02B 27/017 |
| | | | 235/462.32 |
| 7,544,945 B2 | 6/2009 | Tan et al. | |

(Continued)

FOREIGN PATENT DOCUMENTS

| JP | 2020126065 A | 8/2020 |
| KR | 1020160146820 A | 12/2016 |

OTHER PUBLICATIONS

Office Action, dated Jul. 27, 2023, issued in U.S. Appl. No. 17/668,045 (19 pages).
(Continued)

*Primary Examiner* — Yuqing Xiao
*Assistant Examiner* — Jempson Noel

(57) ABSTRACT

A LIDAR system may include a laser emission unit configured to generate a plurality of laser beams. The LIDAR system may also include an optical system configured to transmit the plurality of laser beams from the laser emission unit to a scanning unit. The scanning unit may be configured to project the plurality of laser beams toward a field of view of the LIDAR system to simultaneously scan the field of view along a plurality of scan lines traversing the field of view.

25 Claims, 46 Drawing Sheets

Related U.S. Application Data continuation of application No. PCT/IB2021/000698, filed on Sep. 14, 2021, which is a continuation-in-part of application No. PCT/IB2021/000581, filed on Aug. 24, 2021.

(60) Provisional application No. 63/173,426, filed on Apr. 11, 2021, provisional application No. 63/081,646, filed on Sep. 22, 2020, provisional application No. 63/081,024, filed on Sep. 21, 2020, provisional application No. 63/077,933, filed on Sep. 14, 2020, provisional application No. 63/069,403, filed on Aug. 24, 2020.

(51) Int. Cl.
  *G01S 7/4865* (2020.01)
  *G01S 7/487* (2006.01)
  *G01S 17/42* (2006.01)
  *G01S 17/894* (2020.01)

(52) U.S. Cl.
  CPC .......... *G01S 7/4817* (2013.01); *G01S 7/4865* (2013.01); *G01S 7/4873* (2013.01); *G01S 17/42* (2013.01); *G01S 17/894* (2020.01)

(58) Field of Classification Search
  CPC ...... G01S 7/4865; G01S 7/4873; G01S 17/42; G01S 17/894; G01S 17/89
  See application file for complete search history.

(56) References Cited

U.S. PATENT DOCUMENTS

| | | | | |
|---|---|---|---|---|
| 7,857,460 | B2* | 12/2010 | Klosowiak | G02B 27/642 353/69 |
| 9,601,314 | B2* | 3/2017 | Ninomiya | H01L 21/26586 |
| 10,295,671 | B2* | 5/2019 | Gazit | G01S 17/931 |
| 10,302,749 | B2 | 5/2019 | Droz et al. | |
| 10,983,197 | B1 | 4/2021 | Zhu et al. | |
| 11,137,498 | B2 | 10/2021 | Honkanen et al. | |
| 11,194,048 | B1 | 12/2021 | Burbank et al. | |
| 11,353,559 | B2 | 6/2022 | Campbell et al. | |
| 2007/0181810 | A1 | 8/2007 | Tan et al. | |
| 2008/0170282 | A1 | 7/2008 | Amada et al. | |
| 2010/0046953 | A1 | 2/2010 | Shaw | |
| 2011/0298820 | A1 | 12/2011 | Hajjar | |
| 2016/0071416 | A1 | 3/2016 | Kim et al. | |
| 2017/0289524 | A1 | 10/2017 | Pacala et al. | |
| 2017/0307736 | A1 | 10/2017 | Donovan | |
| 2018/0062345 | A1* | 3/2018 | Bills | G01S 7/4815 |
| 2018/0081037 | A1 | 3/2018 | Medina et al. | |
| 2018/0081038 | A1 | 3/2018 | Medina et al. | |
| 2018/0100928 | A1 | 4/2018 | Keilaf et al. | |
| 2018/0113200 | A1* | 4/2018 | Steinberg | G01S 7/4918 |
| 2018/0113216 | A1 | 4/2018 | Kremer et al. | |
| 2018/0259623 | A1* | 9/2018 | Donovan | G01S 7/497 |
| 2018/0284224 | A1 | 10/2018 | Weed et al. | |
| 2018/0284237 | A1 | 10/2018 | Campbell et al. | |
| 2018/0284286 | A1 | 10/2018 | Eichenholz et al. | |
| 2019/0107607 | A1 | 4/2019 | Danzinger | |
| 2019/0265336 | A1 | 8/2019 | Zhang et al. | |
| 2019/0310375 | A1 | 10/2019 | Finkelstein et al. | |
| 2019/0331772 | A1* | 10/2019 | Qiu | G02B 26/0816 |
| 2020/0025929 | A1 | 4/2020 | Kirillov | |
| 2020/0103506 | A1 | 4/2020 | Kamil et al. | |
| 2020/0116832 | A1* | 4/2020 | Singer | G01S 7/4815 |
| 2020/0166647 | A1 | 5/2020 | Crouch et al. | |
| 2020/0200877 | A1* | 6/2020 | Yoo | G01S 7/4817 |
| 2020/0309917 | A1 | 10/2020 | Kudla et al. | |
| 2020/0348418 | A1 | 11/2020 | Sutton et al. | |
| 2021/0356601 | A1 | 11/2021 | Burbank et al. | |

OTHER PUBLICATIONS

Office Action, dated Apr. 6, 2023, issued in U.S. Appl. No. 17/668,045 (19 pages).

Office Action, dated Nov. 18, 2022, issued in U.S. Appl. No. 17/668,045.

Office Action, dated Jul. 22, 2022, issued in U.S. Appl. No. 17/668,045.

Partial Search Report and Provisional Opinion, dated Feb. 14, 2022, issued in International Application No. PCT/IB2021/000698 (9 pages).

* cited by examiner

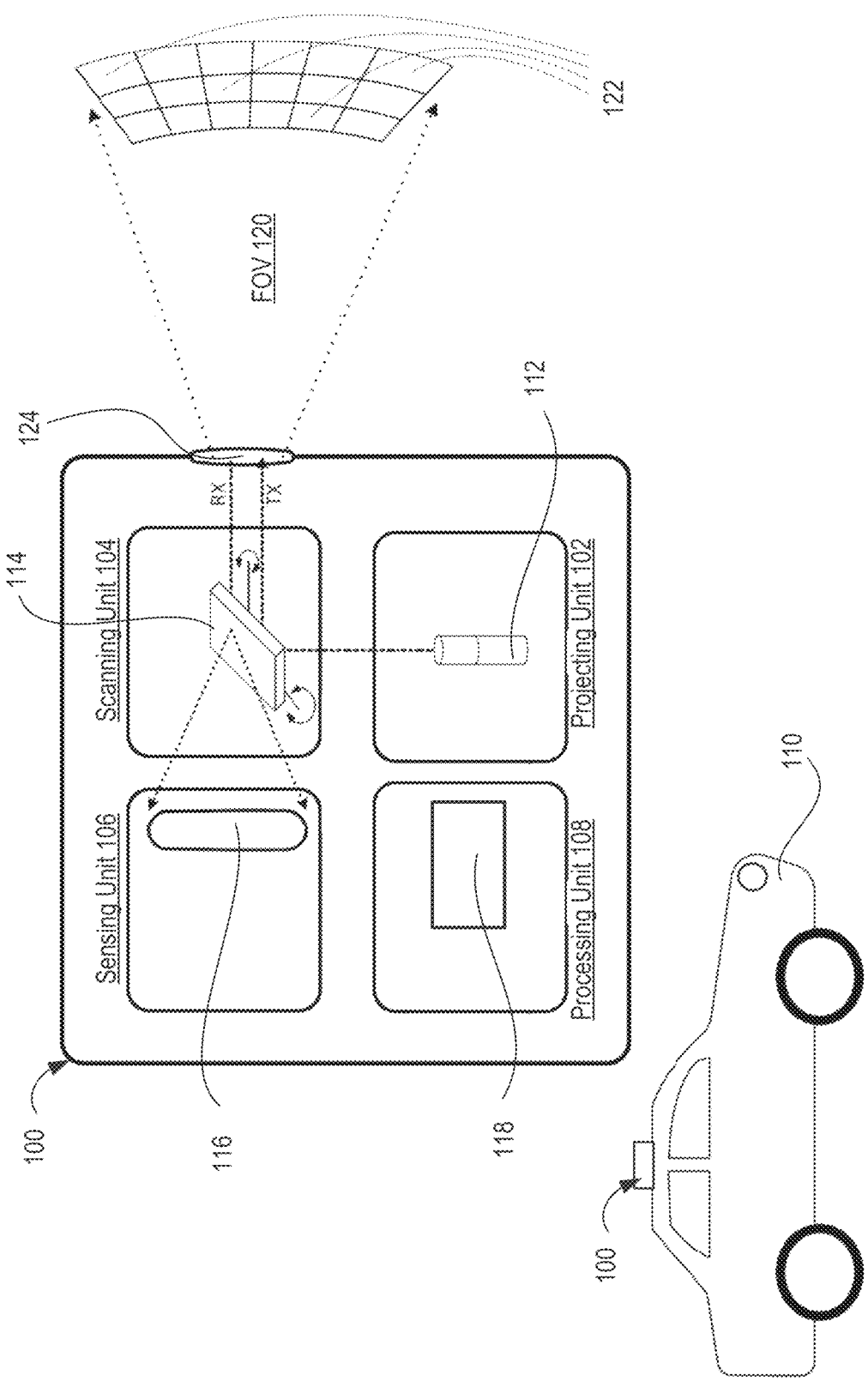

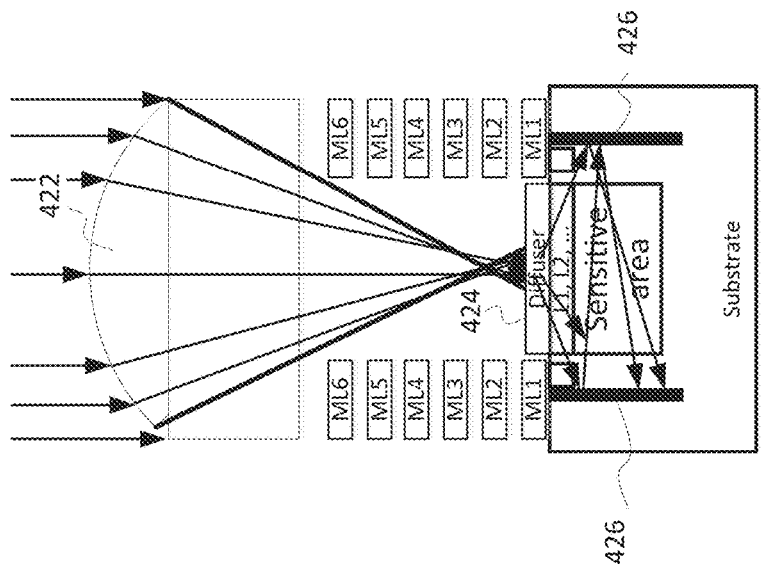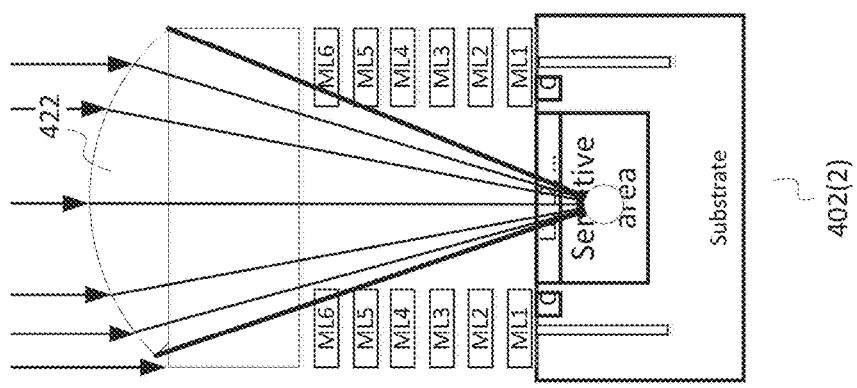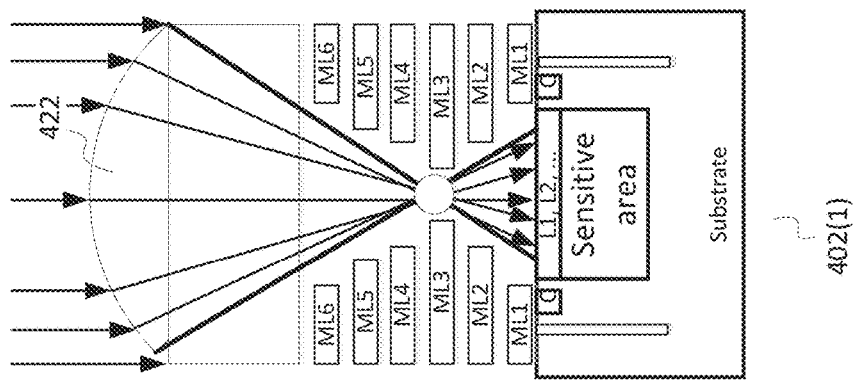
Fig. 4E

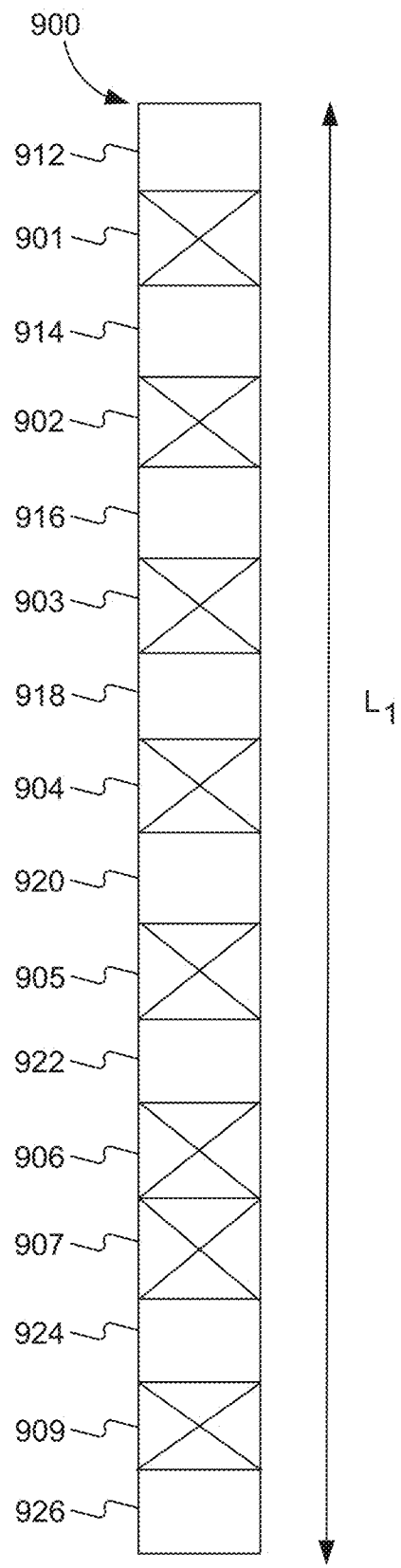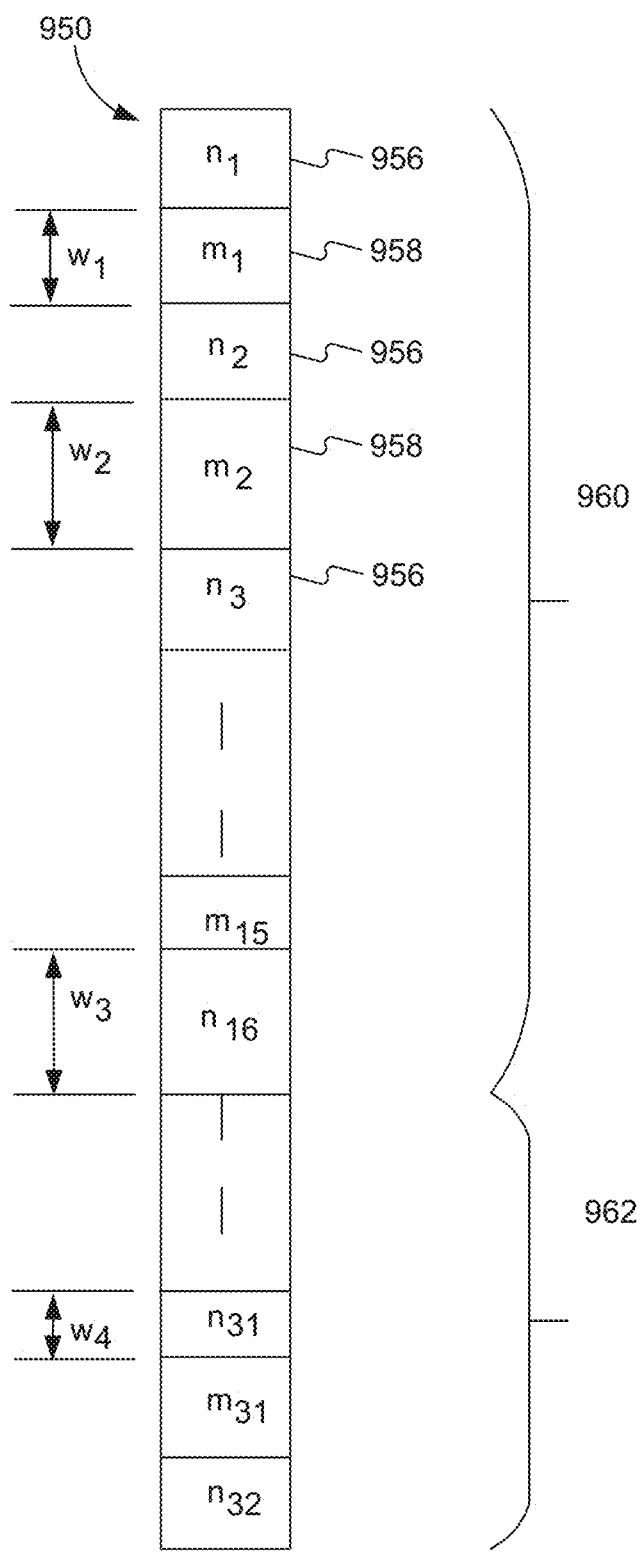
FIG. 9A
FIG. 9B

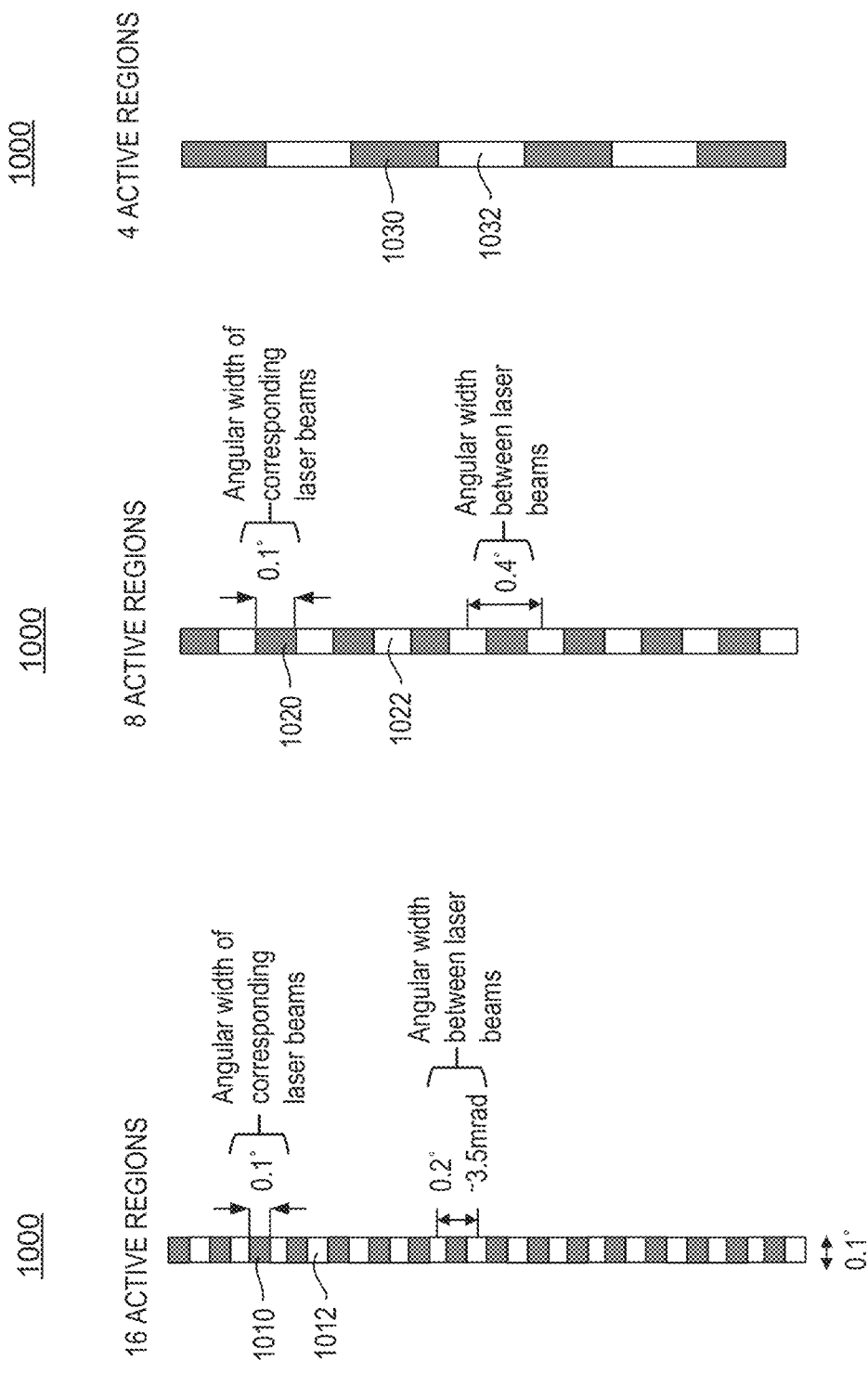

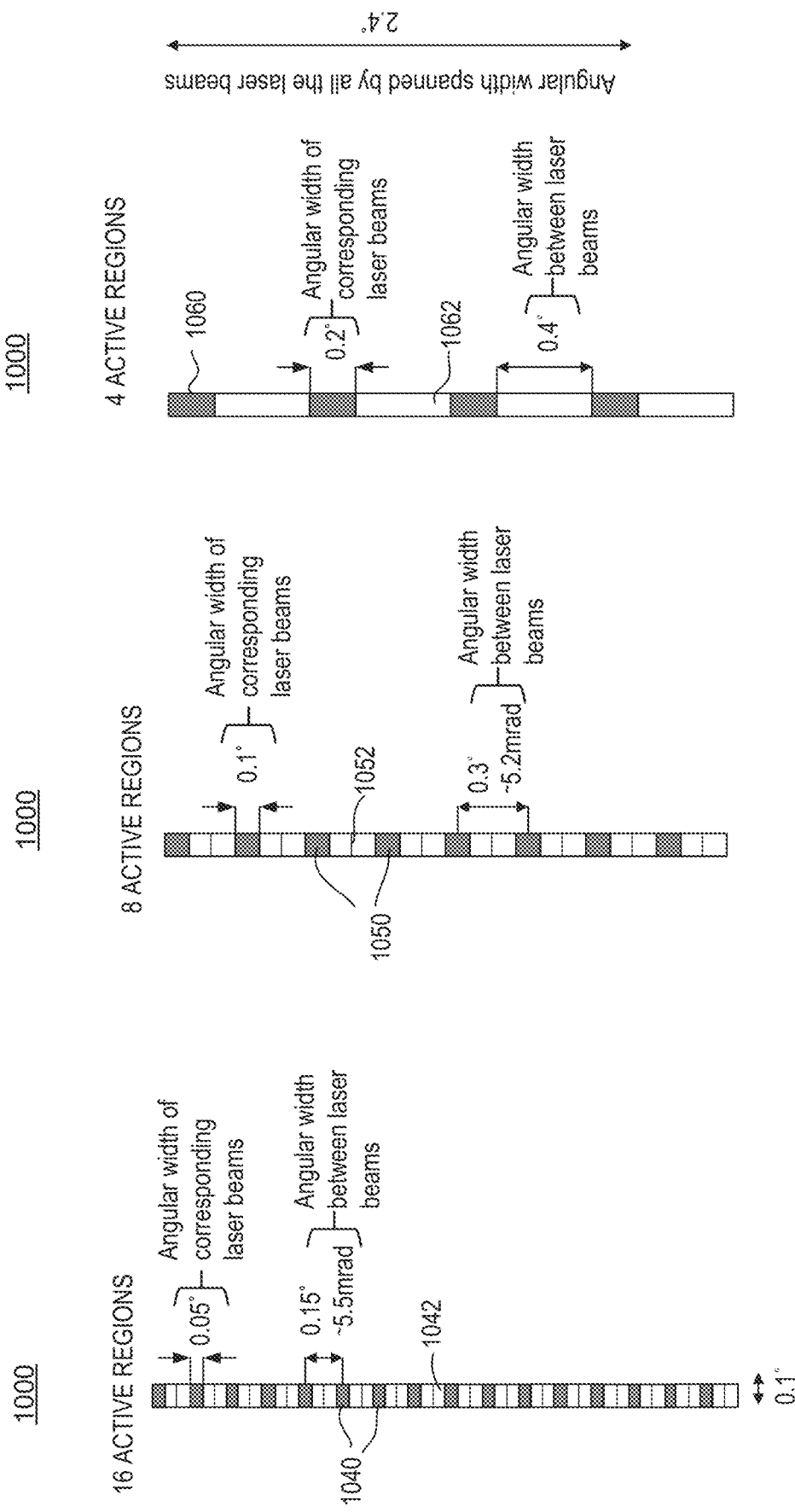

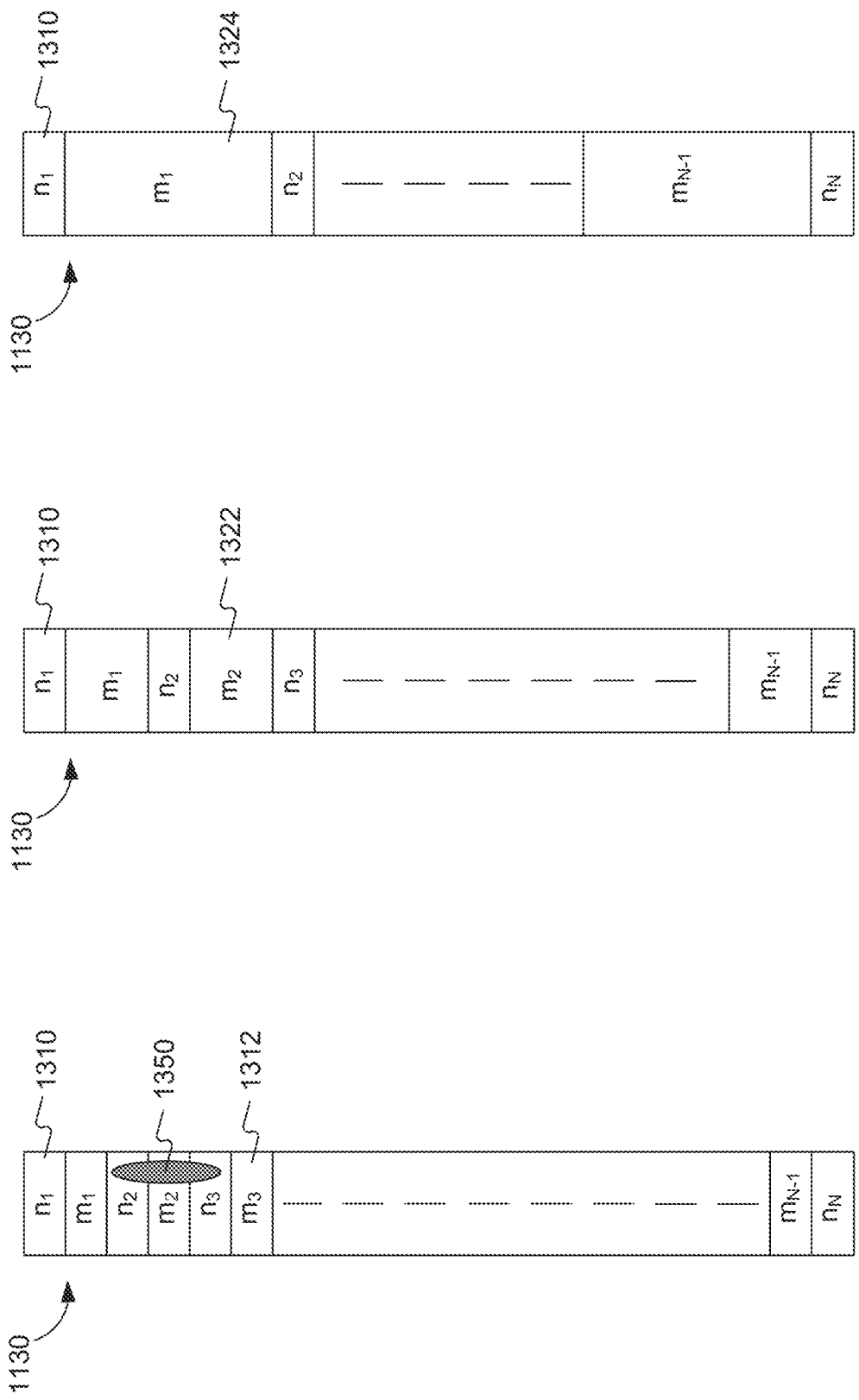

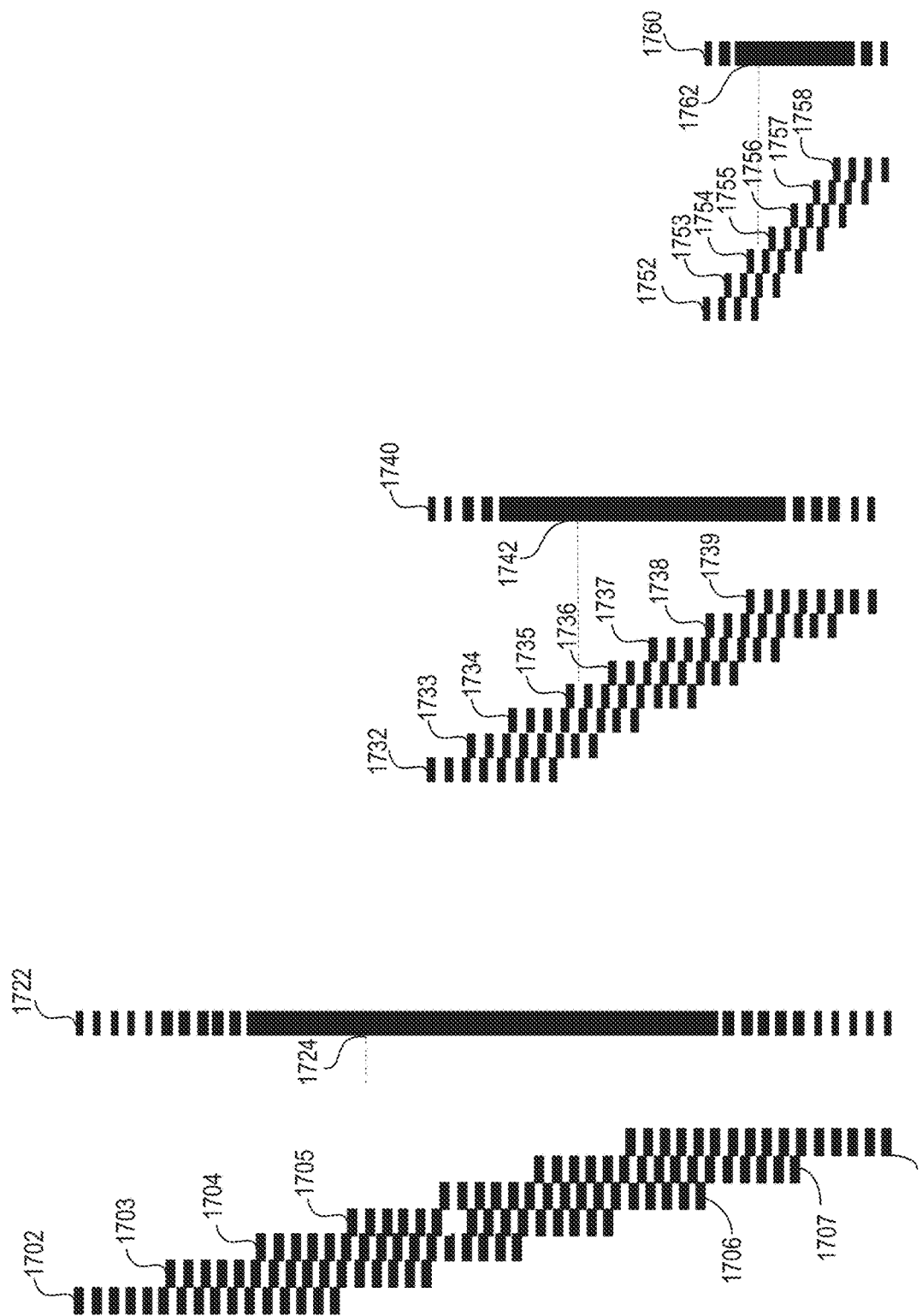

LIDAR SYSTEM WITH VARIABLE RESOLUTION MULTI-BEAM SCANNING

CROSS REFERENCE TO RELATED APPLICATIONS

The present application is a continuation of and claims priority to U.S. application Ser. No. 17/686,499, filed Mar. 4, 2022, which is a continuation of and claims priority to International Application No. PCT/IB2021/000698, filed Sep. 14, 2021, which claims priority to U.S. Provisional Patent Application No. 63/077,933, filed Sep. 14, 2020, to U.S. Provisional Patent Application No. 63/081,024, filed Sep. 21, 2020, to U.S. Provisional Patent Application No. 63/081,646, filed Sep. 22, 2020, and to U.S. Provisional Patent Application No. 63/173,426, filed Apr. 11, 2021, all of which are incorporated herein by reference in their entirety. Additionally, International Application No. PCT/IB2021/000698, filed Sep. 14, 2021 is a continuation-in-part of and claims priority to International Application No. PCT/IB2021/000581, filed Aug. 24, 2021, which is also incorporated herein by reference in its entirety. International Application No. PCT/IB2021/000581 claims priority to U.S. Provisional Patent Application No. 63/069,403, filed Aug. 24, 2020, and to U.S. Provisional Patent Application No. 63/077,933, filed Sep. 14, 2020, which are incorporated herein by reference in their entirety.

BACKGROUND

I. Technical Field

The present disclosure relates generally to technology for scanning a surrounding environment and, for example, to systems and methods that use LIDAR technology to detect objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system. (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. An electro-optical system such as a LIDAR system may include a light deflector for projecting light emitted by a light source into the environment of the electro-optical system. The light deflector may be controlled to pivot around at least one axis for projecting the light into a desired location in the field of view of the electro-optical system. It may be desirable to design improved systems and methods for determining the position and/or orientation of the light deflector for controlling and/or monitoring the movement of the light deflector with precision.

The systems and methods of the present disclosure are directed towards improving performance of monitoring the position and/or orientation of a light deflector used in electro-optical systems.

SUMMARY

In one aspect, a LIDAR system is disclosed. The LIDAR system may include a laser emission unit configured to generate a plurality of laser beams; and an optical system configured to transmit the plurality of laser beams from the laser emission unit to a common scanning unit. The common scanning unit may be configured to project the plurality of laser beams toward a field of view of the LIDAR system to simultaneously scan the field of view along a plurality of scan lines traversing the field of view.

In another aspect, a LIDAR system is disclosed. The LIDAR system may include a laser emission unit configured to generate a plurality of laser beams; and a scanning unit configured to receive the plurality of laser beams. The common scanning unit may be configured to project the plurality of laser beams toward a field of view of the LIDAR system. The LIDAR system may also include at least one processor. The at least one processor may be programmed to cause the scanning unit to scan the field of view of the LIDAR system by directing the plurality of beams along a first plurality of scan lines traversing the FOV; displacing the plurality of laser beams from a first set of locations associated with the first plurality of scan lines to a second set of locations associated with a second plurality of scan lines; and directing the plurality of laser beams along the second plurality of scan lines.

In yet another aspect, a LIDAR system is disclosed. The LIDAR system may include a monolithic laser array including a plurality of laser emitters configured to generate a plurality of laser beams; and a biaxial scanning mirror configured to receive the plurality of laser beams. The biaxial scanning mirror may be configured to project the plurality of laser beams toward a field of view of the LIDAR system. The LIDAR system may include at least one processor. The at least one processor may be programmed to activate a first sub-set of laser emitters among the plurality of laser emitters; scan laser beams generated by the first sub-set of laser emitters over a first plurality of scan lines traversing the field of view of the LIDAR system; de-activate the first sub-set of laser emitters; activate a second sub-set of laser emitters among the plurality of laser emitters; scan laser beams generated by the second sub-set of laser emitters over a second plurality of scan lines traversing the field of view of the LIDAR system; de-activate the second sub-set of laser emitters; tilt the biaxial scanning mirror by a rotational angle greater than or equal to an angular length of the monolithic laser array; activate the first sub-set of laser emitters; and scan laser beams generated by the first sub-set of laser emitters over a third plurality of scan lines traversing the field of view of the LIDAR system.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 1A is a diagram illustrating an exemplary LIDAR system consistent with disclosed embodiments.

FIGS. 4A, 4B, 4C, 4D, and 4E are diagrams illustrating different configurations of sensing units in accordance with some embodiments of the present disclosure.

FIG. 9A is a diagram illustrating an example of a monolithic laser array consistent with some embodiments of the present disclosure.

FIG. 9B is a diagram illustrating another example of a monolithic laser array consistent with some embodiments of the present disclosure.

FIGS. 10A-10G are diagrams illustrating examples of monolithic laser arrays consistent with some embodiments of the present disclosure.

FIGS. 13A-13C are diagrams illustrating examples of a monolithic detector, having active areas separated by inactive areas consistent with some embodiments of the present disclosure.

FIGS. 17A-17C are diagrams illustrating examples of overlapping scanning using multiple beam configurations consistent with some embodiments of the present disclosure.

DETAILED DESCRIPTION

Figure 1B:
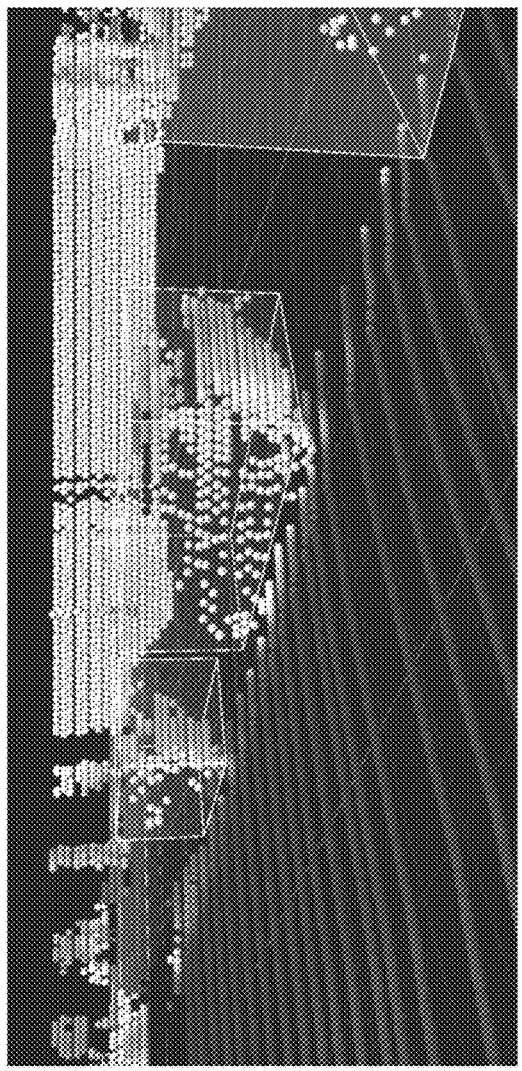
FIG. 1B is an image showing an exemplary output of single scanning cycle of a LIDAR system mounted on a vehicle consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g., number of meters, number of inches, number of kilometers, number of millimeters), a number of arbitrary length units (e.g., number of LIDAR system lengths), a ratio between the distance to another length (e.g., a ratio to a length of an object detected in a field of view of the LIDAR system), an amount of time (e.g., given as standard unit, arbitrary units or ratio, for example, the time it takes light to travel between the tangible objects), one or more locations (e.g., specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g., by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g., location information (e.g., relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. If more than one object is detected by the LIDAR system, the generated information pertaining to different objects may be interconnected, for example a car is driving on a road, a bird is sitting on the tree, a man touches a bicycle, a van moves towards a building. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, ±40°–20°, ±90° or 0°–90°.

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g., a location of the LIDAR system, a location on earth, or a location of another object). Additionally or alternatively, the term "detecting an object" may refer to identifying the object (e.g., classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g., cars, trees); at least partially liquid (e.g., puddles on the road, rain); at least partly gaseous (e.g., fumes, clouds); made from a multitude of distinct particles (e.g., sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g., laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g., is the direction of an optical axis of the LIDAR system); a position of the LIDAR system with respect to the environment (e.g., distance above ground and adjacent topography and obstacles); operational parameters of the LIDAR system (e.g., emission power, computational settings, defined angles of operation), etc. The field of view of LIDAR system may be defined, for example, by a solid angle (e.g., defined using $\phi$, $\theta$ angles, in which $\phi$ and $\theta$ are angles defined in perpendicular planes, e.g., with respect to symmetry axes of the LIDAR system and/or its FOV). In one example, the field of view may also be defined within a certain range (e.g., up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g., earth, roads, grass, sidewalks, road surface marking), sky, man-made objects (e.g., vehicles, buildings, signs), vegetation, people, animals, light projecting elements (e.g., flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g., a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g., 1 cm$^3$), and whose location may be described by the point cloud model using a set of coordinates (e.g., (X,Y,Z), (r,$\varphi$,$\theta$)). By way of example only, the point cloud model may store additional information for some or all of its points (e.g., color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g., controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g., a mirror), at least one refracting element (e.g., a prism, a lens), and so on. In one example, the light deflector may be movable, to cause light deviate to differing degrees (e.g., discrete degrees, or over a continuous span of degrees). The light deflector may optionally be controllable in different ways (e.g., deflect to a degree α, change deflection angle by Δα, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g., along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g., non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g., mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g., atmospheric temperature, rain, etc.). In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADS may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted that the one or more LIDAR systems 100 do not have to provide a complete 360° field of view, and that narrower fields of view may be useful in some situations. For example, vehicle 110 may require a first LIDAR system 100 having an field of view of 75° looking ahead of the vehicle, and possibly a second LIDAR system 100 with a similar FOV looking backward (optionally with a lower detection range). It is also noted that different vertical field of view angles may also be implemented.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
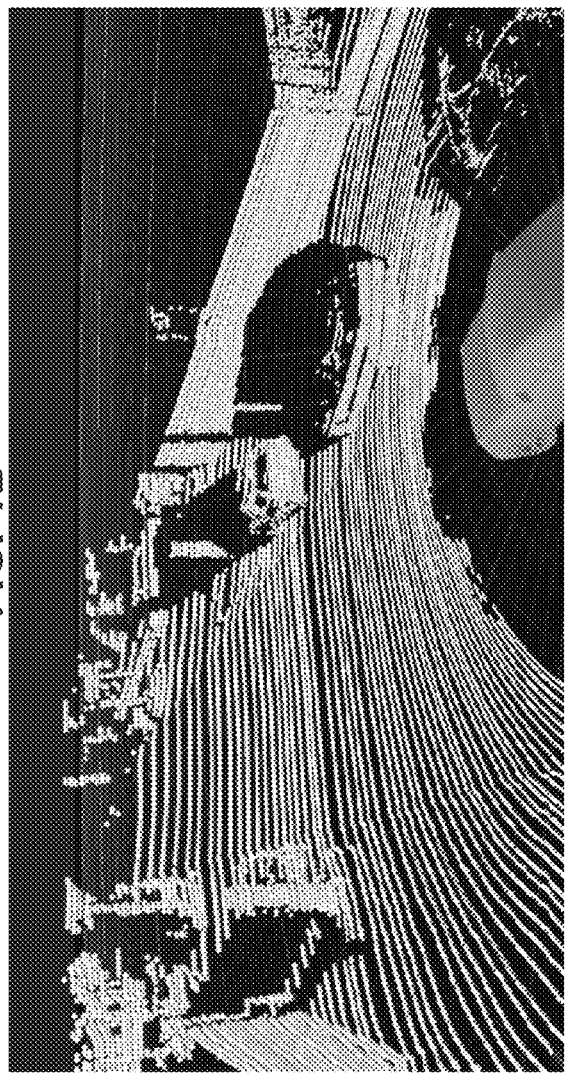
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g., cars, trees, people, and roads). Features may have the same resolution of the point cloud model (i.e. having the same number of data points, optionally arranged into similar sized 2D arrays), or may have different resolutions. The features may be stored in any kind of data structure (e.g., raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
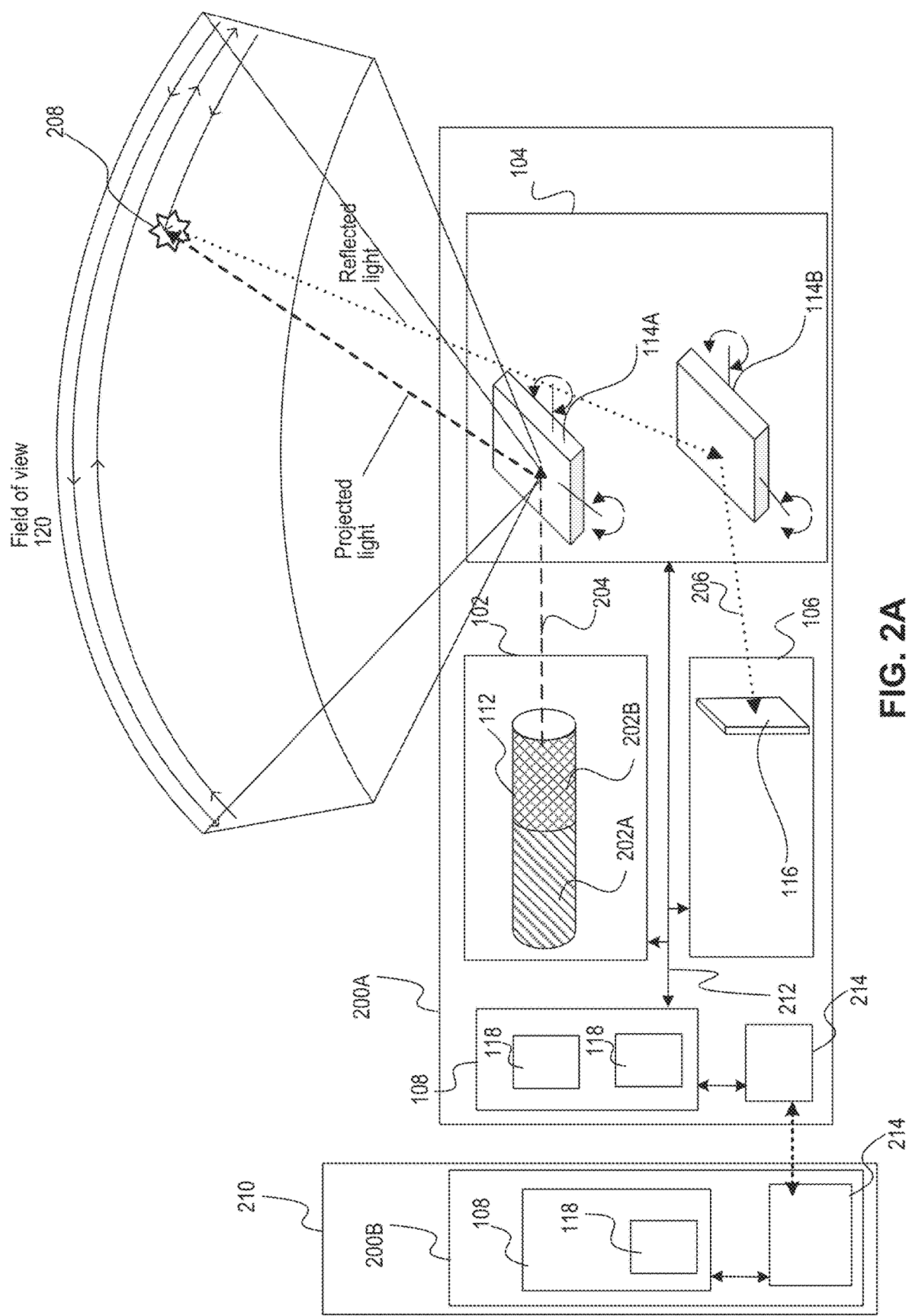
FIGS. 2A, 2B, 2C, 2D, 2E, 2F, and 2G are diagrams illustrating different configurations of projecting units in accordance with some embodiments of the present disclosure.
Figure 2B:
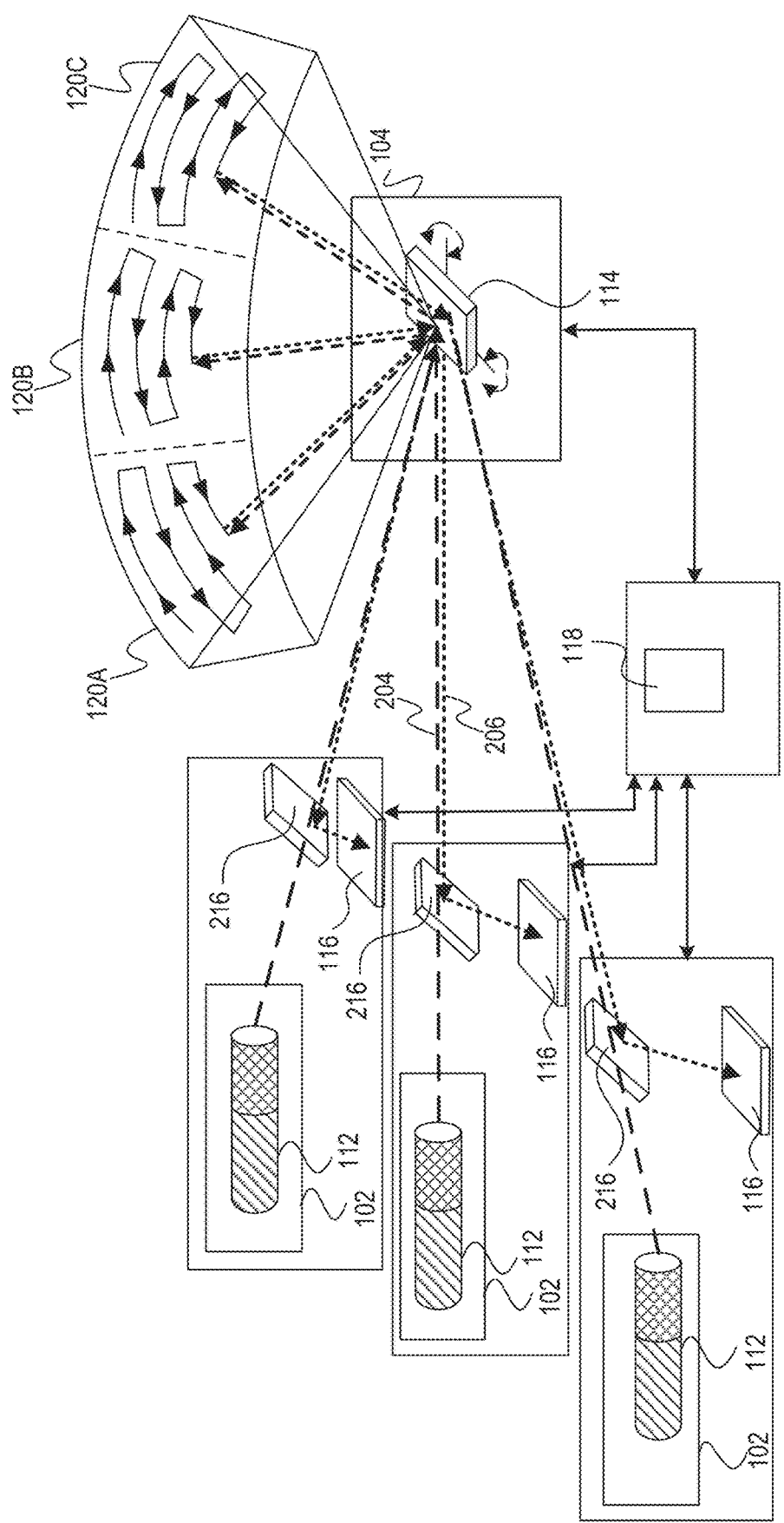
Figure 2C:
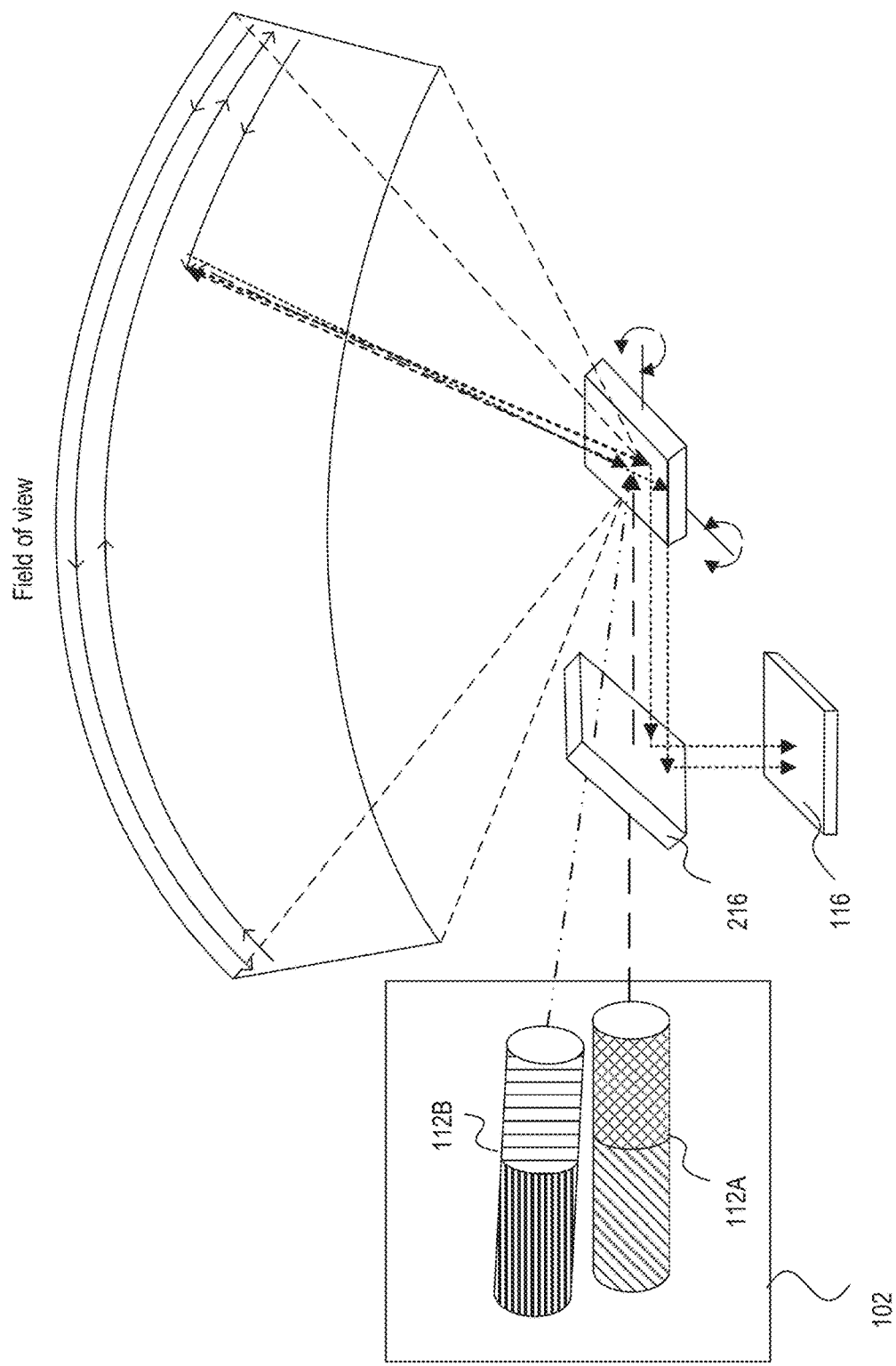
Figure 2D:
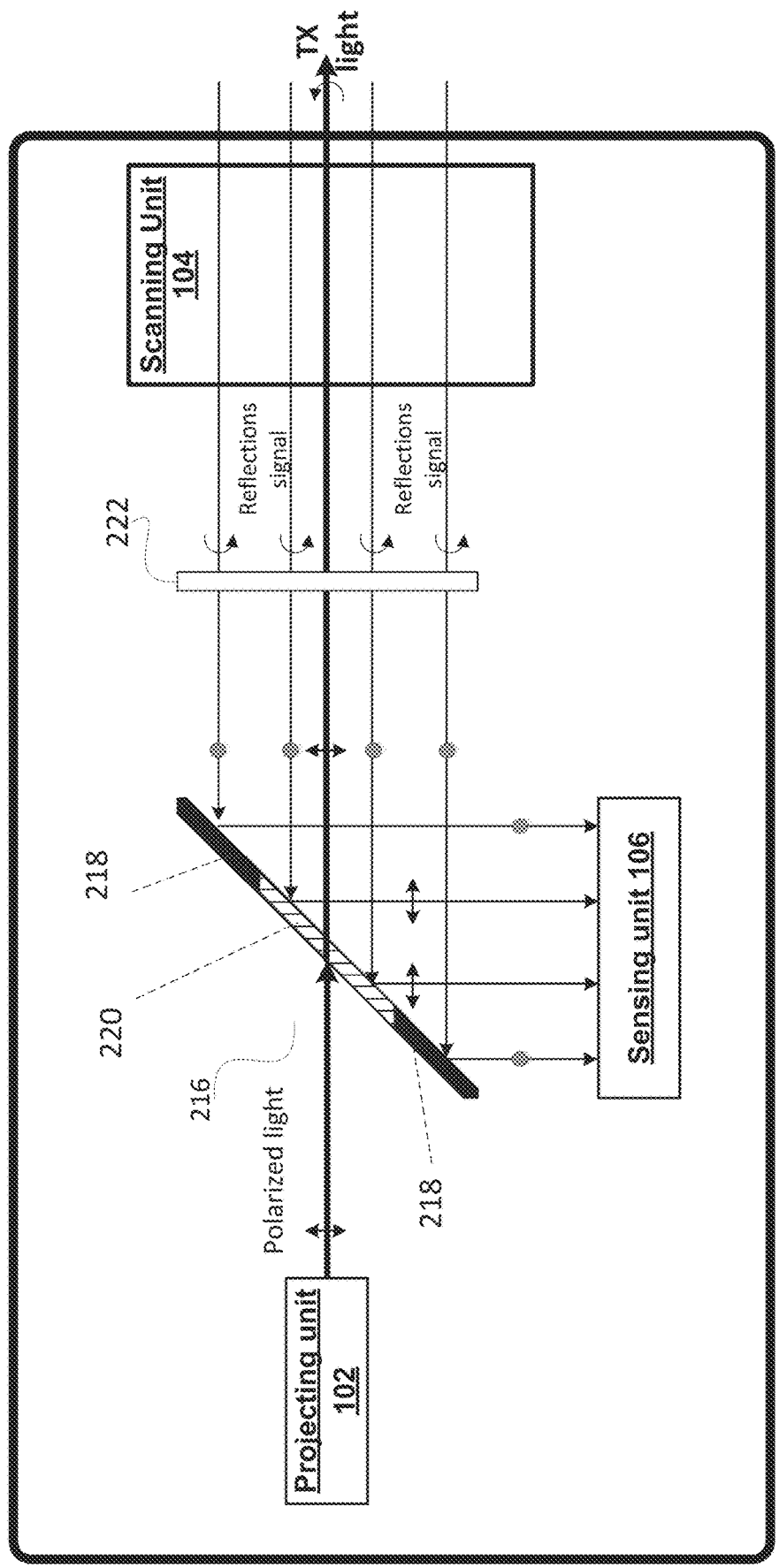
Figure 2E:
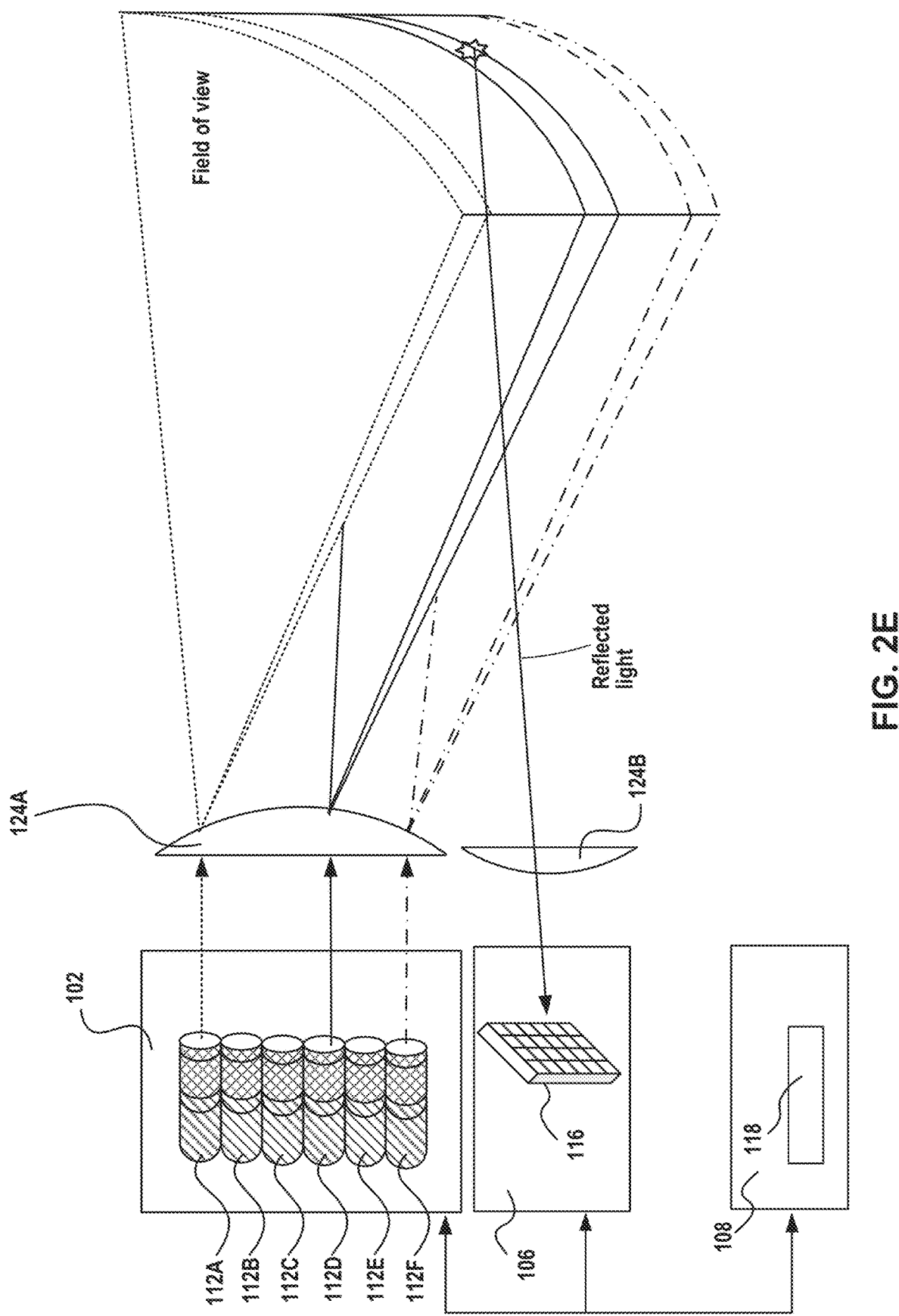
Figure 2F:
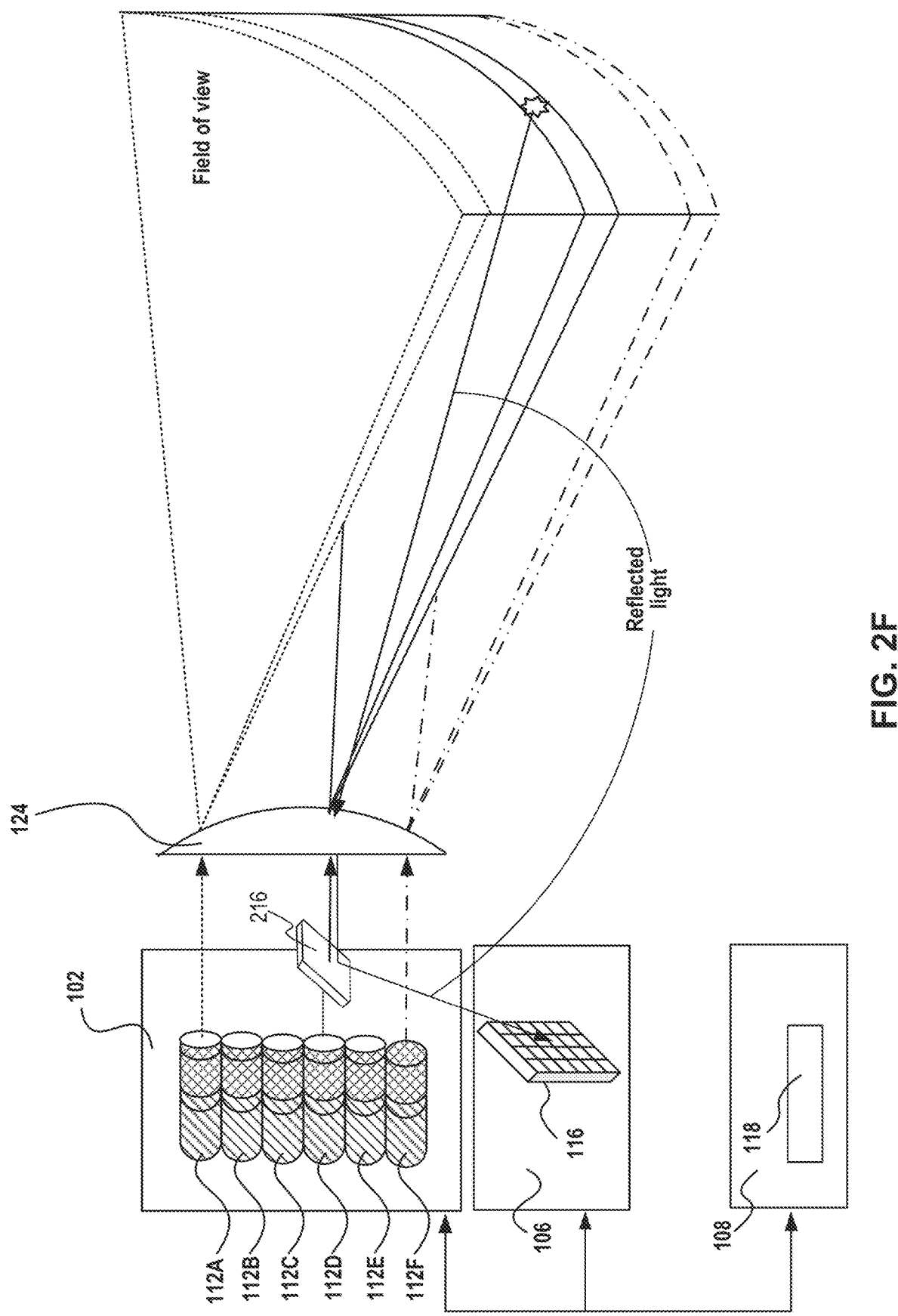
Figure 2G:
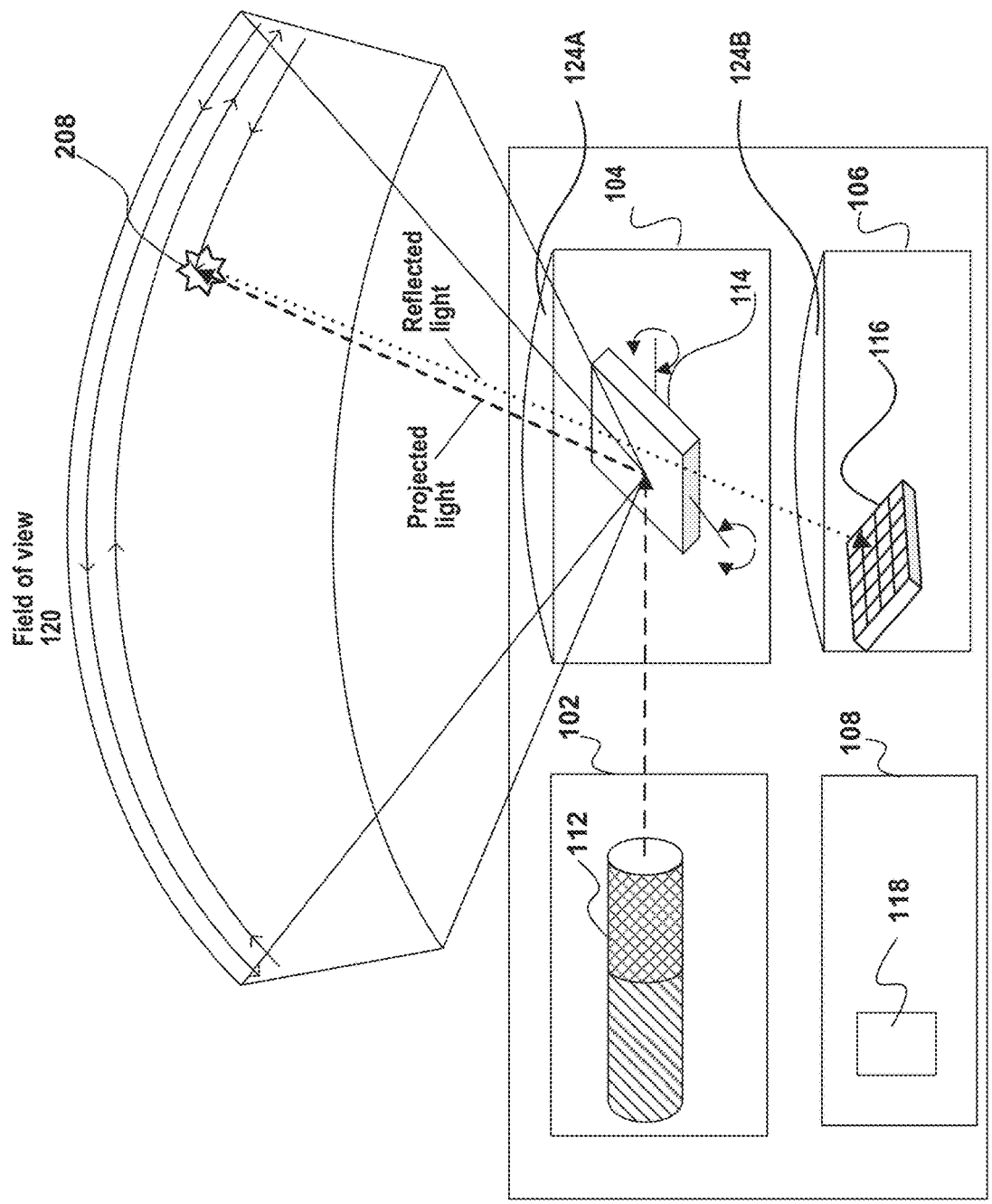

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g., for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g., a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g., cameras, microphones, radar systems). In one example, LIDAR system 100 may be used by a security system. An example of such an embodiment is described below with reference to FIG. 6D.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 100 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g., as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g., lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light. For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-waveplate/wave-retarder which changes the emitted signal from a polarized signal to a linear signal (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
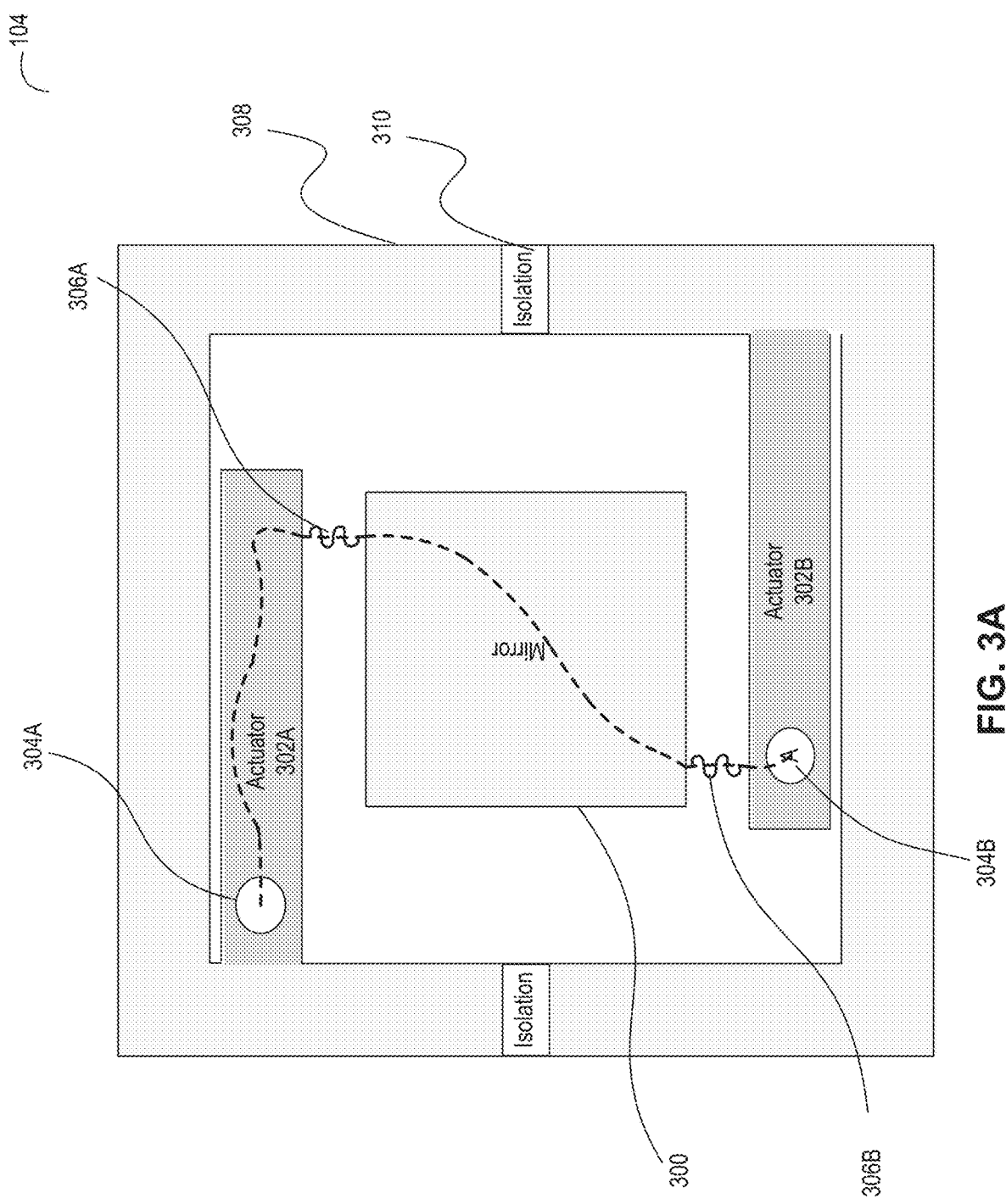
FIGS. 3A, 3B, 3C, and 3D are diagrams illustrating different configurations of scanning units in accordance with some embodiments of the present disclosure.
Figure 3B:
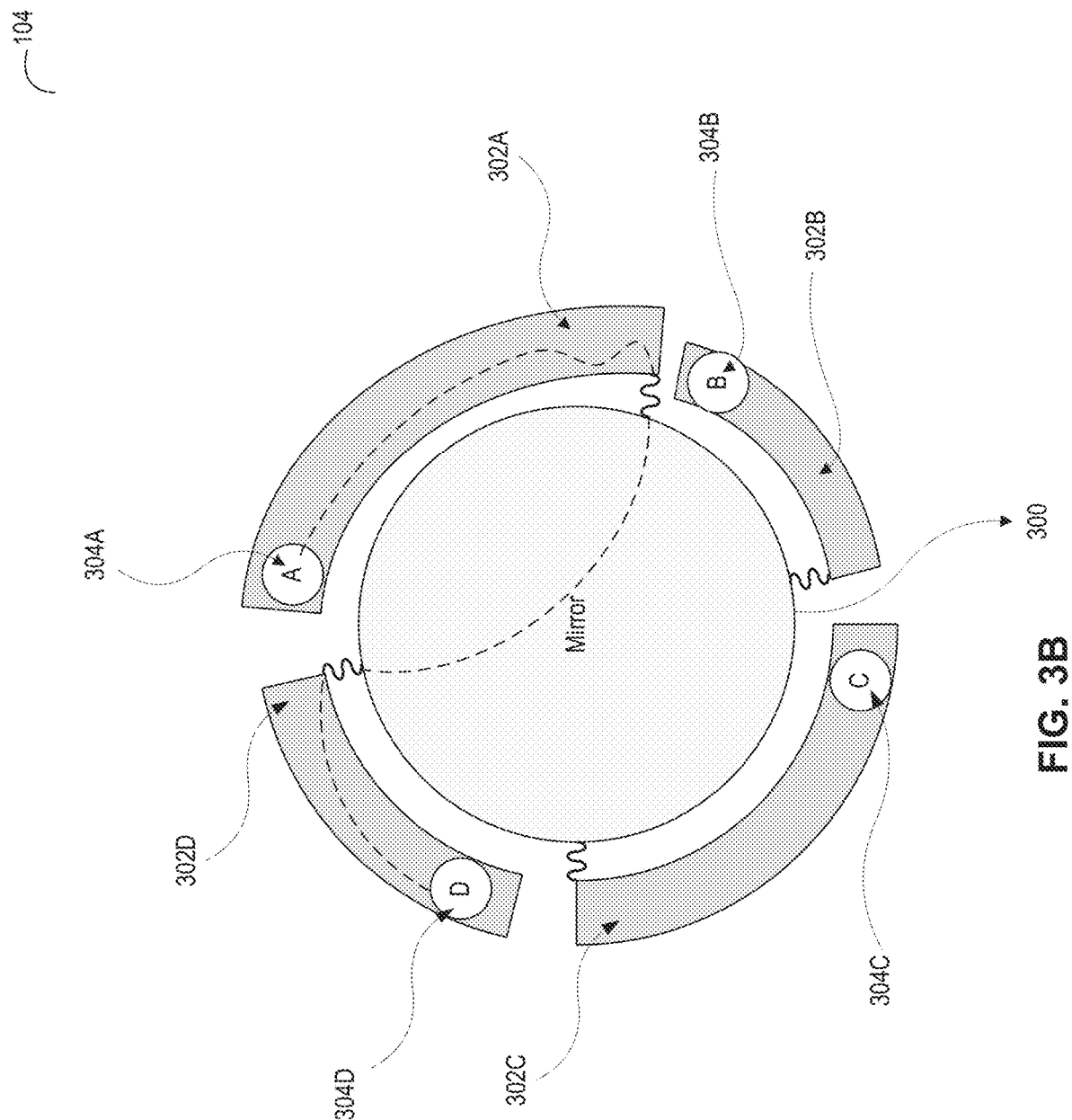
Figure 3C:
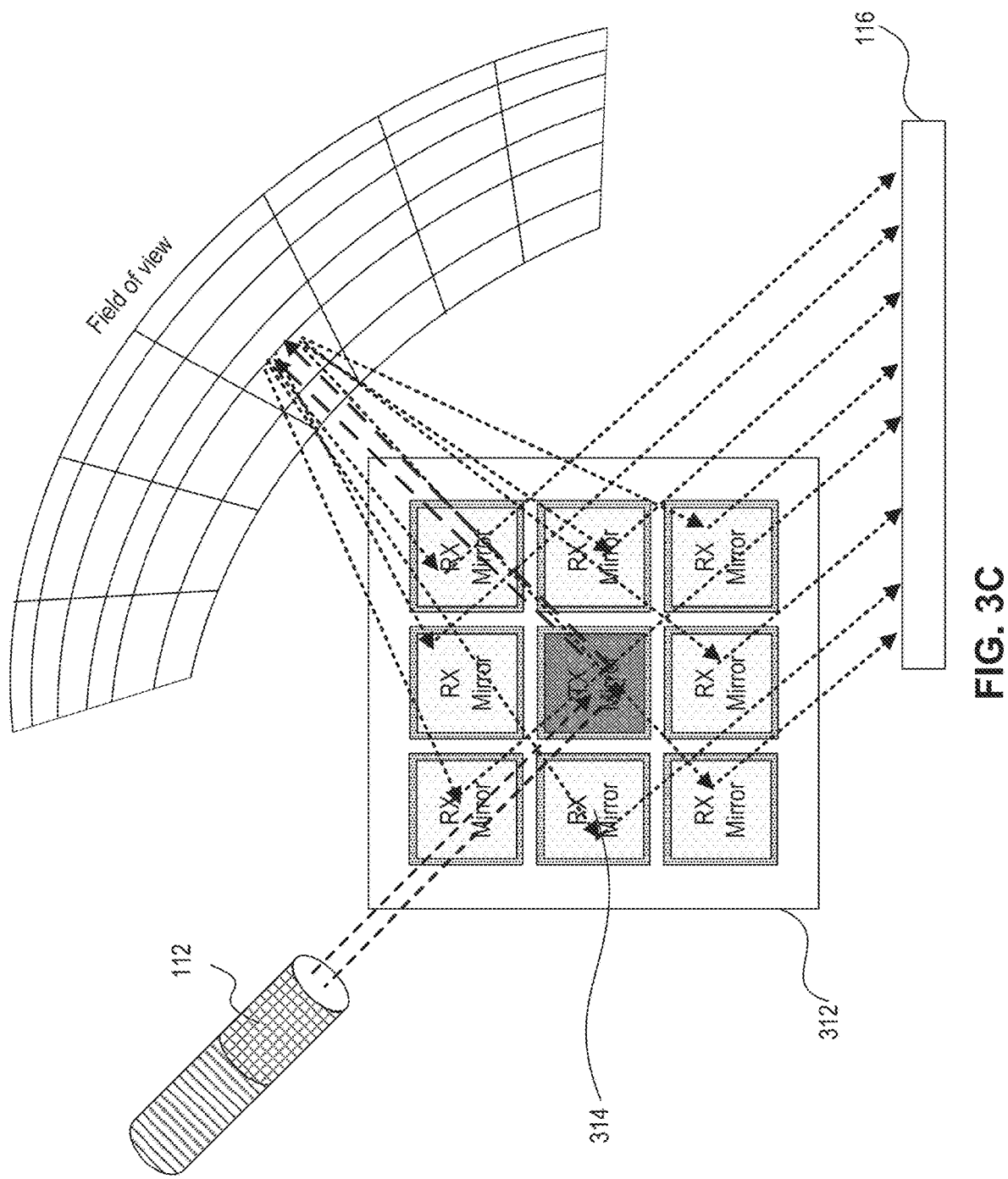
Figure 3D:
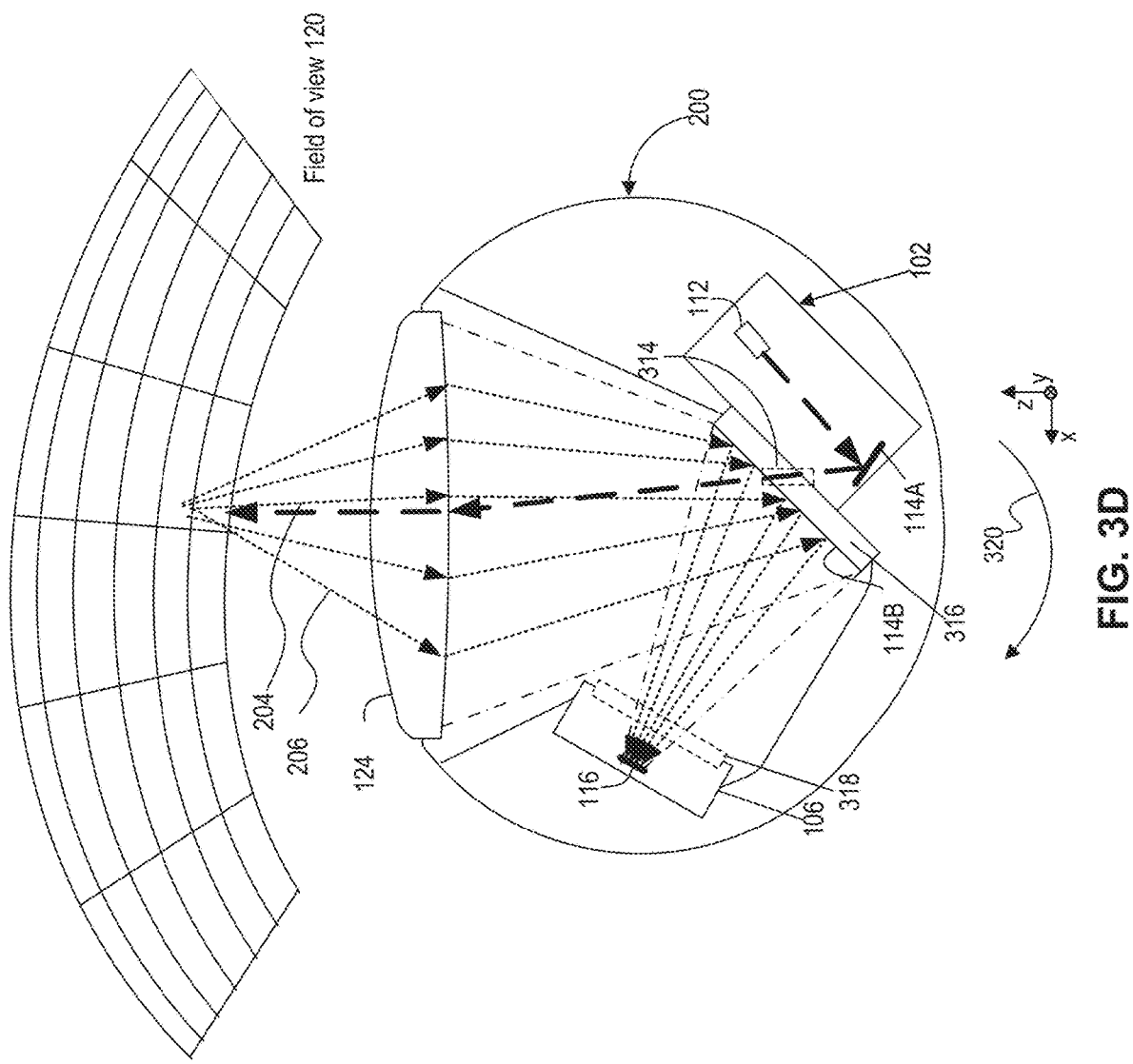

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g., PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes. This embodiment is described in greater detail below with reference to FIGS. 32-34.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g., as exemplified in FIG. 3C), scanning unit 104 may include a deflector array (e.g., a reflector array) with small light deflectors (e.g., mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g., a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 mm$^2$, where each reflector units 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g., the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
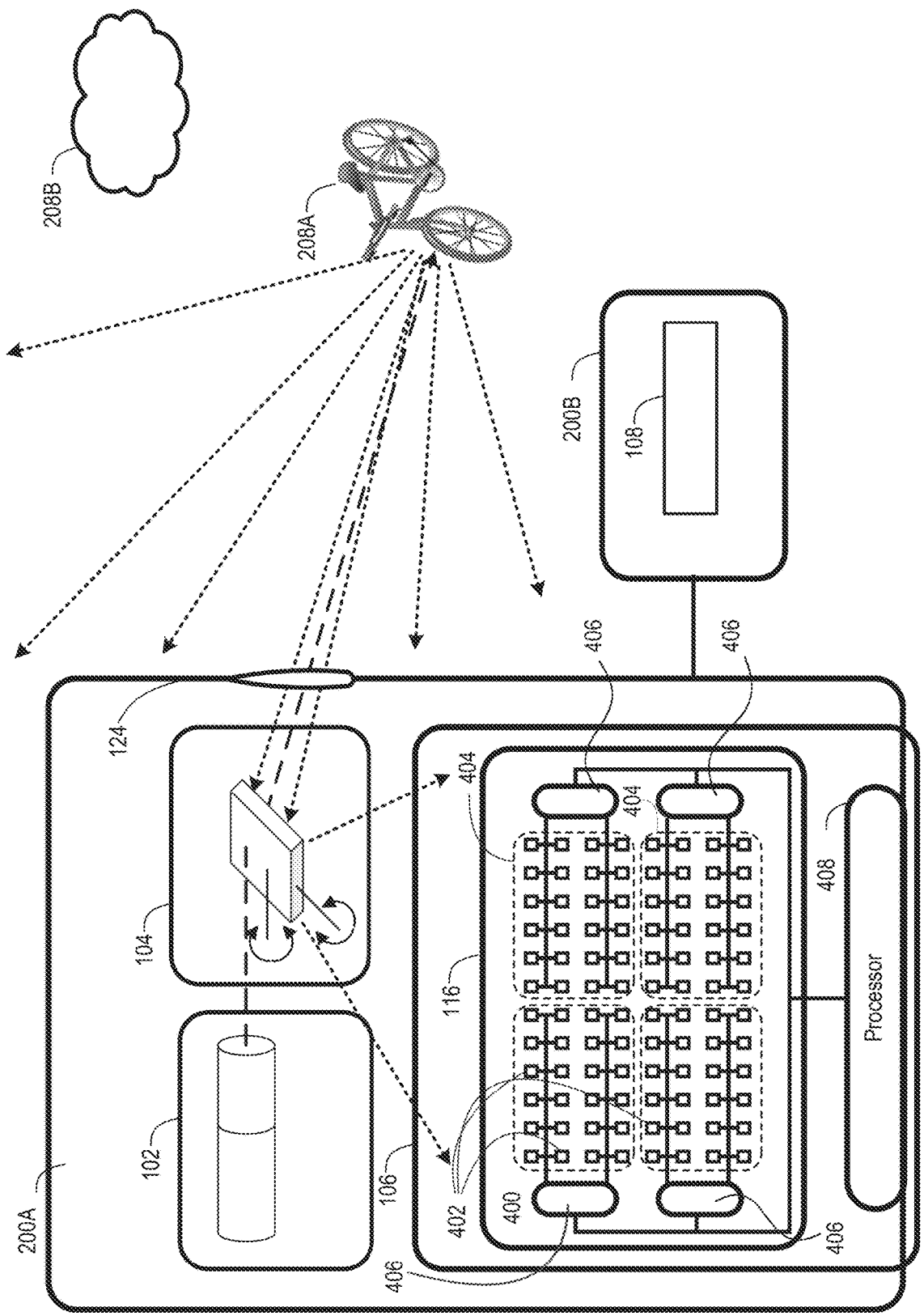
Figure 4B:
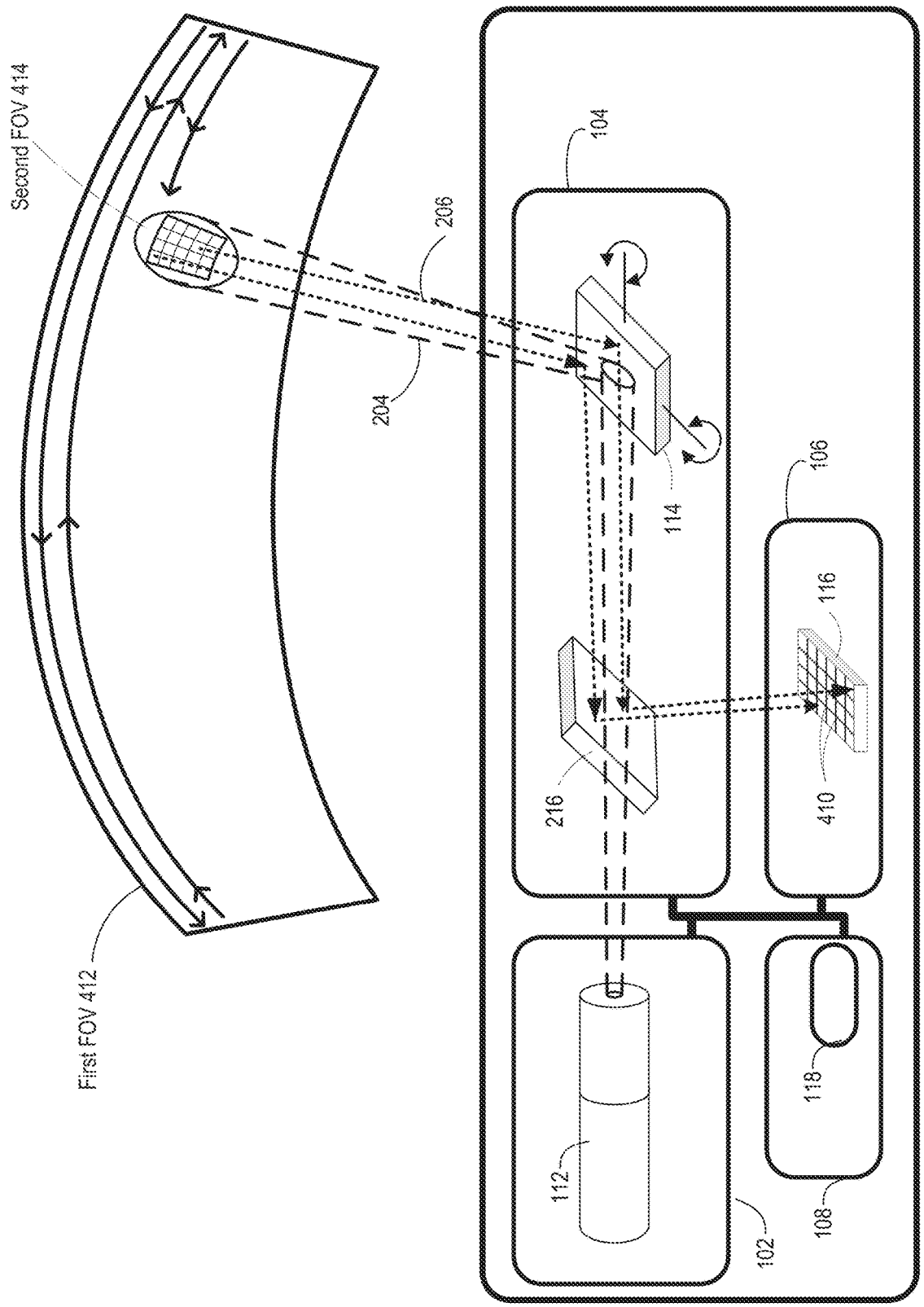
Figure 4C:
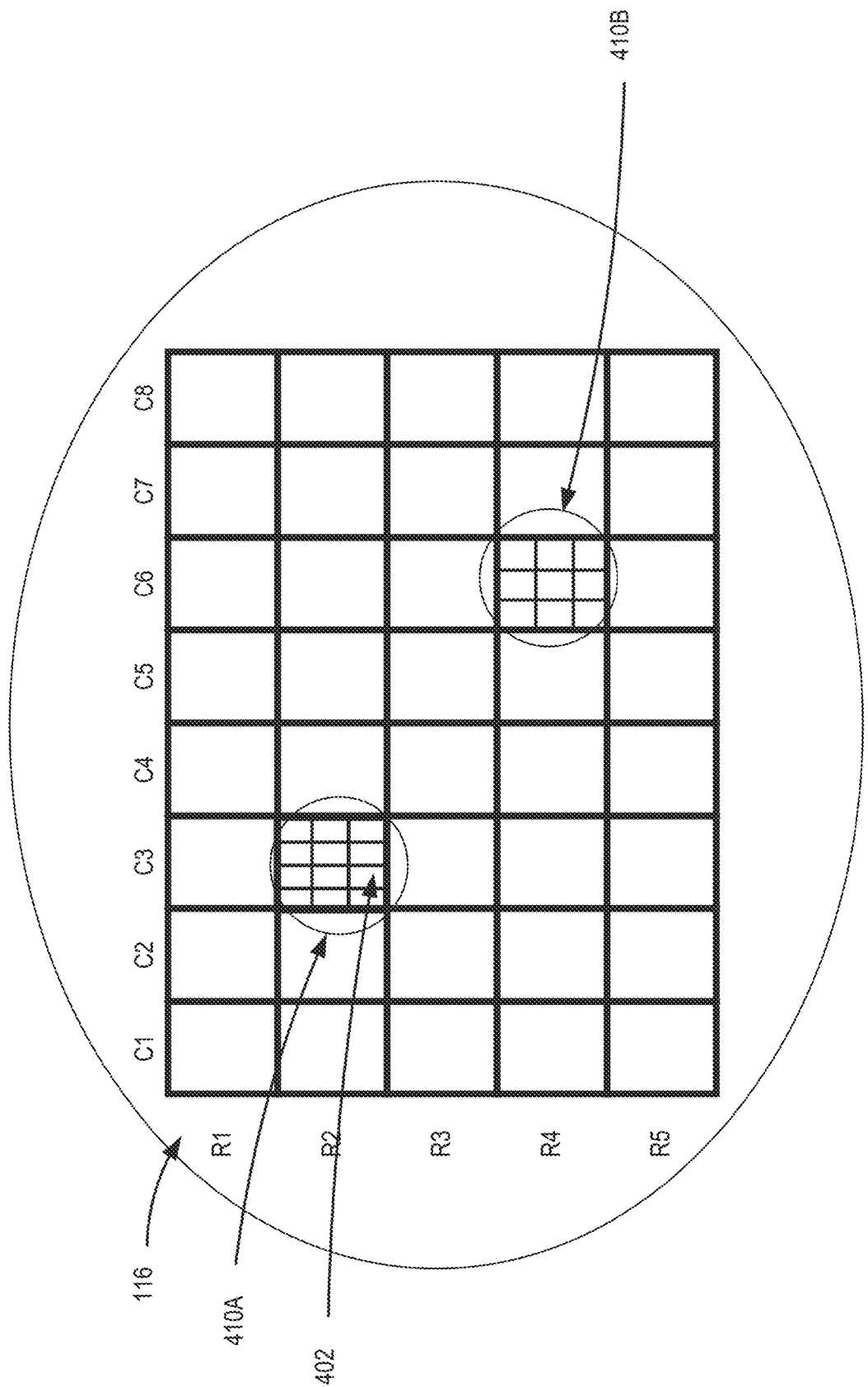
Figure 4D:
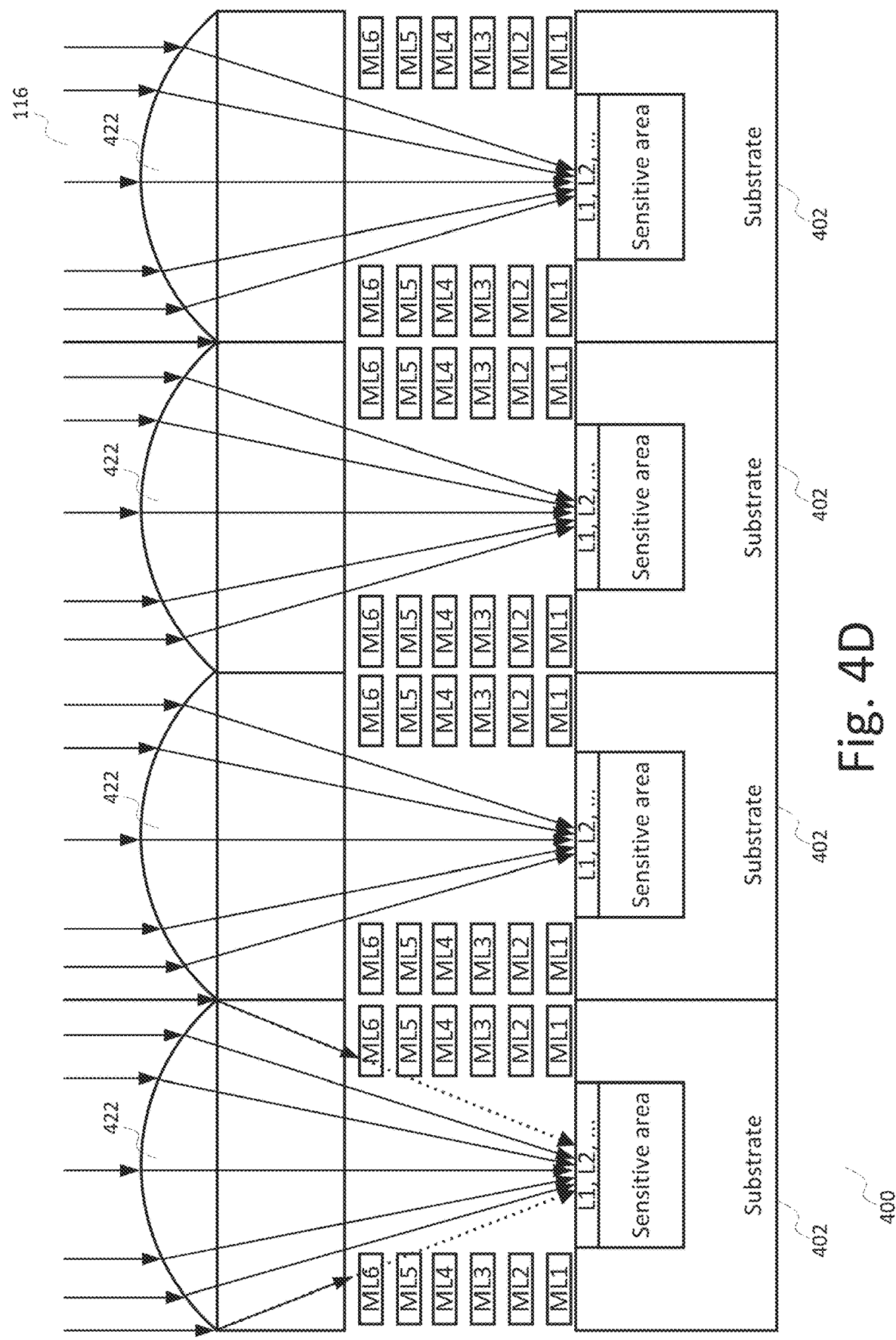

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g., a road, a tree, a car, a person), fluid object (e.g., fog, water, atmosphere particles), or object of another type (e.g., dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g., as shown) or any other arrangement. Detection elements 402 may operate concurrently or partially concurrently with each other. Specifically, each detection element 402 may issue detection information for every sampling duration (e.g., every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g., SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g., within detector array 400)—and may be shaped in different shapes (e.g., rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g., within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e.g., summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g., row, column) of detectors 410 in two non-parallel axes (e.g., orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g., 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g., a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning. Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1%% or 0.1%% of the FOV, while in other implementations the scanned area may cover 10% or 25% of the FOV. All other relative portions of the FOV values may also be implemented, of course.

The Processing Unit

Figure 5A:
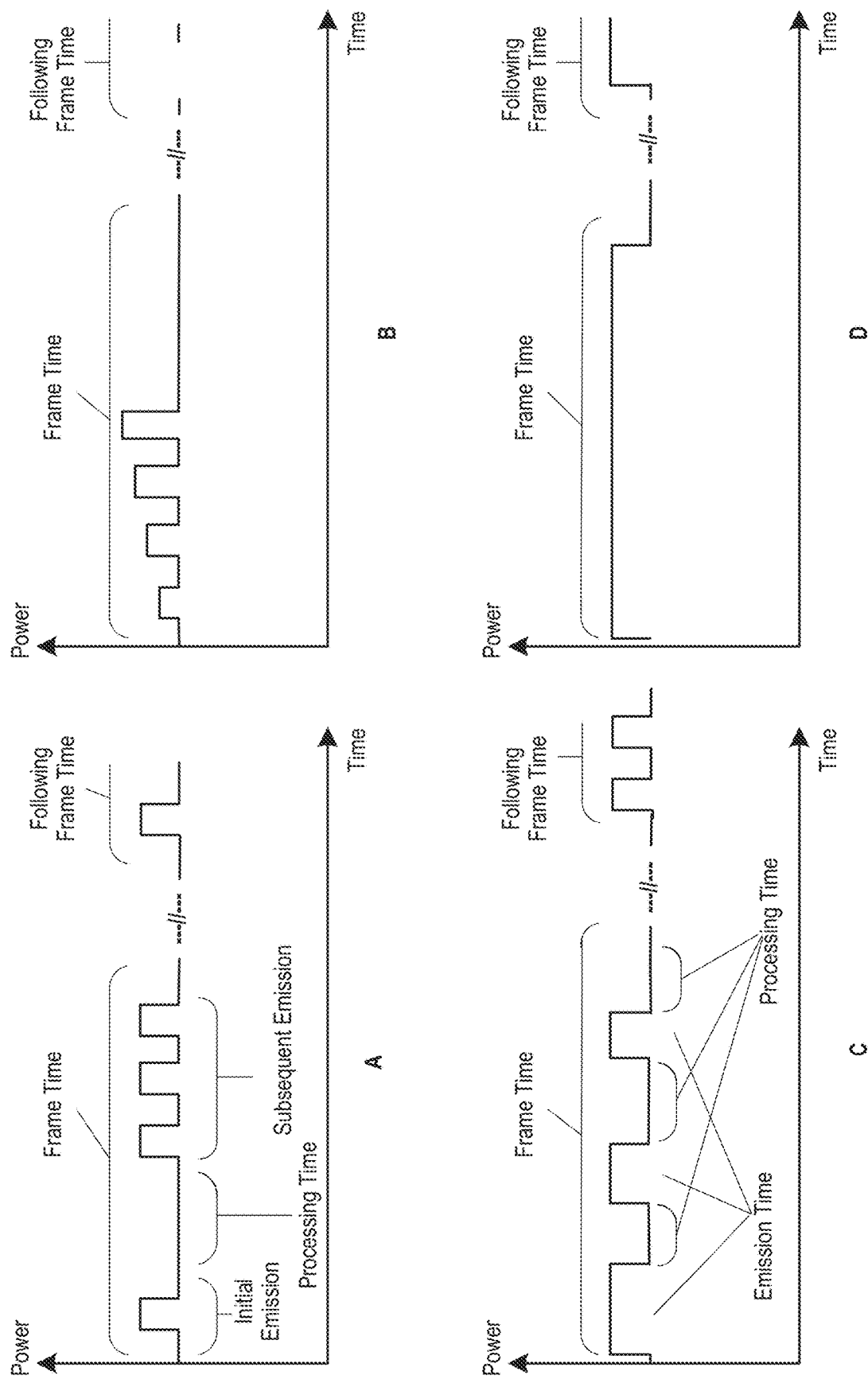
FIG. 5A includes four example diagrams illustrating emission patterns in a single frame-time for a single portion of the field of view.
Figure 5B:
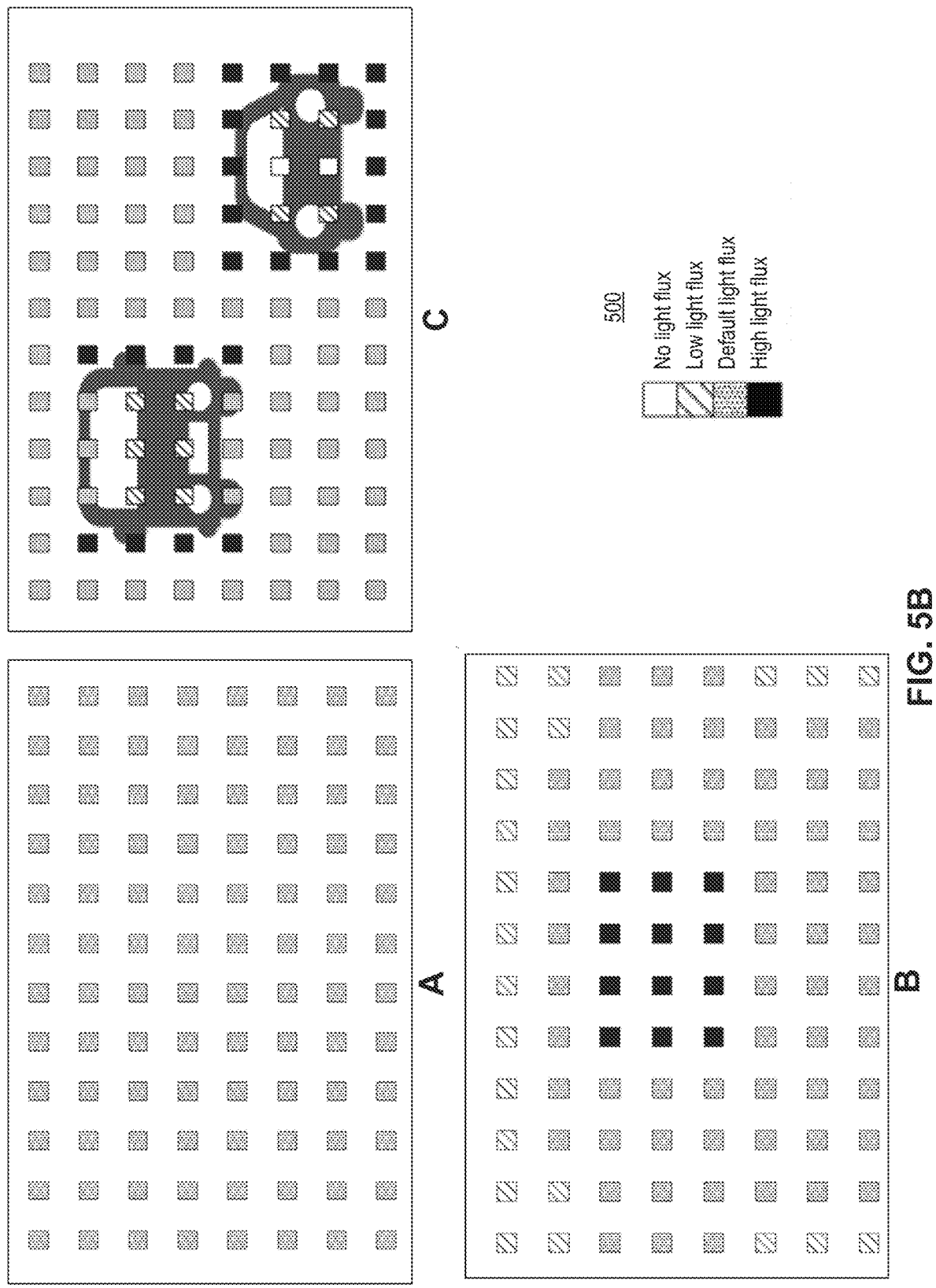
FIG. 5B includes three example diagrams illustrating emission scheme in a single frame-time for the whole field of view.
Figure 5C:
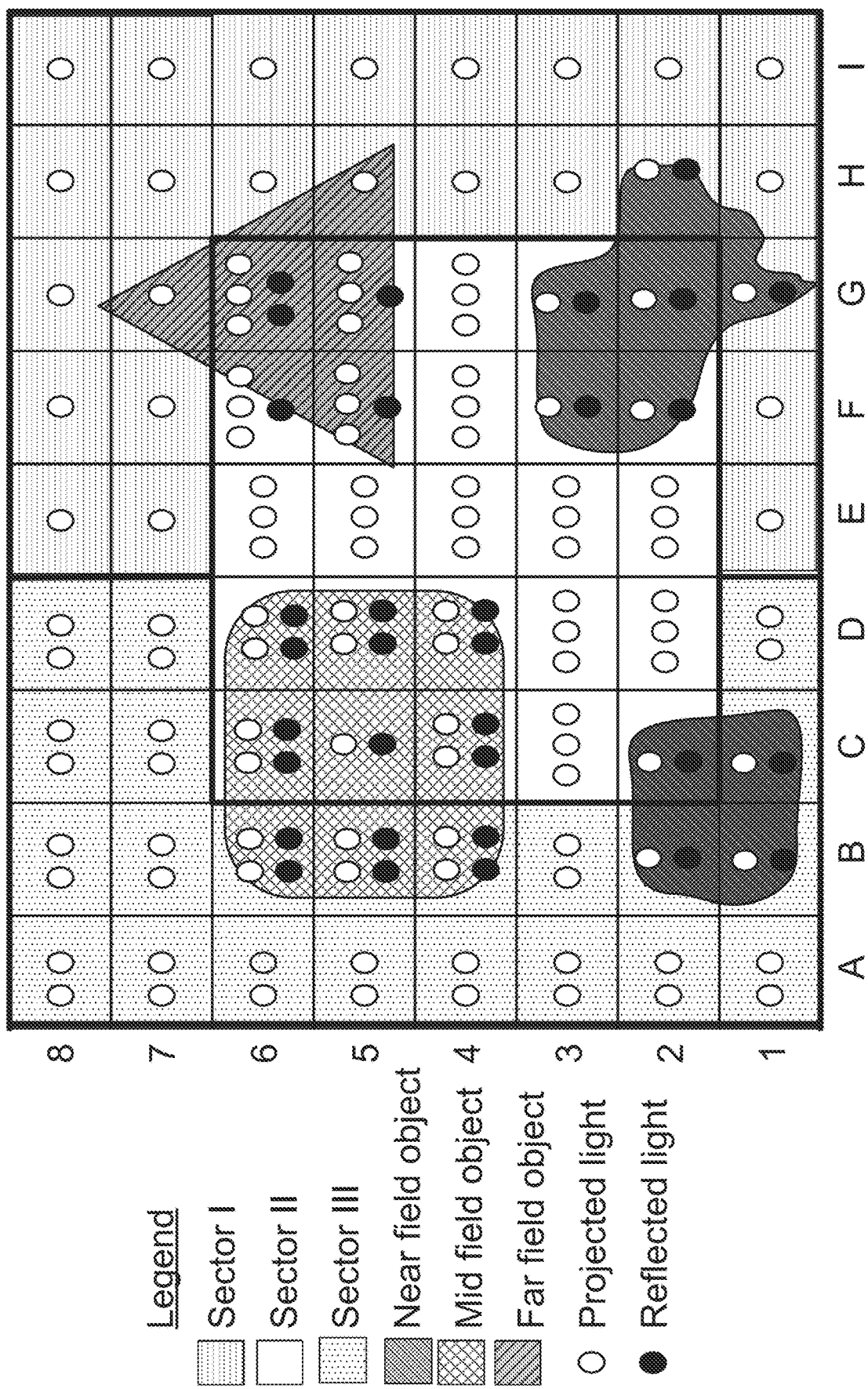
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and FIG. 5C is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g., one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g., for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g., 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:

a. Overall energy of the subsequent emission.
 b. Energy profile of the subsequent emission.
 c. A number of light-pulse-repetition per frame.
 d. Light modulation characteristics such as duration, rate, peak, average power, and pulse shape.
 e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g., regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g., camera, GPS), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. Allocation of less than maximal amount of pulses may also be a result of other considerations. For examples, in at least some regions, detection of object at a first distance (e.g., a near field object) may result in reducing an overall amount of light emitted to this portion of field of view 120.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
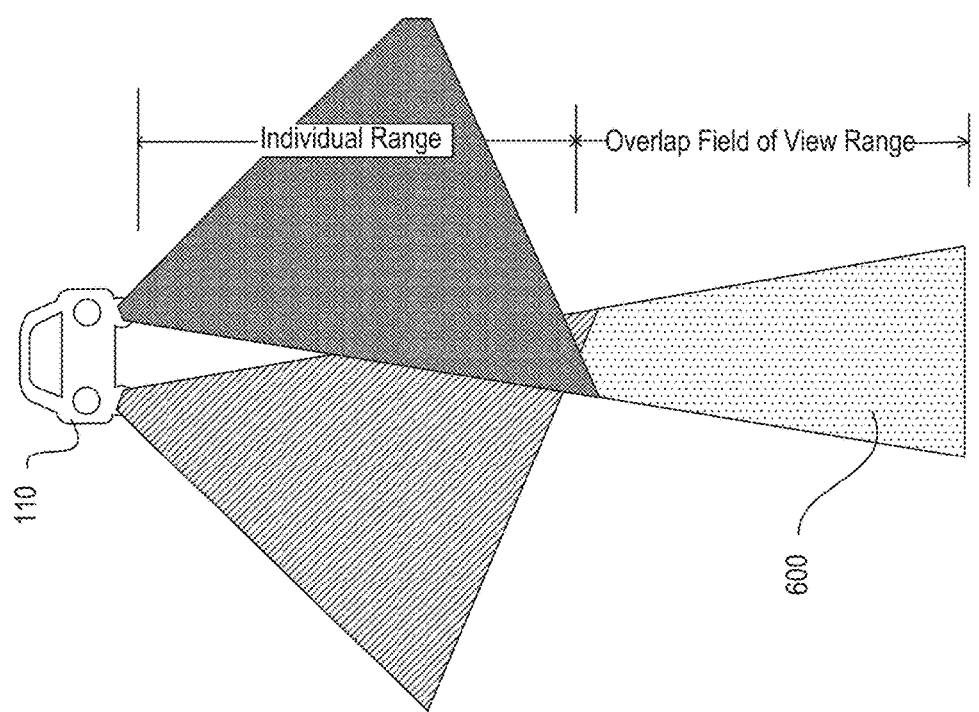
FIGS. 6A, 6B, and 6C are diagrams illustrating a first example implementation consistent with some embodiments of the present disclosure.
Figure 6A:
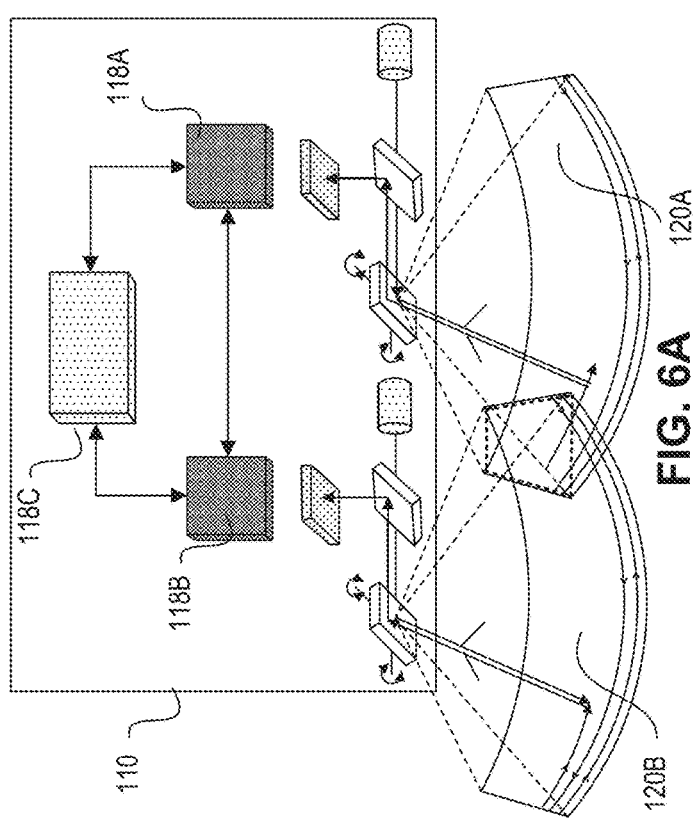
Figure 6B:
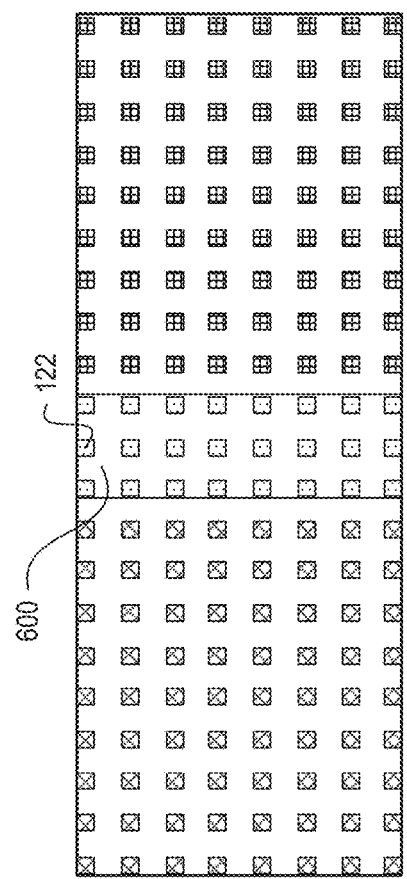

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range, and accuracy in the overlap zone and beyond it, as well as redundancy in sensitive parts of the FOV (e.g., the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
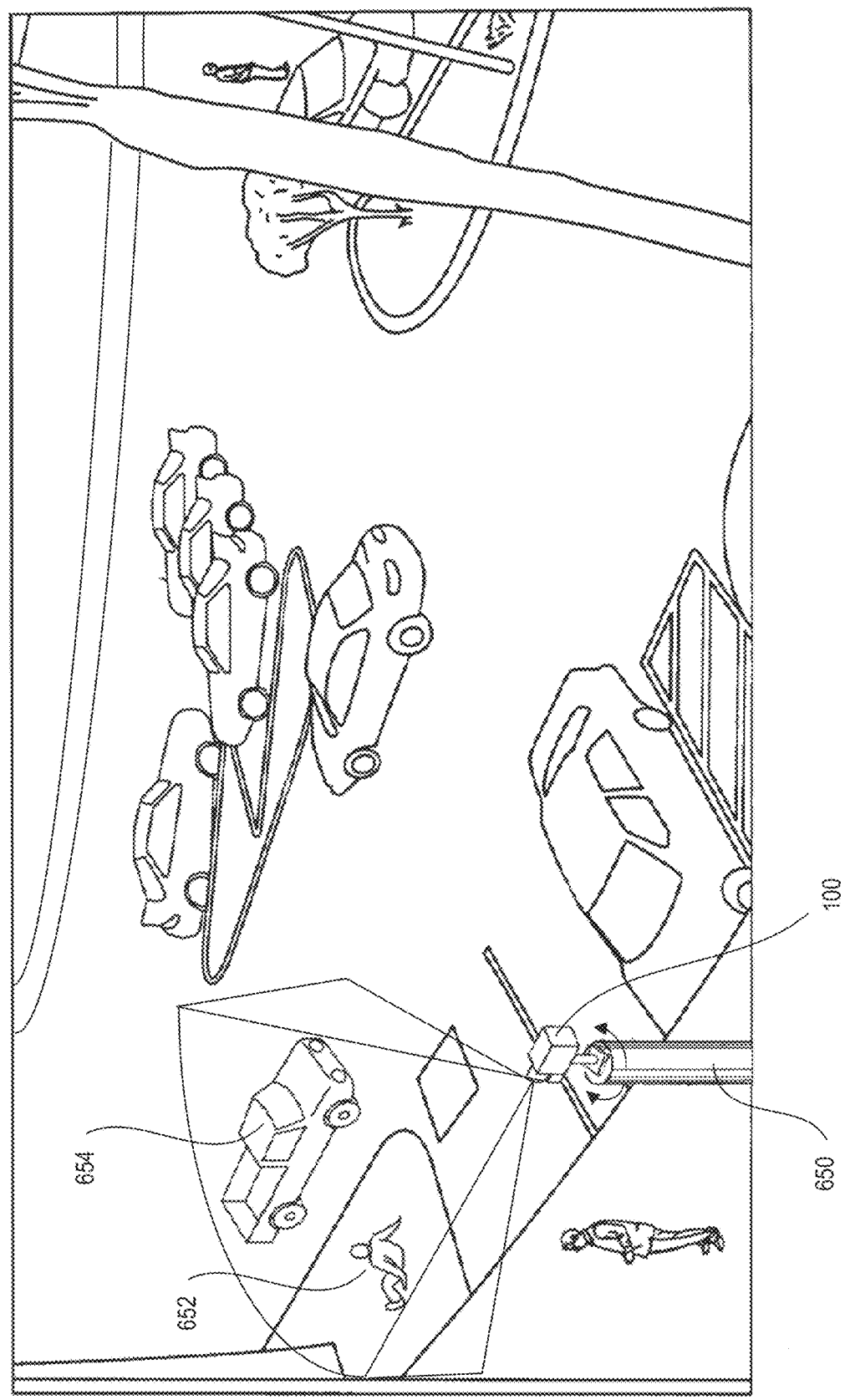
FIG. 6D is a diagram illustrating a second example implementation consistent with some embodiments of the present disclosure.

FIG. 6D illustrates the implementation of LIDAR system 100 in a surveillance system. As mentioned above, LIDAR system 100 may be fixed to a stationary object 650 that may include a motor or other mechanism for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

It should also be noted that various sections of the disclosure and the claims may refer to various components or portions of components (e.g., light sources, sensors, sensor pixels, field of view portions, field of view pixels, etc.) using such terms as "first," "second," "third," etc. These terms are used only to facilitate the description of the various disclosed embodiments and are not intended to be limiting or to indicate any necessary correlation with similarly named elements or components in other embodiments. For example, characteristics described as associated with a "first sensor" in one described embodiment in one section of the disclosure may or may not be associated with a "first sensor" of a different embodiment described in a different section of the disclosure.

It is noted that LIDAR system 100, or any of its components, may be used together with any of the particular embodiments and methods disclosed below. Nevertheless, the particular embodiments and methods disclosed below are not necessarily limited to LIDAR system 100, and may possibly be implemented in or by other systems (such as but not limited to other LIDAR systems, other electrooptical systems, other optical systems, etc.—whichever is applicable). Also, while system 100 is described relative to an exemplary vehicle-based LIDAR platform, system 100, any of its components, and any of the processes described herein may be applicable to LIDAR systems disposed on other platform types. Likewise, the embodiments and processes disclosed below may be implemented on or by LIDAR systems (or other systems such as other electro-optical systems etc.) which are installed on systems disposed on platforms other than vehicles, or even regardless of any specific platform.

Example Implementation: LIDAR System With Variable Resolution Multi-Beam Scanning In LIDAR systems and other optical systems employing one or more laser light sources and scanning mirrors, the complexity of the system can be high. Furthermore, meeting eye safety requirements may involve the use of a wide field of view. Thus, LIDAR systems may include a large number of components to obtain and collect data over a wide FOV, while providing high reliability of the system. Existing systems typically include a laser emitter, scanning mirrors, and a detector (referred to as a Laser Range Finder [LRF]) for each beam emitted from the laser. However, existing systems may have high complexity, a large number of components (e.g., require multiple LRF's), and may be expensive. Thus, there is a need to reduce the system complexity, the number of parts, and cost, while providing LIDAR and other optical systems capable of providing desired levels of detection range and sensitivity. The presently disclosed embodiments are aimed at addressing this need.

Figure 7A:
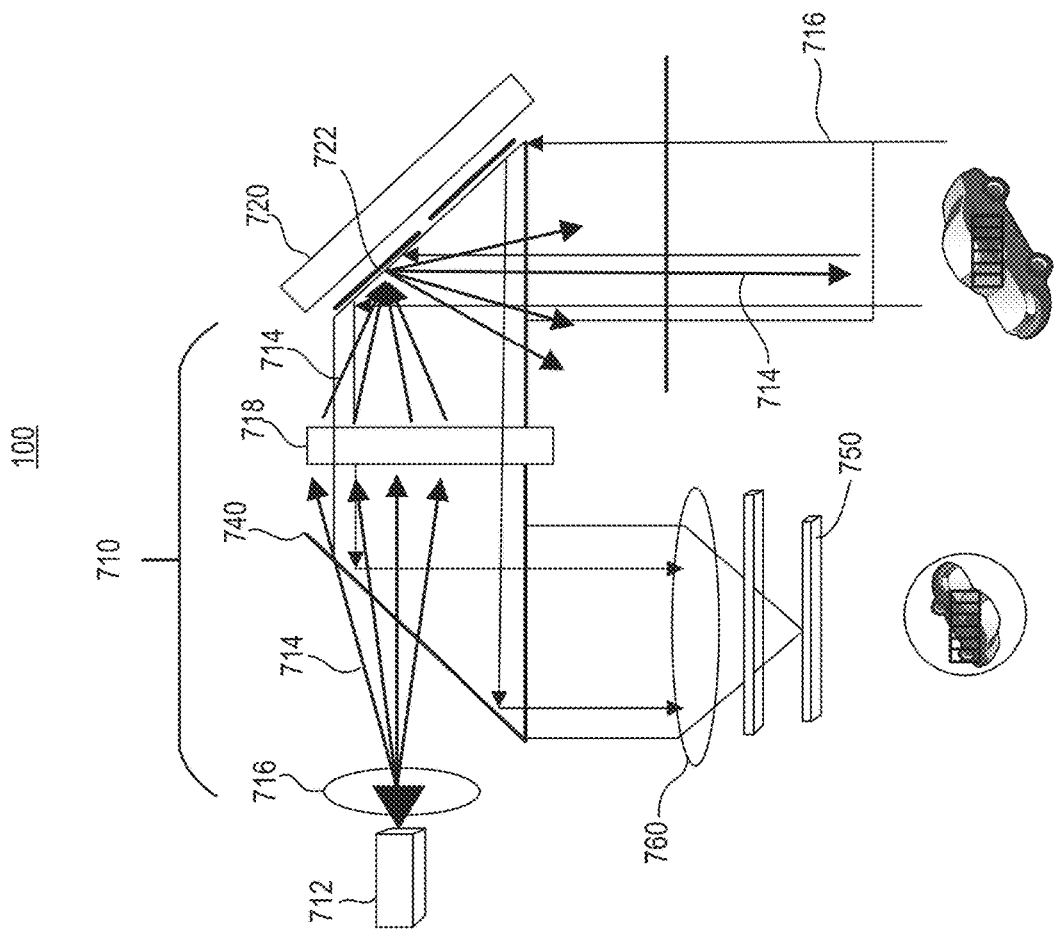
FIG. 7A is a diagram illustrates a schematic configuration of an exemplary disclosed LIDAR system consistent with some embodiments of the present disclosure.

FIG. 7A illustrates a schematic configuration of an exemplary disclosed LIDAR system 100 configured to generate multiple beams of emitted light, steered by scanning mirrors, and sensed on a single detector, enabling scanning of a Field of View (FOV) of +/−50 degrees (Horizontal), all on the same optical path with a single set of optical parts. As illustrated in FIG. 7, laser light beams 714 may be emitted from a quad laser array 712. The laser light beams 714 may be generated by multiple laser emitters, a laser bar/array, or by a single laser beam split into multiple beams. Laser beams 714 may be directed to the scanning mirrors 720 (e.g., a MEMs scanner) by a system of lenses 716 and folding mirrors 718 (e.g., optical system 710). Laser beams 714 may be steered by way of scanning mirrors 720. The reflected light 716 may enter LIDAR system 100 and may be directed to a dichroic mirror (polarizing splitter) 740, and then focused onto a single detector 750 with lens 760. As illustrated in FIG. 7A, each of beams 742 may be directed via shared optical parts (e.g., 716, 718, 720, 740, etc.), reducing the number of components and thus the cost for LIDAR system 100.

Figure 7B:
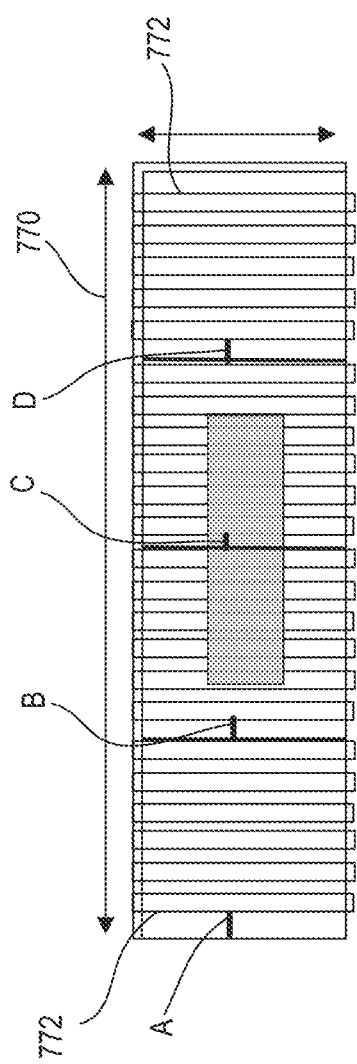
FIG. 7B is a diagram illustrating vertical scanning of a field of view consistent with some embodiments of the present disclosure.
Figure 7C:
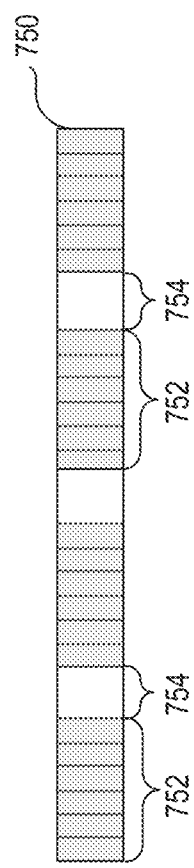
FIG. 7C is a diagram illustrating an example of a detector, having active areas separated by inactive areas consistent with some embodiments of the present disclosure.

FIG. 7B illustrates a FOV (100 degrees×15 degrees) 770, which may be scanned vertically. Scanning mirrors 720 may direct laser beams 714 along scan lines 772. Reflected laser beams 714 from positions along scan lines 772 may be directed towards detector 750. FIG. 7C illustrates an example of detector 750, having active areas 752 separated by inactive areas 754. As illustrated in FIG. 7C, detector 750 may detect spots (e.g., A, B, C, D) of reflected laser beams 716. As also illustrated in FIG. 7C, each active area 752 may have a plurality of pixels or channels (e.g., 6 channels shown in FIG. 6). Although vertical scan lines have been illustrated in FIG. 7B, it is contemplated that LIDAR system may additionally or alternatively be configured to scan FOV 770 along horizontal scan lines. Furthermore, the number or spots and/or pixels discussed above is exemplary and non-limiting and each active area 752 may have any number of channels and detector 750 may be configured to detect any number of spots of reflected laser beams 716. As illustrated in FIGS. 7A-7C, the disclosed monostatic configuration may transmit and receive a plurality of beams on the same optical path, saving many optical components and multiple MEMs modules, with a FOV of 100×15 degrees.

A LIDAR system, including some of the above features is disclosed. By way of example, FIGS. 1A, 2A-2G, 3C, 3D, 4A, 4B, and 7A illustrate an exemplary LIDAR system 100 consistent with this disclosure. In some embodiments, the LIDAR system may include a laser emission unit configured to generate a plurality of laser beams. In some embodiments, the LIDAR system may include an optical system configured to transmit the plurality of laser beams from the laser emission unit to a common scanning unit. As discussed above, LIDAR system 100 may include laser emission unit 102 (e.g., projecting unit). In some embodiments, laser emission unit may include one or more light sources that may be laser light sources. As also discussed above, one or more of the laser light sources may include, for example, one or more laser diodes 202A that may be configured to emit one or more beams of laser light 204. It is contemplated that the disclosed LIDAR system 100 may include laser emission unit 102 configured to emit two or more beams of laser light (see e.g., FIGS. 2B, 2C, 2E, 2F, etc.). It is contemplated that in some embodiments, LIDAR system 100 may include a laser light source in the form of a laser array, and the laser array may include two or more laser emitters. Various laser sources may be employed. For example, laser sources associated with the laser array may include pulsed lasers having a wavelength of 860 nm-950 nm. Multiple laser sources may be included in the laser array, and the array may be arranged in a 1-D pattern or 2-D pattern. Laser sources arranged in a 1-D configuration may include a laser bar array including multiple (e.g., two or more) laser sources.

Figure 8:
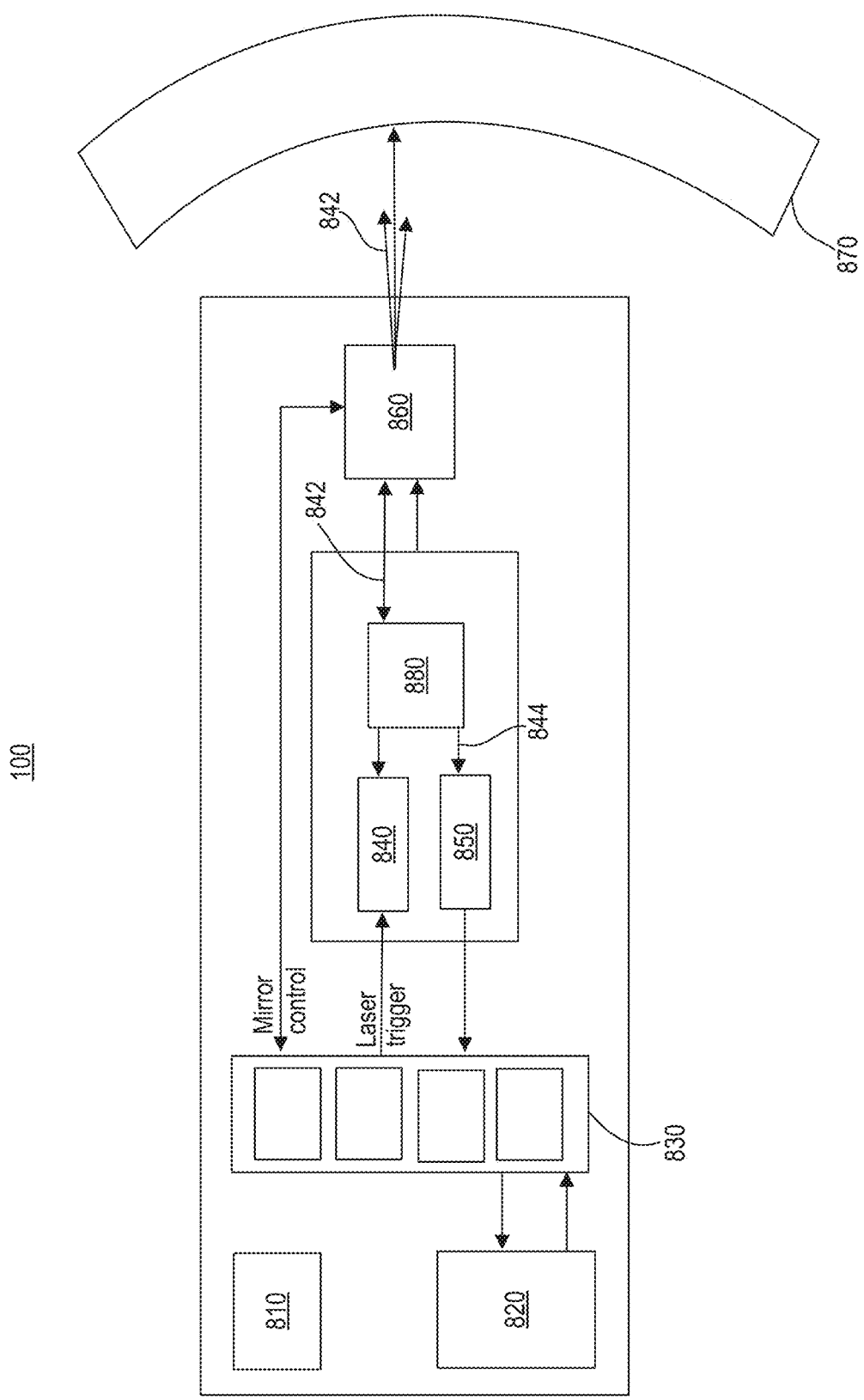
FIG. 8 is a high-level block diagram of an exemplary architecture for an exemplary LIDAR system consistent with some embodiments of the present disclosure.

FIG. 8 illustrates a high-level block diagram of an exemplary architecture for LIDAR system 100. As illustrated in FIG. 8. LIDAR system 100 may include power supply 810, controller 820, optical module 830, laser array 840, sensor array 850, and scanner 860. As also illustrated in FIG. 8, light beams 842 from laser array 840 may be incident upon 2-D scanner 860 that may direct the light to FOV 870. Reflected light beams 844 returning from the FOV 870 may be received at 2-D scanner 860, which may direct reflected light beams 844 to sensor array 850, which may be configured to detect reflected light beams 844. Controller 820 may perform time of flight calculations to determine distances to various objects in the FOV 870, and a point cloud of distance values may be generated for each scan of FOV 870. In some embodiments, a common optical components 880 may be used both to transmit laser light 842 emitted from laser array 840 to 2-D scanner 860 and toward FOV 870 and to direct reflected light 842 received at 2-D scanner 860 from FOV 870 to sensor array 850. Such an arrangement may provide significant advantages in terms of reduced complexity, lower cost, reliability, and performance. This arrangement may additionally reduce blooming artifacts compared to a continuous detector array and laser array scheme, since the laser beams are optically separated, and the active areas on the detector are separated.

In some embodiments, the laser emission unit may include a plurality of laser emitters. For example, as illustrated in FIGS. 2B, 2C, 2E, laser emission unit 102 may include a plurality of laser emitters 112A-112F that may be configured to project two or more beams of laser light. In some embodiments, the laser emission unit may include a single, monolithic laser array including a plurality of laser emitters. By way of example, laser emission unit 102 may include a plurality of laser emitters (e.g., 112A-112F) fabricated on a single silicon wafer. Thus, laser emission unit may be in the form of a monolithic laser array. The term monolithic laser array refers to an array of laser light sources fabricated on a single (e.g., monolithic) silicon wafer. Because the laser light sources are fabricated on a single silicon wafer, the laser light sources on the monolithic laser array may be well aligned with each other. FIG. 9A illustrates an example of a monolithic laser array 900 including a plurality of laser emitters (e.g., 912, 914, 916, etc.). In some embodiments, the monolithic laser array comprises a one-dimensional laser array. By way of example, as illustrated in FIG. 9A, laser array 900 may be a one-dimensional laser array including active regions 912, 914, 916, etc. (e.g., laser emitters), arranged in a single column. It is contemplated, however, that in some embodiments, laser array 900 may be a two-dimensional laser array, including active regions separated from each other and arranged in a two-dimensional matrix. In some embodiments, the plurality of laser emitters may be edge emitters. For example, one or more of laser emitters 912, 914, 916, etc., in laser array 900 may include edge emitter lasers. It is contemplated, however, that one or more of laser emitters 912, 914, 916, etc., may include other types of laser emitters (e.g., vertical-cavity surface-emitting laser (VCSEL)). In some embodiments, each of the plurality of laser beams may be a pulsed laser beam with a wavelength between 860 nm and 950 nm. For example, as discussed above one or more of laser emitters 912, 914, 916, etc., may be a pulsed laser emitter configured to emit a pulsed laser having a wavelength of between 860 nm-950 nm. It is also contemplated that in some embodiments, the one or more laser emitters 912, 914, 916, etc., may be configured to emit laser light having a wavelength of between 1300 nm-1600 nm.

In some embodiments, the monolithic laser array may include a plurality of active regions corresponding to the plurality of laser emitters and a plurality of inactive regions, wherein the plurality of laser emitters are spaced apart from one another by one or more of the plurality of inactive regions. A monolithic laser array may include a plurality of active regions (e.g., laser light emitting regions or laser emitters) separated from each other by inactive regions (e.g., non-laser emitting inactive regions). As illustrated in FIG. 9A, for example, laser array 900 may include a plurality of (e.g., 8) laser light emitting regions or laser emitters 912, 914, 916, 918, 920, 922, 924, and 926. Laser array 900 may also include a plurality of inactive regions (e.g., non-laser emitting regions) 901-909. It is contemplated that adjacent active regions may be separated by one or more inactive regions. For example, as illustrated in FIG. 9A, active regions 914 and 916 may be separated by inactive region 902. Likewise, active regions 920 and 922 may be separated by inactive region 905. It is contemplated that more than one inactive region may be disposed between the active regions. For example, as illustrated in FIG. 9A, active regions 922 and 924 may be separated by inactive regions 906, 907. Each active region may correspond to a channel. Thus, for example, FIG. 9A illustrates a laser array 900 having 8 channels. It is contemplated that laser array 900 may have any number of channels.

In some embodiments, the monolithic laser array may include 4 active laser channels. In some embodiments, the monolithic laser array may include 8 active laser channels. In some embodiments, the monolithic laser array may include 16 active laser channels. In some embodiments, the monolithic laser array may include 32 active laser channels. For example, a laser array may include 16 laser sources arranged in a 1-D array, each laser source having a wavelength of about 905 nm. The light emitted from the laser sources may travel through various optical components associated with the optical path, including, e.g., lenses, collimators, etc. FIG. 9B illustrates an exemplary monolithic laser array 950 that may include 16 or 32 active regions 956. For example, as illustrated in FIG. 9B, monolithic laser array 950 may include active laser emitting regions 956 (e.g., $n_1$-$n_{32}$) with adjacent pair of active laser emitting regions 956 spaced apart by one or more non-laser emitting inactive regions 958 (e.g., $m_1$-$m_{31}$). The example of a FIG. 9B includes 16 laser channels (or 16 laser light sources in the array). Other numbers of laser sources may be used. For example, some embodiments may include 4, 8, 32, 64 laser sources, or any other desired number of laser sources.

In some embodiments, the plurality of laser emitters may include multiple monolithic laser arrays. By way of example, instead of fabricating a single laser array having 32 active regions, it may be possible to fabricate two monolithic laser arrays each having 16 active regions. For example, as illustrated in FIG. 9B, laser array 950 may include monolithic laser arrays 960 and 962. Laser array 960 may include active regions (e.g., laser emitters) 956 (e.g., $n_1$-$n_{16}$) spaced apart by inactive regions 958 (e.g., $m_1$-$m_{15}$). Similarly, laser array 962 may include active regions (e.g., laser emitters) 956 (e.g., $n_{17}$-$n_{32}$) spaced apart by inactive regions 958 (e.g., $m_{16}$-$m_{31}$). As also illustrated in FIG. 9B, monolithic laser arrays 960 and 962 may both be fabricated on the same wafer. Alternatively, monolithic laser arrays 960 and 962 may be fabricated on different wafers or on different portions of the same wafter. Laser arrays 960 and 962 may be diced from the wafers and then assembled adjacent to each other to form a single 1-D laser array 950. Laser arrays 960 and 962 may be assembled via a suitable manufacturing or assembly process (e.g., bonding) to precisely align laser arrays 960 and 962.

The laser light sources may also be arranged in various configurations within the 1-D array. In some embodiments, a ratio of active regions to inactive regions in the monolithic laser array may be 1:1. For example, in some embodiments, a 1-D laser array may be configured to operate with a 1:1 ratio of active laser channels to inactive interstitial space between the laser channels. This may be accomplished in several ways. For example, 16 laser channels may be arranged in a 1-D array 1000 such that each pair of adjacent laser sources may be separated by an interstitial inactive space of equal size as each laser source. As a result, as illustrated in FIG. 10A, the 1-D array may include an alternating and repeating sequence of one laser source 1010 adjacent to one interstitial inactive space 1020 in the array. As illustrated in FIG. 10A, the laser source 1010 and interstitial inactive region 1012 may be similarly sized (e.g., approximately 0.01 mm×0.1 mm, or 0.001 mm×0.1 mm). After the laser beam is emitted, each beam may be collimated by one or more collimators 1112. Once the beam is collimated, its size spot size in far field may be expressed as an angular size. Thus, for example, as illustrated in FIG. 10A, beams emitted from laser array 1000 of FIG. 10A may have an angular width of 0.1° after being collimated and a spacing between adjacent collimated beams may be 0.2°. Non-limiting examples of angular beam spot sizes are e.g., 0.07 degrees×0.11 degrees, 0.1×0.05, or 0.1×0.1 degrees, or 0.1×0.2 degrees, or 0.1×0.4 degrees. Although laser array 1000 includes 16 such units, other 1:1 ratio array configurations may also be used. For example, as illustrated in FIG. 10B, eight active laser channels 1020 may be interleaved by eight similarly or differently sized inactive spaces 1022. As illustrated in FIG. 10B, the laser source 1020 and interstitial inactive region 1022 may be similarly sized (e.g., 0.01 mm×0.2 mm). By way of another example, as illustrated in FIG. 10C, four active laser channels 1030 may be interleaved by four similarly or differently sized inactive spaces 1032. As illustrated in FIG. 10C, the laser source 1030 and interstitial inactive region 1032 may be similarly sized (e.g., 0.01 mm×0.4 mm). In each case, the power of the laser sources may be selected to provide a desired total power. In one example, the sixteen-channel array may include sixteen 30 W laser sources, the eight-channel array may include eight 60 W laser sources, and the four-laser source array may include four 120 W laser sources, all yielding a total maximum power of 480 W. The emitters may have any suitable power level (e.g., between 20 W to 200 W).

Figure 10H:
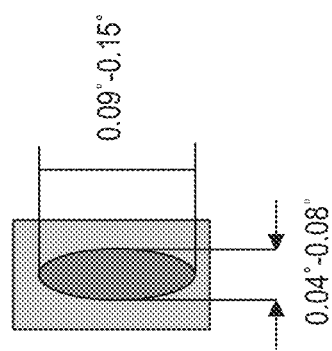
FIG. 10H is a diagram illustrating an exemplary magnified image of a spot generated by a laser beam consistent with some embodiments of the present disclosure.
Figure 10G:
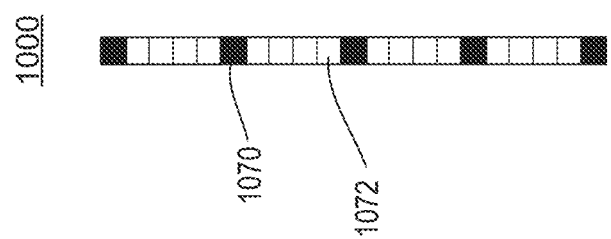

In some embodiments, a ratio of active region width to inactive region width in the monolithic laser array may be 1:2. In addition to a 1:1 array, as represented by FIGS. 10A-10C, a 1:2 ratio array may also be used. For example, as represented in FIGS. 10D-10F, each of the example arrays described above may include interstitial inactive spaces of two times the width of each laser source. Thus, in each of the 16-channel, 8-channel, and 4-channel array examples, each pair of laser sources may be separated by an inactive space with twice the width of one of the laser sources. Thus, for example, as illustrated in FIG. 10D, each laser source 1040 may have a width of 0.05 mm whereas each inactive space 1042 may have a width of about 0.1 mm (e.g. 110 microns). By way of another example, as illustrated in FIG. 10E, each laser source 1050 may have a width of 0.1 mm whereas each inactive space 1052 may have a width of about 0.2 mm. Likewise, as illustrated in FIG. 10F, each laser source 1060 may have a width of 0.2 mm whereas each inactive space 1062 may have a width of about 0.4 mm. Other ratios of the laser source and inactive space are also contemplated. In some embodiments, a ratio of active regions to inactive regions in the monolithic laser array may be 1:3. In some embodiments, a ratio of active regions to inactive regions in the monolithic laser array may be 1:5. In some embodiments, a ratio of active regions to inactive regions in the monolithic laser array may be within a range of 1:1 to 1:10. FIG. 10G illustrates an example where the ratio of the active to inactive regions is 1:5. In this example, each active laser source is separated by an inactive space having a width equal to five times the width of one of the laser sources. For example, as illustrated in FIG. 10G, each laser source 1070 may have a width of about 0.1 mm whereas each inactive space 1072 may have a width of about 0.5 mm.

In some embodiments, the two or more of the inactive regions in the monolithic laser array may have different dimensions relative to one another. Although both the inactive and active regions of a laser array have been described above as being of equal size, it is contemplated that different active regions in a laser array may be of different sizes. Thus, for example, as illustrated in FIG. 9B, inactive region $m_1$ of laser array 950 may have a width $w_1$ that may be different from width $w_2$ of inactive region $m_2$ of laser array 950. As another example, as illustrated in FIG. 9B, active region $n_{16}$ of laser array 950 may have a width $w_3$ that may be different from width $w_4$ of active region $n_{31}$ of laser array 950.

In some embodiments, an overall length ($L_1$) of the monolithic laser array may be between 0.5 mm to 20 mm. In another exemplary embodiment, an overall length of monolithic laser array 900 may range from 1 mm to 6 mm, although other lengths are also contemplated.

By way of example, as illustrated in FIG. 9A, an overall length of monolithic laser array 900 may be $L_1$. An overall length of the monolithic laser array may be determined based on, for example, a size of the silicon wafer, a number of beams of laser light desired from the monolithic laser array, and/or other size consideration such as a size of laser light projection system. It is contemplated that an overall length $L_1$ of monolithic laser array may range from a few tens of μm to hundreds of μm. In one exemplary embodiment, an overall length of monolithic laser array 900 may range from 0.5 mm to 20 mm The ratio of active laser sources to inactive interstitial spaces in the laser array may be achieved in any suitable way. In some cases, each laser source may be spaced apart by an inactive material (e.g., any non-laser emitting material). In another example, however, the ratios may be obtained by using an array of closely packed laser sources electronically controlled in a manner to provide a desired spacing ratio (e.g., to meet the requirements of a particular application, a particular sensing situation, eye safety requirements, etc.). In some embodiments, the laser emitters may be configured to be activated by a common trigger signal supplied to each of the plurality of laser emitters. For example, as illustrated in FIG. 8, each active region of laser array 900 may be caused to emit laser light when subjected to a trigger signal. It is contemplated that a single trigger signal may be supplied to each active region (e.g., 912-926, 956, 1020, 1030, 1040, 1050, etc.) causing each of the active regions to emit laser light at the same time. For example, it is contemplated that a single voltage pulse may be supplied to a plurality of active regions of laser arrays 900 or 1000. After receiving the voltage pulse, each active region (e.g., 912-926, 956, 1020, 1030, 1040, 1050, etc.) that receives the voltage pulse may simultaneously emit a pulse of laser light. In some embodiments, the laser emission unit may include a plurality of laser emitters, and wherein each of the plurality of laser emitters can be individually and separately activated. As discussed above, laser emission unit 102 may include one or more laser emitters 112A-112F. Alternatively, laser emission unit 102 may include one or more of laser arrays 900 and/or 1000 that may each include a plurality of active regions or laser emitters (e.g., 912-926, 956, 1020, 1030, 1040, 1050, etc.) As also discussed above, each of the active regions may be configured to emit laser light when it receives a triggering signal, for example, a voltage pulse. Thus, each of the laser emitting active regions (e.g., 912-926, 956, 1020, 1030, 1040, 1050, etc.) may be individually and/or separately activated by supplying a voltage pulse individually or separately to each of the active regions (e.g., 912-926, 956, 1020, 1030, 1040, 1050, etc.)

In some embodiments, the laser emission unit may include a plurality of laser emitters, wherein a sub-group of one or more laser emitters among the plurality of laser emitters may be activated without activating a remainder of the plurality of laser emitters. For example, the laser array may include, for example, 32 active laser channels that may be operated in various ratio modes. Thus, a 32 channel laser array may be operated in a 1:1 active to inactive space arrangement by activating every other channel together (16 channels), while leaving the interleaving 16 laser sources inactive. In one operational mode, a voltage pulse may be provided to only one set of 16 channels, while no voltage pulse may be provided to the remaining 16 channels. In this case, the first set of 16 laser sources that receive the voltage pulse may emit laser light while the second set of 16 laser sources that do not receive a voltage pulse may remain inactive.

In some embodiments, the plurality of laser emitters may be activated according to a random emission timing protocol. As discussed above, the one or more laser emitters (e.g., 912-926, 956, 1020, 1030, 1040, 1050, etc.) may be configured to emit a laser light pulse after receiving a trigger signal such as a voltage pulse. By controlling the time at which the voltage pulses are delivered to one or more of the laser emitters (e.g., 912-926, 956, 1020, 1030, 1040, 1050, etc.), it may also be possible to control the time at which laser pulses are emitted from the one or more laser emitters (e.g., 912-926, 956, 1020, 1030, 1040, 1050, etc.). Thus, for example, in another mode, the two groups of 16 interleaving channels in a 32 channel laser array may be alternatingly activated in a 1:1 ratio arrangement. For example, a first set of 16 channels may be activated at time $t_1$. After a period of time, the second set of 16 channels may be activated at time $t_2$. The alternation may occur at a pulse frequency of the laser sources or at any multiple of the pulse frequency (or according to any other timing pattern).

In some embodiments the plurality of laser emitters may be activated selectively, depending on the position of the array with respect to the field of view. For example, if at a specific orientation of the scanner, a first subset of the plurality of laser emitters is directed outside the FOV, while a second subset of the plurality falls within the FOV, the first subset may be controlled to stop emitting, while the second subset may continue to be activated.

In some embodiments, the plurality of laser emitters may be activated such that two or more of the plurality of laser emitters have a pulse rate that differs from one another. As discussed above, by controlling the timing at which the voltage pulses are delivered to one or more of the laser emitters (e.g., 912-926, 956, 1020, 1030, 1040, 1050, etc.), it may also be possible to control the timing at which laser pulses are emitted from the one or more laser emitters (e.g., 912-926) Thus, for example, by delivering voltage pulses at a different pulse rates to selected ones of the laser emitters (e.g., 912-926, 956, 1020, 1030, 1040, 1050, etc.), the rate at which laser light is emitted from the selected emitters may also be different.

In some embodiments, the plurality of laser emitters may be activated such that two or more of the plurality of laser emitters have an intensity level that differs from one another. The intensity of laser light emitted by each of laser emitters (e.g., 912-926, 956, 1020, 1030, 1040, 1050, etc.) may depend on a voltage level of the trigger signal or voltage pulse delivered to each of laser emitters (e.g., 912-926, 956, 1020, 1030, 1040, 1050, etc.). Thus, for example, by providing trigger signals or voltage pulses having different voltage levels to different laser emitters (e.g., 912-926), the different laser emitters may be activated to emit laser light pulses of different intensity.

Similar operations may be employed to achieve active to inactive ratios other than 1:1. For example, to provide a 1:2 ratio, each of a set of 8 active laser sources may be spaced apart from one another by 2 inactive laser sources. In one mode of operation, the inactive laser sources may remain inactive while laser light pulses are emitted from the eight active sources. In other cases, the set of eight (or other number) active lasers may be varied among the set of 24 total laser sources (while maintaining a spacing between active lasers of two inactive lasers) on any desirable timing pattern (e.g., alternating pulses, a multiple of pulses, etc.). Similar operation schemes may be employed in 1:5 ratio arrays or with arrays operated with any other desired ratio.

It should also be noted that a particular laser array may be operated with different active to inactive ratios at different times. For example, during one scan of the FOV or sub-region of the FOV, an array may be operated with a 1:1 ratio. During another scan of the FOV or another sub-region of the FOV, a different ratio (e.g., 1:2; 1:4; 1:5; etc.) may be used.

Further, the laser sources selected to be active during a particular clock cycle may be predetermined or may be randomized, while maintaining a desired active to inactive spacing ratio.

Various conditions may be used to determine the active to inactive ratio used. In some cases, the ratio may remain fixed. In other cases, however, the ratio selected may be triggered based on a detection event. For example, detection of a pedestrian may warrant selection of a higher ratio of inactive space to active space, e.g., to increase a margin of eye safety. Various other event triggers may also be used to select a desired spacing ratio.

As noted, many different laser array configurations may be used according to the requirements of a particular application. Referring again to FIGS. 10D-10F, a particular laser source array may include 16, 8, or 4 channels, among many other possible numbers of channels. These channels may be configured as part of a fixed laser array, where each laser source (e.g., 1040, 1050, 1060) may be positioned at a desired distance from its neighboring laser source in order to generate beams spaced apart by an angular distance. For eye safe configurations, for example, this angular distance may be at least about 5.2 mrad. In some embodiments, the inactive spaces (e.g., 1042, 1052, 1062) between laser sources (e.g., e.g., 1040, 1050, 1060, respectively) may include any non-light emitting material. In other cases, however, a laser array 1000 may be comprised of closely spaced laser sources with little to no non-light emitting material between each laser source in the laser array. Such embodiments may provide a significant level of flexibility, as the sources of the laser array may be selectively operated according to the requirements of a particular application.

In some embodiments, for example, in FIGS. 10D-10F, a particular laser array may include 48 closely spaced laser sources (or any number of laser sources). In the particular example shown, each laser source may generate a beam with angular dimensions of 0.1 degrees×0.05 degree after collimation. In some cases, all laser sources may be activated simultaneously. In other cases, every other laser source may be operated during an illumination event (e.g., a single, clock-timed pulse from selected laser sources from among the array). Operation of every other laser source in the closely spaced laser array would provide a 1:1 ratio of active to inactive spaces. Similarly, every third laser source may be operated during an illumination event in order to provide a 1:3 ratio of active to inactive space (as shown in the leftmost example below). In this particular example, where each closely spaced laser source may generate a beam spot with an angular dimension of 0.1 degrees×0.05 degrees, operating every third laser source may result in a spacing between active laser sources of about 0.15 degrees (or about 2.6 mrad).

In another example, as illustrated in FIG. 10E, laser array 1000 may include the same laser source array as described above (i.e., an array of 48 closely spaced lasers each having an angular dimension of 0.1 degrees×0.05 degrees). In this example, a 1:2 ratio of active space to inactive space may be achieved by illuminating together the first two lasers in each group of six (e.g., lasers 1, 2, 7, 8, 13, 14, etc.) and leaving the remaining lasers inactive. In this case, each group of two illuminated lasers may have total angular dimensions of 0.1 degrees×0.1 degrees, and spacing between active laser groups may be 0.3 degrees, or about 5.23 mrad (which may reduce emission levels, or satisfy a particular standard for eye safety).

In FIG. 10F, a 1:2 ratio of active to inactive space may be achieved by illuminating together the first four lasers in each group of 12 (e.g., lasers 1, 2, 3, 4, 13, 14, 15, 16, etc.) and leaving the remaining lasers inactive. In this case, each group of four illuminated lasers may have total angular dimensions of 0.1 degrees×0.2 degrees, and spacing between active laser groups may be 0.4 degrees, or about 7 mrad (which may satisfy a particular standard for eye safety).

In some embodiments, each of the plurality of laser beams produces an elongated spot having an angular width of between 0.002 degrees and 0.2 degrees and having an angular length of between 0.02 degrees and 0.2 degrees. For example, when a laser beam emitted from a laser array is incident on an object in the field of view, the beam may produce a spot of laser light on the object. A shape of the emitted beam (spot) may be symmetrical, or elongated in one axis. Elongation may enhance eye safety in some cases. FIG. 10H illustrates an exemplary magnified image of a spot generated by a laser beam emitted from, for example, laser array 900. As illustrated in FIG. 10H, the spot may have an angular width of between 0.04 degrees and 0.08 degrees and an angular length of between 0.09 degrees and 0.15 degrees. To further promote eye safety, the ratio of active to inactive spacing in the laser array (e.g., 950, 1000) may be selected to preserve a minimum angular spacing between active laser beams. The minimum spacing may be determined by a government or safety standards organization, for example. In some cases, the minimum angular spacing between beams may be 5 mrad, or about 0.29 degrees.

In some embodiments, the laser emission unit may include a laser emitter configured to generate a primary laser beam; and a beam splitter configured to split the primary laser beam into a plurality of sub-beams that provide the plurality of laser beams. In some embodiments, the optical system may include a beam splitter. Although laser arrays capable of generating multiple laser beams have been described above, it is also contemplated that in some embodiments, laser emission unit 102 of LIDAR system 100 may include laser emitter 112 configured to generate a primary laser beam, and a beam splitter configured to split the primary laser beam into two or more sub-beams that may provide the desired plurality of laser beams. It is contemplated that the beam splitter may include one or more prisms, partially silvered mirror, deflector with a dichroic optical coating, etc.

Figure 14A:
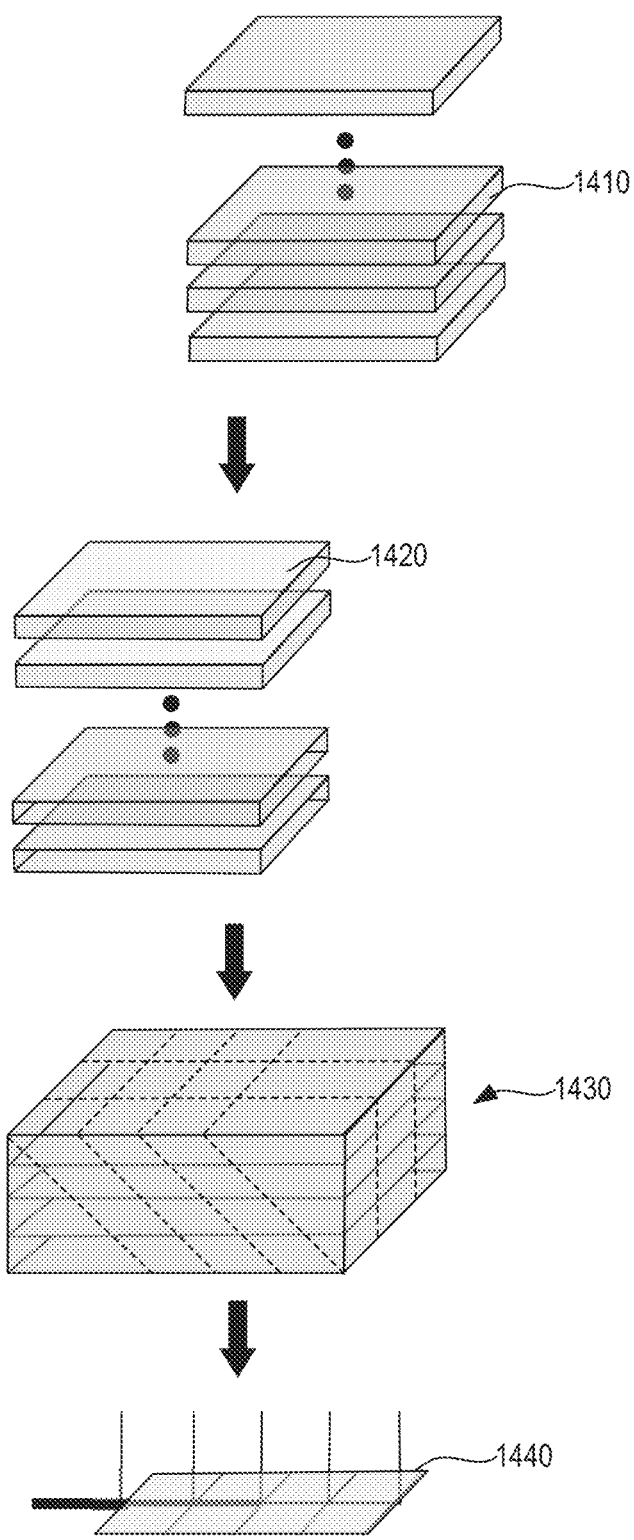
FIGS. 14A and 14B are diagrams, illustrating example beam splitters consistent with some embodiments of the present disclosure.

FIG. 14A illustrates an example beam splitter 1440 that may include a plurality of stacked, coated glass plates arranged at a 45 degree angle relative to an initial laser beam. Rather than a typical fabrication technique of cutting, coating, and then gluing, beam splitter 1440 of FIG. 14A may be fabricated by coating individual glass plates 1410 to provide a desired reflectivity. The coated plates 1420 may be stacked and bonded into a stack 1430 of bonded plates. Stack 1430 may then be cut into individual beam splitters 1440. Steps for producing an N-splitter may include: 1) beginning with N−1 flat glass plates 1410; 2) coating one side of each plate for a desired reflectivity to prepare coated plates 1420; 3) coating the backside of the last plate with a ~100% reflective coating; 4) stacking all plates together into stack 1430 and glue them with a non-refractive glue; and 5) cutting the plates in three dimensions (dashed lines as shown in FIG. 14A) to provide the individual beam splitters 1440.

Figure 14B:
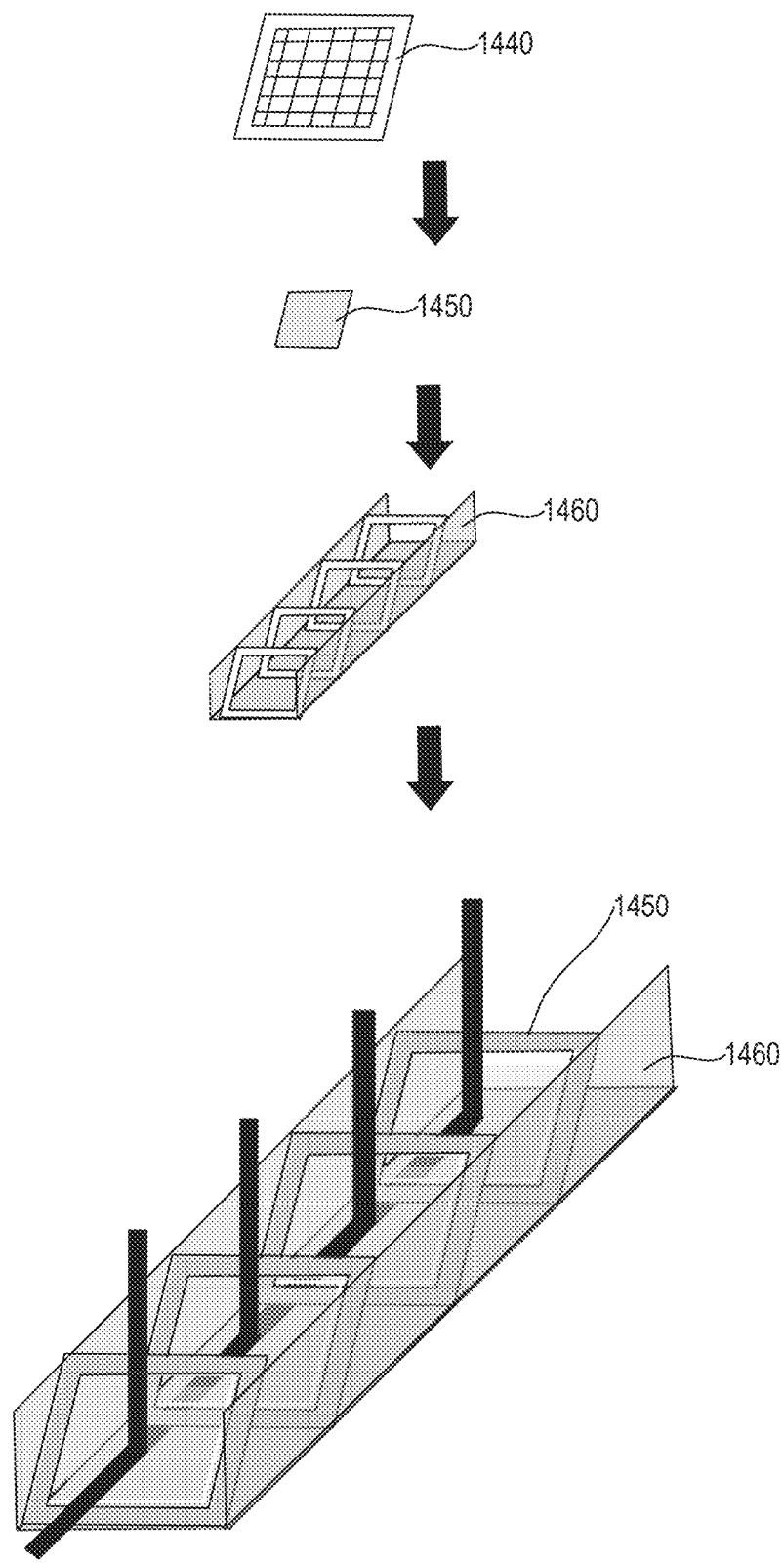

Another type of beam splitter that may be used in conjunction with the presently disclosed embodiments includes a molded barrel with dielectric-coated partially reflective tilted mirrors, as shown in FIG. 14B. In this embodiment, a laser beam may be split when transmitted through a partially reflective mirror, and when such mirrors are placed in series, the incident laser beam may be split multiple times. The power ratios may be determined by the partial reflectivity factor of each mirror and may be controlled with adapted AR coatings. Such a configuration may include a half open molded barrel with sockets for the tilted mirrors. Each mirror may be window-shaped, and it may be cut from a larger coated glass plate. Production steps for fabricating such a beam splitter may include: 1) beginning with N thin glass plates 1440; 2) dielectric-coating one side of each plate for a desired reflectivity, and coating the other side with an AR ~0.5% reflective coating; 3) cutting the mirrors as small window-shaped pieces 1450 from each plate; 4) molding the barrel 1460; and 5) bonding the mirrors 1450 to the molded barrel 1460.

Figure 14C:
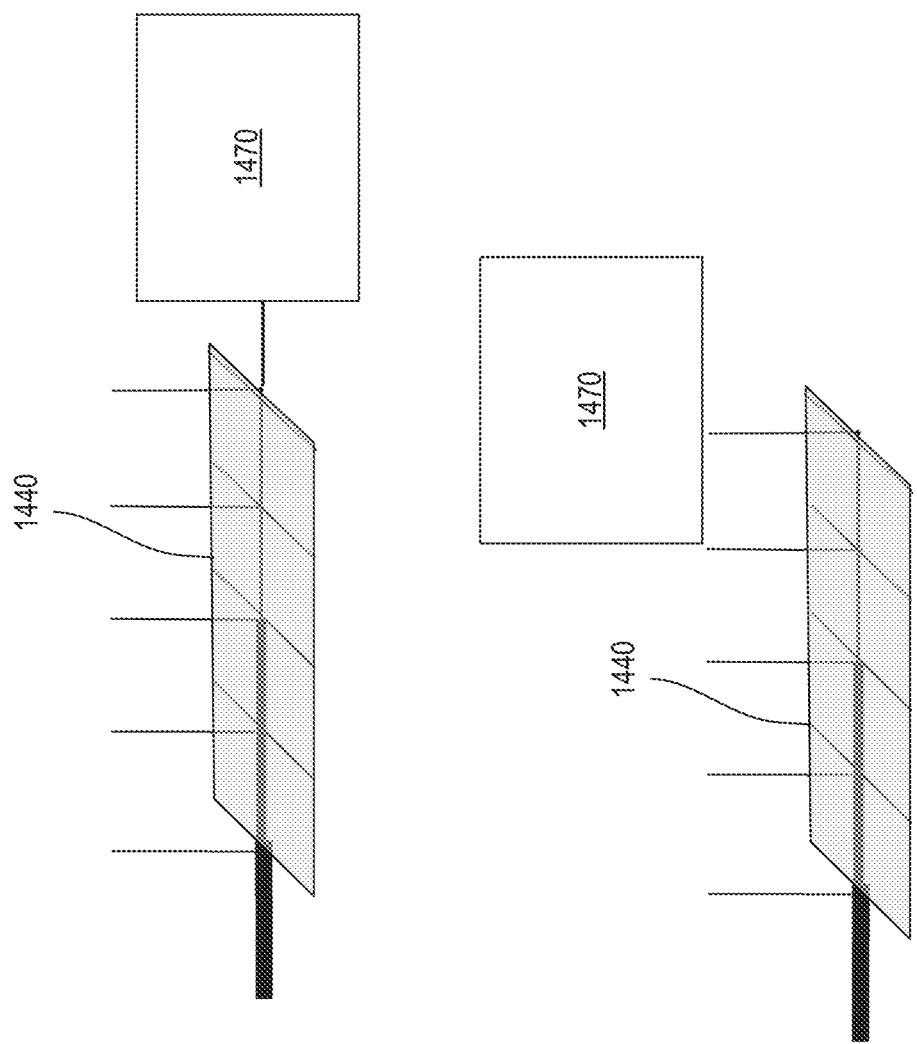
FIG. 14C is a diagram illustrating a port of an exemplary beam splitter used for monitoring power of a laser beam consistent with some embodiments of the present disclosure.

In some embodiments, a power meter may be integrated into the described multi-beam splitters. For example, one port of the splitter may be used for monitoring the power of the laser. In a multi-port splitter configured to split an incident laser beam into N sub-beams, the splitter may include N+1 ports, where one port may be used to monitor the power of the laser, detect any irregularities, etc. The detector 1470 (PD) for monitoring the power may be positioned on axis with the laser emitter (to detect transmitted light) or alternatively may be oriented at a different angle to detect reflected light from the beam splitter, as shown in FIG. 14C.

In one embodiment, an incident laser beam may be split into four equal sub-beams, and a fifth port may be used to monitor laser power, etc. The beam needed for monitoring the power, however, need not have an intensity similar to the split sub-beams. For example, in one embodiment, a residual beam after splitting may represent about 2% of the incident laser beam power/intensity, where the residual beam may be used for laser monitoring. This example, may be provided using coatings having the reflection and transmission ratios at the four interfaces, as shown in Table 1, below.

TABLE 1

| Reflection | Transmission |
|---|---|
| 0.245 | 0.755 |
| 0.3245 | 0.6755 |
| 0.4804 | 0.5196 |
| 0.9245 | 0.0755 |

Figure 11A:
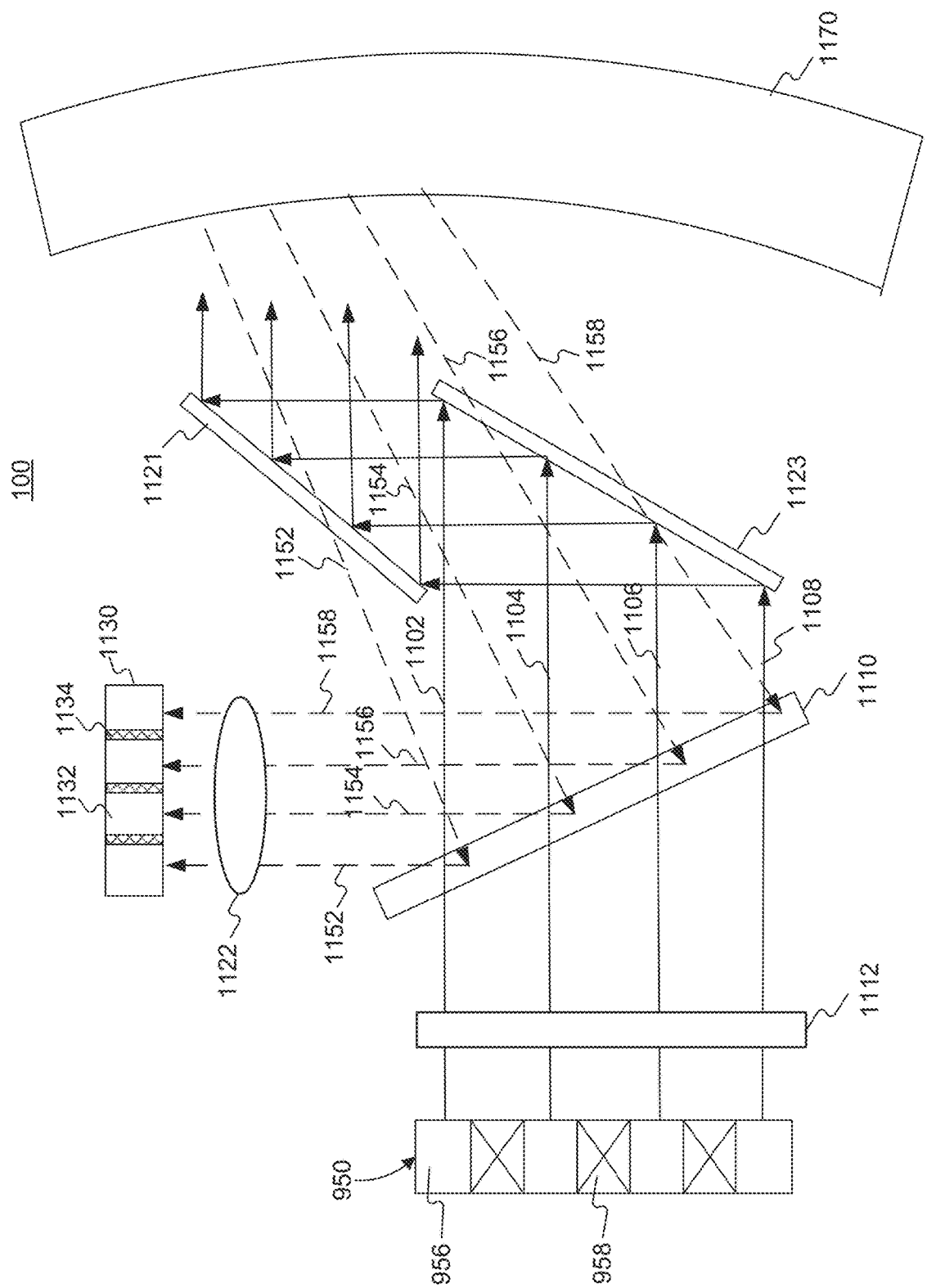
FIGS. 11A and 11B are diagrams illustrating exemplary LIDAR systems including beam splitters consistent with some embodiments of the present disclosure.

In some embodiments, the beam splitter may be configured to transmit each of the plurality of laser beams and to re-direct a plurality of reflected beams received from the field of view of the LIDAR system. FIG. 11A illustrates an exemplary LIDAR system 100 including beam splitter 1110. As illustrated in FIG. 11A, LIDAR system 100 may include monolithic laser array 950 configured to emit one or more beams of laser light (e.g., 1102, 1104, 1106, 1108). The one or more beams of laser light may be collimated by one or more collimators 1112 before beams 1102, 1104, 1106, and/or 1108 are incident on beam splitter 1110. Beam splitter 1110 may allow laser light beams 1102, 1104, 1106, and/or 1108 to pass through and be incident on deflectors 1121, 1123, which may be configured to direct laser light beams 1102, 1104, 1106, and/or 1108 towards FOV 1170. Although only two deflectors 1121, 1123 have been illustrated in FIG. 11A, it is contemplated that LIDAR system 100 may include more than two deflectors 1121, 1123 configured to direct one or more of the light beams 1102, 1104, 1106, and/or 1108 towards FOV 1170. One or more objects in FOV 170 may reflect one or more of the light beams 1102, 1104, 1106, and/or 1108. As illustrated in FIG. 11A, the reflected light beams may be represented as laser light beams 1152, 1154, 1156, and/or 1158. Although reflected laser light beams 1152, 1154, 1156, and/or 1158 are illustrated in FIG. 11A as being directly incident on beam splitter 1110, it is contemplated that some or all of light beams 1152, 1154, 1156, and/or 1158 may be directed by deflectors 1121, 1123 and/or another deflector towards beam splitter 1110. When light beams 1152, 1154, 1156, and/or 1158 reach splitter 1110, splitter 1110 may be configured to direct reflected light beams 1152, 1154, 1156, and/or 1158 received from FOV 1170 towards detector 1130 via lens 1122. Although FIG. 11A illustrates four light beams being emitted by monolithic laser array 950, it is contemplated that monolithic laser array 950 may emit any number of light beams (e.g., less than or more than four).

Figure 11B:
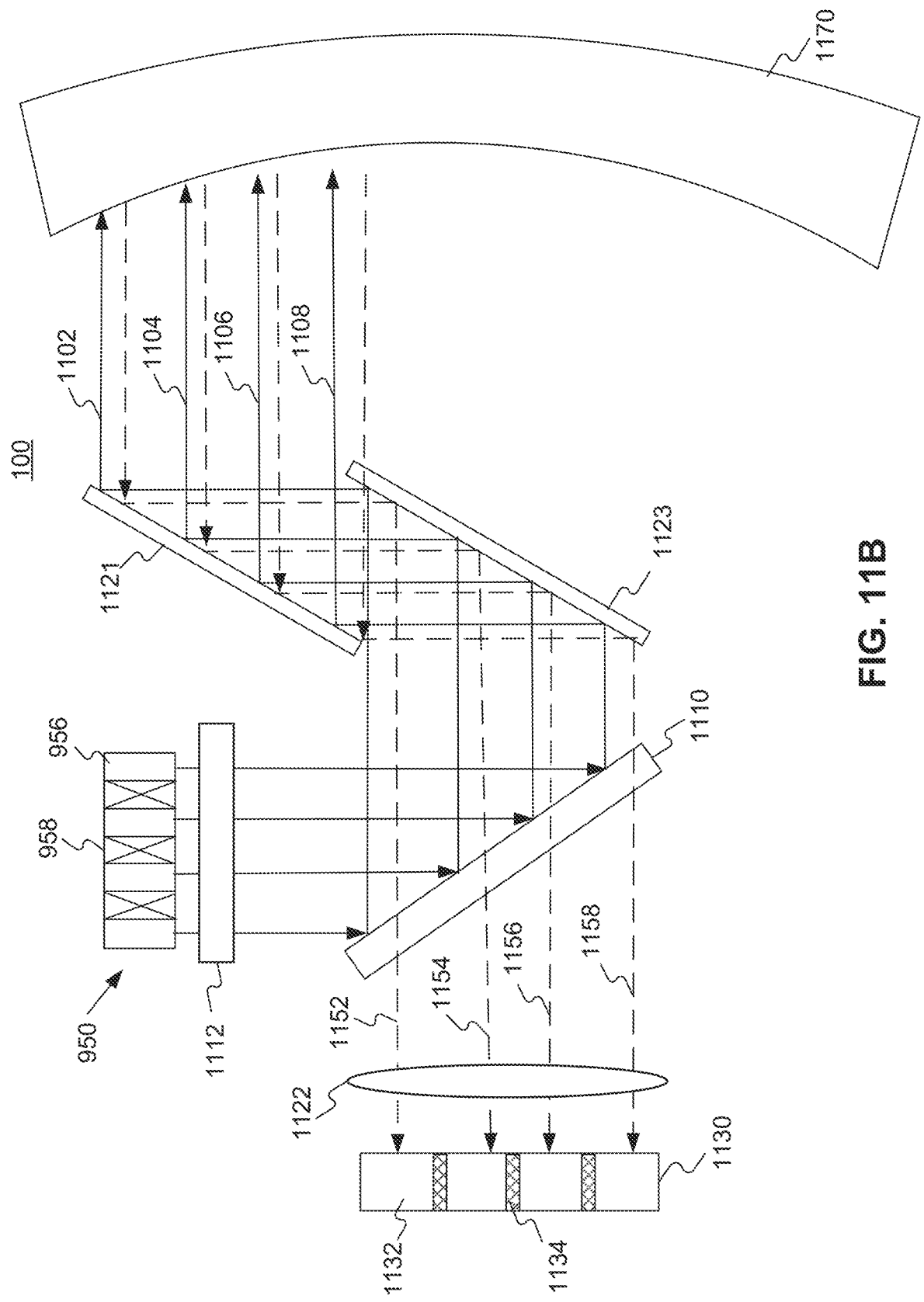

In some embodiments, the beam splitter is configured to re-direct each of the plurality of laser beams and pass a plurality of reflected beams received from the field of view of the LIDAR system. By way of example, FIG. 11B illustrates an exemplary LIDAR system 100 that may include monolithic laser array 950, collimator 1112, beam splitter 1110, deflector 1121, 1123, lens and/or optical filter 1122 and detector 1130. As illustrated in FIG. 1B, monolithic laser array 950 may emit one or more laser light beams 1102, 1104, 1106, and/or 1108 that may be collimated by one or more collimators 1112 before being incident on beam splitter 1110. Beam splitter 1110 may be configured to direct one or more of the laser light beams 1102, 1104, 1106, and/or 1108 towards deflectors 1121, 1123, which in turn may be configured to direct the one or more laser light beams 1102, 1104, 1106, and/or 1108 towards FOV 1170. As discussed above, one or more objects in FOV 1170 may reflect one or more of the laser light beams 1102, 1104, 1106, and/or 1108. Reflected laser light beams 1152, 1154, 1156, and/or 1158 may be directed by deflectors 1121, 1123 to be incident on beam splitter 1110. It is also contemplated that some or all of reflected laser light beams 1152, 1154, 1156, and/or 1158 may reach beam splitter 1110 without being directed by deflector 1121, 1123 towards beam splitter 1110. As illustrated in FIG. 11B beam splitter 1110 may be configured to allow the reflected laser light beams 1152, 1154, 1156, and/or 1158 to pass through beam splitter 1110 towards detector 1130. One or more lenses and/or optical filters 1122 may receive the reflected laser light beams 1152, 1154, 1156, and/or 1158 and direct these light beams towards detector 1130. Although FIG. 11B illustrates four light beams being admitted by monolithic laser array 950, it is contemplated that monolithic laser array 950 may emit any number of light beams (e.g., less than or more than four).

In some embodiments, the optical system may include at least one folding mirror upon which the plurality of laser beams are made incident. By way of example, as illustrated in FIG. 7A. LIDAR system 100 may include optical system 701 that may include folding mirror 718. Folding mirror 718 may be configured to receive one or more laser beams 714 from quad laser array 712. In some embodiments, the optical system may include at least one collimation lens configured to collimate the plurality of laser beams. For example, as illustrated in FIG. 7A, optical system 701 may include collimator 716 configured to direct laser beams 714 towards folding mirror 718. By way of another example, as illustrated in FIGS. 11A and 11B. LIDAR system 100 may include collimator 1112 configured to receive one or more laser beams (e.g., 1102, 1104, 1106, 1108) from laser array 950 and direct the received laser beams towards beam splitter 1110. In some embodiment, the optical system may include a receiving lens system configured to receive the plurality of laser beams. For example, one or more of collimators 716 or 1112 may include a receiving lens system configured to receive one or more of the laser beams emitted by laser array 712 or 950, respectively.

In some embodiments, the common scanning unit may be configured to project the plurality of laser beams toward a field of view of the LIDAR system to simultaneously scan the field of view along a plurality of scan lines traversing the field of view. In some embodiments, the LIDAR system may include a scanning unit configured to receive the plurality of laser beams, wherein the common scanning unit is configured to project the plurality of laser beams toward a field of view of the LIDAR system. As discussed above with reference to FIGS. 7A and 8, LIDAR system 100 may include a scanning unit (e.g., 720, 860). In some embodiments, the common scanning unit may include a light-transmissive scanning prism. In some embodiments, the common scanning unit may include a diffraction based scanner. In some embodiments, the common scanning unit may include a liquid crystal on silicon scanner. In some embodiments, the common scanning unit may include a single biaxial scanning mirror upon which the plurality of laser beams are made incident. In some embodiments, the common scanning unit includes a pair of single-axis scanning mirrors. Scanning unit 720, 860 may include a variety of optical components configured to direct laser light towards the field of view. For example, scanning unit 720, 860 may include one or more light-transmissive scanning prisms, diffraction elements, liquid crystal deflectors, MEMs mirrors, etc. As also discussed above, the two or more beams, resultant from beam splitter (e.g., 220 or 1110) or the laser array (900, 950, etc.) may be made incident on a scanning mirror device (e.g., 720, 860). The scanning mirror device may include a single mechanically actuated bi-axial scanning mirror. Alternatively, the scanning mirror device may include two or more mirrors, or transparent scanners. This configuration may provide two important benefits relative to traditional LIDAR systems: 1) each of the beams may be spaced apart, and may have an intensity such that it falls below an eye safety threshold, such that LIDAR system 100 is eye safe at any range; and 2) providing the beams to a single scanning mirror (e.g., 720, 860) such that the beams projected from the scanning mirror to the FOV are vertically or horizontally arranged relative to one another may offer an extended vertical FOV, as compared to single beams incident on a scanning mirror or multi-beam per mirror systems that lack vertical spot orientation in the FOV.

In some embodiments, the biaxial scanning mirror is rotatable in two axes, including a tilt axis and a scanning axis. For example, scanning unit 720, 860 may include any type of scanning mirror arrangement, including any of the scanners described in the sections above. In some embodiments, scanning unit 720, 860 may include a MEMs mirror or an array of MEMs mirrors. The MEMS mirror may be rotatable about two axes that may be orthogonal. For example, scanning unit 720, 860 may include a MEMs mirror similar to the MEMS mirror of FIG. 3B, having two generally orthogonal axes of rotation. It is contemplated that one of the two axes may allow scanning unit 720, 860 to tilt (e.g., to direct laser beams in an up/down direction of FOV), and the other axis may allow scanning unit 720, 860 to scan (e.g., to direct laser beams in an left/right direction of FOV). The mirror of the biaxial, 2-D scanning may be actuated using a mechanical arrangement (e.g., motor driven actuation, magnetic actuation, etc.).

Figure 12A:
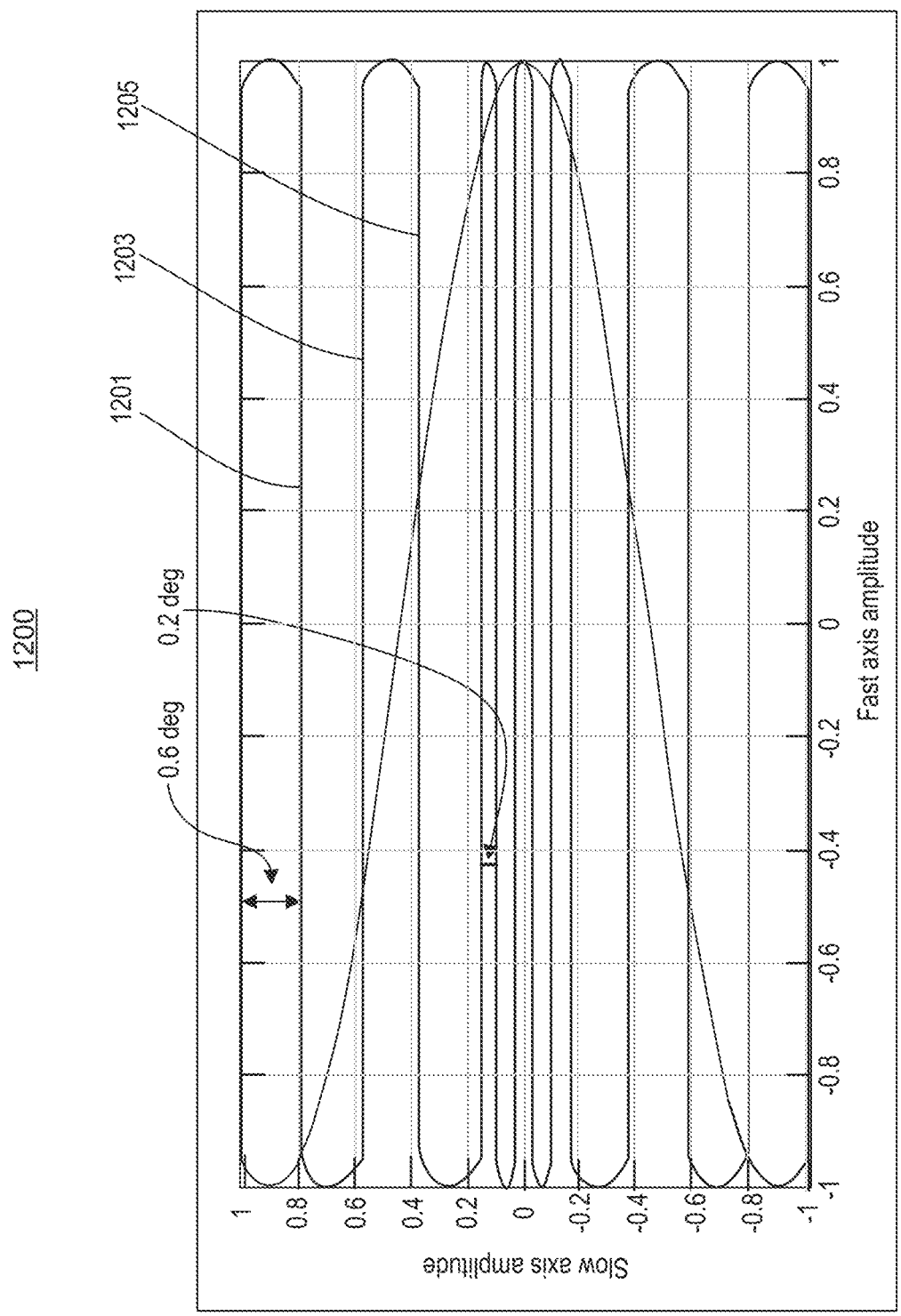
FIG. 12A is a diagram illustrating an exemplary scan pattern obtained using a 2-D scanning mirror consistent with some embodiments of the present disclosure.

In some embodiments, rotation of the biaxial scanning mirror about the scanning axis causes movement of the plurality of laser beams along a plurality of scan lines traversing the field of view of the LIDAR system. For example, in some LIDAR systems 100, a single laser source may be scanned over a LIDAR FOV using a scanner, such as a 2-D scanner (e.g., scanning unit 720, 860) as described above. FIG. 12A illustrates an exemplary scan pattern 1200 obtained using a 2-D scanning mirror (e.g., MEMs mirror(s) of FIG. 3B, or biaxial mechanically rotated mirror, etc.) that may direct laser light beams from a single laser source over the illustrated scan pattern. For clarity, it should be noted that the values on the axes are normalized to the maximum amplitude of the scan, such that the maximum amplitude is 1. For example, by sequentially rotating scanning unit 720, 860 about a scan axis, laser light beams may be directed along a plurality of points in a left-right direction as represented by scan line 1201. Further by sequentially rotating scanning unit 720, 860 about a tilt axis, laser light beams may be directed along a plurality of points in an up-down direction. The combined 2D movements of scanning unit 720, 860 may generate the scanning pattern of FIG. 12A, including scan lines 1201, 1203, 1205, etc.

As illustrated in FIG. 12A, the horizontal scan lines 1201, 1203, 1205 need not be evenly spaced. For example, to scan certain regions of the LIDAR FOV, such as the areas above and below the horizon region, a vertical tilt increment for the 2-D scanning mirror may be selected that is greater than a minimum available tilt increment. In the example shown, the regions above and below the center of the scan may be scanned with a vertical tilt increment different to that of the center of the scan. The center of the scan may, for example, be directed at the horizon. For example, the regions above and below the center of the scan may be scanned using a vertical tilt increment of 0.6° which may correspond, for example, to the entire laser array angular size, thus generating coarse sampling resolution equal to the laser pitch in the array. The laser pitch refers to the center-to-center distance between active laser light emitting regions of the laser array. In the region including the center of the scan, however, a minimum vertical tilt angle can be used to provide more closely spaced scan lines in that region and, in turn, higher sampling/point cloud resolution in that region. Assuming that a ratio of laser active area to non-active ratio is 1:N−1, the line spacing may be up N times more packed. In this example, the point cloud vertical resolution may depend on the line spacing while the horizontal resolution may depend on the frequency at which the single laser source is pulsed as the 2-D scanning mirror scans along each horizontal scan line. The higher the pulse frequency, the higher the potential horizontal resolution of the generated point cloud from the LIDAR system.

Figure 12B:
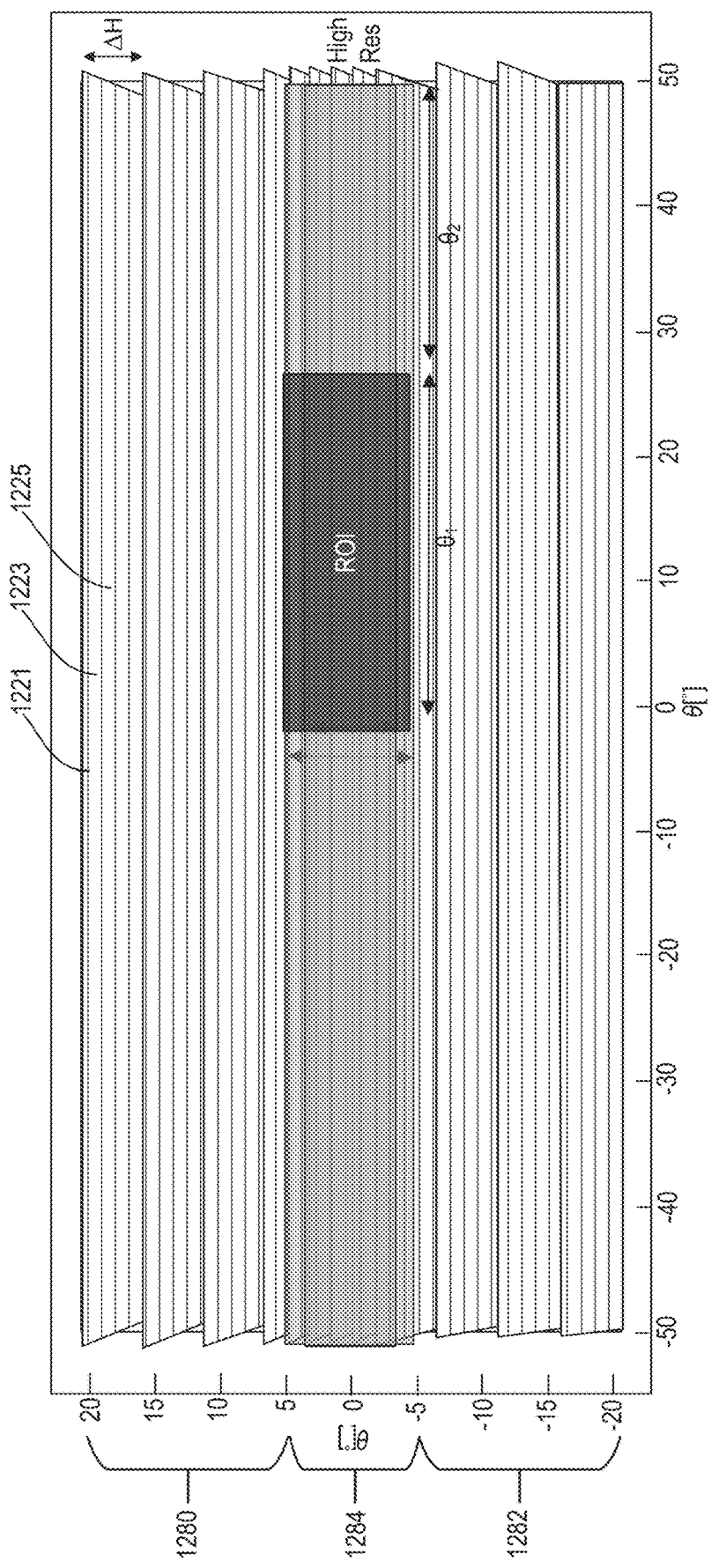
FIG. 12B is a diagram illustrating scan patterns obtained using a plurality of laser beams consistent with some embodiments of the present disclosure.

In some embodiments, rotation of the biaxial scanning mirror about the tilt axis may cause displacement of the plurality of laser beams from a first set of locations associated with a first plurality of scan lines to a second set of locations associated with a second plurality of scan lines. It is contemplated that in some embodiments of LIDAR system 100, rather than relying on a single laser light source, multiple laser light sources may be used. It is also contemplated that light beams from one or more laser sources may be split to provide multiple laser beams available for scanning. As also discussed above, a laser array (e.g., a 1-D laser array as described in the examples in the sections above) may be used to provide multiple laser beams for scanning a LIDAR FOV. When a plurality of laser light beams from either laser array (e.g., 950) or beam splitter (e.g., 220, 1110) are directed to scanning unit (e.g., 720, 860), rotation of the scanning unit 720, 860 about the scan axis may produce a plurality of horizontal scan lines traversing a first set of locations. Further, rotation of scanning unit 720, 860 about the tilt axis may shift the plurality of horizontal scan lines vertically, thereby generating a second set of scan lines traversing a second set of locations vertically spaced apart from the first set of locations. In some embodiments, a rate of rotation about the scan axis may be faster than a rate of rotation about the tilt axis. FIG. 12B illustrates scan pattern 1220 obtained using a plurality of laser beams. As illustrated in FIG. 12B, the plurality of laser beams may allow generation of horizontal scan lines 1221, 1223, 1225, etc. When scanning unit 720, 860 rotates about the tilt axis the horizontal scan lines (e.g., 1221, 1223, 1224, 1225, etc.) may be displaced in a vertical direction by a distance AH corresponding to the rotation of scanning unit (e.g., 720, 860) about the tilt axis.

In some embodiments, the common scanning unit may include a first single axis scanning mirror and a second single axis scanning mirror, and wherein the plurality of laser beams are made incident upon the first single axis scanning mirror before proceeding to the second single axis scanning mirror. Although scanning units 720, 860 capable of rotating about two axes of rotation are discussed above, in some embodiments, scanning units 720, 860 may include mirrors or deflectors capable of rotating only about one axis of rotation. By way of example, scanning units 720, 860 may include mirrors or deflectors similar to the mirror in FIG. 3A. In these embodiments, a first single axis scanning mirror may receive laser light beams from laser emission unit 102 and direct the laser light beams onto a second single axis scanning mirror, which may then direct the laser light beams towards the field of view.

In some embodiments, the first single axis scanning mirror may be configured to rotate about a scanning axis to cause movement of the plurality of laser beams along a plurality of scan lines traversing the field of view of the LIDAR system. In some embodiments, the first single axis scanning mirror may be configured to rotate about a tilt axis to cause displacement of the plurality of laser beams from a first set of locations associated with a first plurality of scan lines to second set of locations associated with a second plurality of scan lines. For example, by using a combination of two or more 1-D scanners, for example, by rotating the first and second single axis scanning mirrors about two different axes of rotation, a 2D scan similar to the scan patterns 1200 or 1220 may be generated. By way of example, FIGS. 11A and 11B illustrate a pair of deflectors 1121, 1123, one of which may be rotatable about a scan axis and the other of which may be rotatable about a tilt axis. For example, as illustrated in FIG. 11B, first single axis scanning mirror 1121 may be rotatable about a first axis (e.g., vertical axis, or scanning axis) in a left-right direction allowing laser beams 1102, 1104, 1106, 1108, etc. to generate horizontal scan lines similar to lines 1201, 1203, 1205, etc., illustrated in FIG. 12B. Furthermore, rotating second single axis scanning mirror 1123 about a second axis (e.g., axis perpendicular to the first axis, or tilt axis) may shift the scan lines 1201, 1203, 1205, etc., by a distance AH as illustrated in FIG. 12B.

In some embodiments, the field of view of the LIDAR system may have a vertical angular dimension of between 6 degrees and 90 degrees, and the field of view of the LIDAR system may have a horizontal angular dimension of between 20 degrees and 140 degrees. As discussed above scanning units 720, 860 may rotate about a scan axis and/or a tilt axis to project laser light over a desired field of view. Reflected laser light beams from the field of view may be detected to detect the presence of one or more objects in the field of view. The extent of the field of view may depend on many factors including the maximum rotation span of scanning units 720, 860 about their respective scan and tilt axes, divergence angle of the laser beams, and the angle between the plurality of laser beams projected from scanning units 720, 860. It is contemplated that in some exemplary embodiments, the field of view may extend over a scanning angle ranging between 20 degrees and 140 degrees and a tilt angle ranging between 6 degrees and 90 degrees. It is to be understood that the extent of the FOV is described in terms of world coordinates. For example, scanning units 720, 860 may include a 20×20 mm biaxial rotating mirror capable of providing a 140 degrees×44 degrees FOV.

In some embodiments, the scanning of the field of view of the LIDAR system may occur at a frame rate of between 5 Hz and 40 Hz. Thus, for example, scanning of the field of view may be repeated numerous times per second or per minute to be able to continuously detect any changing positions of one or more objects in the field of view. In one embodiment, scanning units 720, 860 may scan the field of view at a frame scan rate of 20 Hz (e.g., 20 time per second). It is to be understood that scanning unit 720, 860 may be configured to support a specific scan rate or a scan rate range up to 5-50 Hz depending on the requirements of a specific application). In one exemplary embodiment, 16 emitted, pulsed light beams may be projected from scanning units 720, 860 toward the FOV. The spots formed by the reflected laser light beams may have sizes of 0.07 degrees by 0.10 or 0.11 degrees. The vertical arrangement of the spots may depend on the configuration of the laser sources on the laser source array. For example, the amount of space between each laser source may result in corresponding spaces between the returned spots.

In one exemplary embodiment, the laser beam spot may have a vertical angular dimension of 0.1 degrees and may be spaced apart by about 0.2 degrees (or about a 2:1 ratio of open space to laser emitter). With 16 channels, the overall vertical pattern (or "comb") of light beams projected toward the FOV may occupy an angular height of about 4.6 degrees. This comb may be steered horizontally across the width of the FOV by the 2-D scanner (e.g., scanning units 720, 860), and the horizontal resolution may be determined by the scanning speed and the pulse rate of the laser sources. When the 2-D scanner reaches its horizontal limit, the 2-D scanner may be incremented vertically (e.g., rotated about the tilt axis) to continue with the horizontal scanning of the FOV on a new set of horizontal scan lines. Of course, other pulse rates, scan rates, laser sizes, laser spacing, etc., may be used in other examples. Additionally, while the disclosed example is described relative to a vertical comb pattern scanned horizontally over the FOV, some embodiments may employ a horizontally oriented light source array in which a horizontally oriented 1-D array of transmitted laser light spots are scanned vertically over the FOV. Further, 2-D arrays of laser sources may also be employed. The lasers may be arranged in a square or rectangular pattern or any other type of pattern (e.g., hexagonally packed, etc.). It is to be understood that the disclosed numerical values are exemplary and nonlimiting.

In some embodiments, the plurality of laser beams are made incident upon a common location of the single biaxial scanning mirror. By way of example, as illustrated in FIG. 7A, a plurality of laser light beams 714 may be directed to a common location 722 on MEMS mirror 720. It is contemplated, however, that in other embodiments, the plurality of laser light beams 714 may be directed to different portions of MEMS mirror 720. A rotation of MEMS mirror 720 may be adjusted to direct laser light beams 714 towards a field of view. The plurality of laser light beams directed by MEMS mirror 720 towards the field of view may be separated from each other by equal or unequal angles. It is contemplated that in some embodiments, the plurality of laser beams may be projected from the single biaxial scanning mirror with an angular spacing between adjacent beams of at least 2.5 mrad. It is also contemplated that in some embodiments the angular spacing may range between 2.5 mrad and 15 mrad.

In some embodiments, the LIDAR system may include at least one processor configured to control an orientation of one or more components of the common scanning unit to cause scanning of the field of view of the LIDAR system with the plurality of laser beams along a series of scan lines. For example, as discussed elsewhere in this disclosure, scanning units 720, 860 may be individually controlled by a processor (e.g., 118), such that scanning units 720, 860 may rotate towards a specific angle along each of one or two separate axes. By controlling scanning units 720, 860, processor 118 may be able to direct one or more of laser light beams toward different portions of the field of view, thereby allowing LIDAR system 100 to scan the field of view using one or more laser light beams as discussed above.

In some embodiments, the LIDAR system may include a detector configured to emit electrical signals in response to reflected beams received from the field of view of the LIDAR system. For example, as discussed above, LIDAR system 100 may include one or more detectors (e.g., sensing unit 116) configured to detect one or more objects in the field of view. Detector 116 may include a plurality of detection elements 402 for detecting laser light reflected back from field of view 120. The detector may be configured similar to any of the detectors discussed in the sections above. For example, in some embodiments, the detector may include an array of sensors (e.g., a multi-channel SiPM sensor array or SPAD array or an APD array). The detector may include an array of detector channels, SPADs, SIPMs, APDs, etc.

In some cases, the detector may be arranged in a 1-D configuration. In some embodiments, the detector may include a single, monolithic array of light sensitive active regions. For example, detector 116 may be a monolithic detector that may be fabricated on a single silicon wafer. FIGS. 11A and 11B illustrate an exemplary monolithic detector 1130. In some embodiments, the light sensitive active regions may be separated from one another by one or more inactive regions. For example, as illustrated in FIGS. 11A and 11B, monolithic detector 1130 may include a plurality of light sensitive active regions 1132 separated by inactive regions 1134. The sizes of active regions 1132 and 1134 may be equal or unequal.

In some embodiments, a ratio of light sensitive active regions to inactive regions in the detector is 1:1. For example, in some embodiments, a 1-D detector 1130 may be configured to operate with a 1:1 ratio of active to inactive regions. This may be accomplished in several ways. For example, as illustrated in FIG. 13A, detector 1130 may include n active regions ($n_1$ to $n_N$) and N−1 inactive regions ($m_1$ to $m_{N-1}$), and each pair of active regions may be separated by an inactive region. As illustrated in FIG. 13A, the 1-D detector may include an alternating and repeating sequence of active region 1310 adjacent to one inactive region 1312 in the array of equal size. Thus, the ratio of active to inactive regions may be 1:1.

In some embodiments, a ratio of light sensitive active regions to inactive regions in the detector is 1:2. In addition to a 1:1 array, as represented by FIG. 13A above, a 1:2 ratio array may also be used. For example, as represented in FIG. 13B, detector 1130 may instead include an alternating and repeating sequence of active region 1310 adjacent to an inactive region 1322, where the inactive region 1322 may have a width two times the width of each active region 1310. Other ratios of the laser source and inactive space are also contemplated. In some embodiments, a ratio of light sensitive active regions to inactive regions in the detector is 1:3. In some embodiments, a ratio of light sensitive active regions to inactive regions in the detector is 1:5. In some embodiments, a ratio of light sensitive active regions to inactive regions in the detector is in between 1:1 and 1:10. FIG. 13C illustrates an example where the ratio of the active to inactive regions is 1:5. In this example, each active region 1310 is separated by an inactive region 1324 having a width equal to five times the width of an active region 1310.

Any number of active and inactive regions may be present on monolithic detector 1130. For example, N for detector array 1310 in FIGS. 13A-13C, may range from 1 to any desired number. Thus for example, N may be 4, 8, 16, 32, 64, etc. In some embodiments, the detector may include 4 light sensitive active regions (e.g., N=4). In some embodiments, the detector may include 8 light sensitive active regions (e.g., N=8). In some embodiments, the detector may include 16 light sensitive active regions (e.g., N=16). In some embodiments, the detector may include 32 light sensitive active regions (e.g., N=32).

In some embodiments, two or more of the plurality of laser beams may have a divergence different from one another. Although each of laser beams (e.g., 714, 1102, 1104, 1106, 1108, etc.) have been illustrated in FIGS. 7A, 11A, 11B, etc., as a single line, each laser beam is expected to diverge once it emerges from laser illumination system 102. Thus, each laser beam 714, 1102, 1104, 1106, 1108 may be represented by a plurality of rays diverging from each other with increasing distance towards the field of view. It is also contemplated that an amount or angle of divergence of different laser beams (e.g., 714, 1102, 1104, 1106, 1108, etc.) may be equal or unequal. In some embodiments, each of the reflected beams may produce a beam spot incident upon two or more of the light sensitive active regions. The plurality of rays representing each laser beam may be reflected from the field of view. The plurality of reflected rays may form a spot on the detector (e.g., 1130). It is contemplated that in some embodiments the spot of reflected laser light beam rays may be incident on only one active region 1310 of, for example, detector 1130 or on more than one active region of detector 1130. FIG. 13A illustrates an exemplary spot 1350 that may be incident on more than one active region 1310 (e.g., n2, n3) of detector 1130. By ensuring that spot 1350 is incident on more than one active region 1310, it may be possible to ensure that more than one active region generates a signal corresponding to a detected object from which laser beams were reflected. The separate signals corresponding to a region on a detected object enables increased resolution for that region, i.e. each active region is a distinct pixel of a subregion within the region on the detected object.

In some embodiments, a ratio of a distance between the active regions and a distance between beam spots incident on the detector is a predetermined value. By way of example, a distance between beam spots produced by laser beams emitted from a laser array may be a predetermined multiple of a distance between active regions (e.g., 1132) of detector 1130. Thus, for example, a spacing between beam spots may be 0.5 times, 1.0 times, or 1.5 times the spacing between active regions 1132 of detector 1130. A size of each beam spot may also be a multiple of a size of active regions 1132. By way of example, each beam spot may be 0.5 times, 1.0 times, or 1.5 times a size of active region 1132. It is to be understood that the scaling factors 0.5, 1.0, 1.5, etc., are exemplary and non-limiting and other scaling factors are also contemplated.

In some embodiments, the LIDAR system may include an array of microlenses and/or a diffuser configured to direct the reflected beams to respective light sensitive active regions of the detector. When using multiple beams, detector 1130 can be configured such that each beam falls on one or more active regions of detector 1130. In these cases, it may be necessary for a pitch (e.g., center-to-center distance between active) of detector 1130 to correspond with a pitch between the active laser emitting regions on laser array 900, 950, etc. The space between active regions of detector 1130 may be "dead" space on the silicon, and it would be advantageous to minimize this dead space. Each time the emitter configuration changes (e.g., pitch, space between emitters, etc.), the detector configuration may need to be modified accordingly.

To address this issue, an "adaptor" for the beams may be provided to extend or project the beams to specific areas on the detector element. Doing so may allow the reflected laser light beams to generate an image on an adaptor plane instead of on a plane of detector 1130. The adaptor may include a mask and an element to extend or spread (diverge) the beam to the correct detection element. The element may be a diffuser, or may include one or more microlenses. Thus, for example an array of microlenses may be used to direct light received by the adaptor to the appropriate active regions of detector 1130. Using such an adaptor may enable detector 1130 to be extended to a larger size with (less dead space), over which the reflected laser light beams may be diffused. An additional advantage of this adaptor may be that it may decouple the dependence of the detector on the emitter configuration. If the pitch between the laser emitting active regions on, for example, laser array 900 or 950 is changed, an appropriate adaptor element may be used to direct the reflected laser light beams to active regions of detector 1130, instead of having to prepare an entirely new silicon fabricated detector.

Example Implementation: LIDAR System with Variable Resolution Multi-Beam Scanning by Changing Deflector Tilt Increments A LIDAR system may use an emitting system that emits two or more beams. In some embodiments, the LIDAR system may use a beam splitter to split a laser beam originating from a single light source into two or more beams. Alternatively, the emitting system may include a laser array, and the laser array may include two or more laser emitters that may generate the two or more beams of laser light. The two or more beams (resultant from the beam splitter or the laser array) may be made incident on a scanning device (e.g., a scanning mirror, prism, or other type of scanning device). In some cases, the scanning device may include a single bi-axial scanning mirror. Alternatively, the scanning device may include two or more mirrors, or transparent scanners. This configuration may provide certain benefits relative to traditional LIDAR systems such as: 1) each of the beams may be spaced apart such that the LIDAR system has improved eye safety at any range; and 3) the multi-beam system, including a plurality of aligned beams that may be generated together, may provide an ability to selectively control scanning resolution relative to the field of view or relative to portions of the field of view.

For example, the system may optionally be operated or configured to provide variable resolution in a vertical or horizontal direction, depending on whether the system employs horizontally oriented or vertically oriented scan lines to scan the field of view. In one embodiment, the spots resulting from a split laser beam may be equidistant from one another, and a scanning mirror may be associated with a minimum vertical tilt increment (e.g., 0.2 deg associated with a maximal resolution). In some cases, the scanning mirror may be operated using a greater than a minimum vertical tilt increment to generate scan lines of variable vertical spacing over selected regions of the FOV. In other cases, the beam may be split such that the resulting spots are not equidistant, but rather, may be more closely spaced along a vertical direction in a region overlapping a horizon. In still other embodiments, a combination of mirror tilt angle and spot spacing may enable overlapping or interleaving scan lines from two or more different spots to potentially enable scanning resolutions higher than a maximum resolution offered by a minimum vertical tilt increment of the mirror.

Such variable resolution may offer an opportunity to reduce processing overhead associated with each scan of the FOV. For example, a middle region (e.g., a region of interest or area of interest) of the FOV, which may be associated with regions near the horizon and may typically include more distant objects or higher densities of objects of interest, may be scanned with a relatively high resolution (e.g., using scans associated with more closely spaced vertically oriented laser spots and/or more closely spaced laser scan lines). In contrast, regions of the FOV farther from the horizon, which may include objects more closely located relative to the LIDAR, may be scanned with a lower resolution (e.g., using spots and/or scan lines that are more widely spaced). Additionally, the LIDAR system may include one or more light sources with the beams from each of the light sources being split into two or more split beams.

In some embodiments, the disclosed LIDAR system may include a laser emission unit configured to generate a plurality of laser beams; a scanning unit configured to receive the plurality of laser beams, wherein the common scanning unit is configured to project the plurality of laser beams toward a field of view of the LIDAR system; and at least one processor. The disclosed LIDAR system may include features similar to discussed above with respect to other disclosed LIDAR systems, such as those of FIGS. 7A, 8, 11A, 11B, etc. The 2-D scanner (e.g., 720, 860) may include any type of scanning device arrangement, including any of the arrangements described above. In some cases, the 2-D scanner may include a MEMs mirror or an array of MEMs mirrors. In other cases, a single, relatively large mirror (e.g., about 20 mm×20 mm, or 30 mm×18 mm) may be used. In some cases, the mirror of the biaxial, 2-D scanner may be actuated using a mechanical arrangement (e.g., motor driven actuation, magnetic actuation, etc.) In some cases a combination of two or more 1-D scanners and/or rotating polygons may be used to generate a 2-D scan.

In some embodiments, the LIDAR system may include a biaxial scanning mirror configured to receive the plurality of laser beams, wherein the biaxial scanning mirror is configured to project the plurality of laser beams toward a field of view of the LIDAR system. In some embodiments, the common scanning unit may include a single biaxial scanning mirror upon which the plurality of laser beams are made incident. In some embodiments, the biaxial scanning mirror is rotatable in two axes, including a tilt axis and a scanning axis. As discussed above, scanning units 720, 860 may include any type of scanning mirror arrangement, including any of the arrangements described in the sections above. In some embodiments, scanning units 720, 860 may include a MEMs mirror or an array of MEMs mirrors. The MEMS mirror may be rotatable about two axes that may be orthogonal. For example, scanning units 720, 860 may include a MEMs mirror similar to the MEMS mirror of FIG. 3B, having two generally orthogonal axes of rotation. It is contemplated that one of the two axes may allow scanning units 720, 860 to tilt (e.g., to direct laser beams in an up/down direction of FOV), and the other axis may allow scanning unit 720, 860 to scan (e.g., to direct laser beams in a left/right direction of FOV). Furthermore, in some embodiments, a rate of rotation about the scan axis may be faster than a rate of rotation about the tilt axis. Thus, the scan axis may be termed a fast axis, whereas the tilt axis may be termed a slow axis. It is to be noted that all laser emission units and scanning arrangements described above may be implemented in these disclosed embodiments of LIDAR system 100.

In some embodiments, the common scanning unit may include a first single axis scanning mirror and a second single axis scanning mirror, and wherein the plurality of laser beams are made incident upon the first single axis scanning mirror and subsequently made incident on the second single axis scanning mirror. As discussed above, in some embodiments, scanning units 720, 860 may include mirrors or deflectors capable of rotating only about one axis of rotation. By way of example, scanning units 720, 860 may include mirrors or deflectors similar to the mirror in FIG. 3A. In these embodiments, a first single axis scanning mirror may receive laser light beams from laser emission unit 102 and direct the laser light beams onto a second single axis scanning mirror, which may then direct the laser light beams towards the field of view.

In some embodiments, the plurality of laser beams may be projected from the common scanning unit such that the plurality of laser beams may be angularly equidistant from one another. In some embodiments, the plurality of laser beams are projected from the common scanning unit with an angular spacing between adjacent beams of at least 2.5 mrad to 6 mrad. As discussed above, for example, with respect to the exemplary scanning unit 720 of FIG. 7A, the plurality of laser light beams directed by the scanning mirror arrangement towards the field of view may be separated from each other by equal or unequal angles. It is contemplated that in some embodiments the angular spacing may range between 2.5 mrad and 6 mrad. In some embodiments, beam spots in the field of view of the LIDAR system resulting from the plurality of laser beams may be equidistant from one another. As discussed above, each of the plurality of laser beams directed towards the FOV may produce a beam spot in the FOV. As also discussed above, the plurality of beams may be separated from each other by equal or unequal angles. As a result the beam spots in the FOV formed by the plurality of laser beams may be equidistant when the beams are separated by equal angles.

In some embodiments, the LIDAR system may include a laser source in the form of a laser array. Light from the laser array may be made incident upon a 2-D scanner and projected to a LIDAR field of view (FOV). Light reflections returning from the FOV may be received at the 2-D scanner, which directs the reflected light to a sensor array, which detects the reflected light. Time of flight calculations may be performed to determine distances to various objects in the FOV, and a point cloud of distance values may be generated for each scan of the FOV. In some embodiments, a common optical path may be used both to transmit the laser light emitted from the laser array to the 2-D scanner and toward the FOV and to direct the reflected light received at the 2-D scanner from the FOV to the sensor array. Such an arrangement may provide significant advantages in terms of reduced complexity, lower cost, reliability, and performance.

Various laser sources may be employed. In some cases, the laser sources associated with the laser array include pulsed lasers having a wavelength of 860 nm-950 nm. In some cases, the laser sources may have a wavelength of about 905 nm. It is also contemplated that multiple laser sources may be included in a laser array, which may be arranged in a 2-D pattern or a 1-D pattern. In some cases, the laser sources may be arranged in a 1-D configuration to provide a laser bar array including multiple (e.g., two or more) laser sources.

In some embodiments, the laser emission unit may include a laser emitter configured to generate a primary laser beam, and a beam splitter configured to split the primary laser beam into a plurality of sub-beams that provide the plurality of laser beams. Various types of beam splitters may be used in the disclosed embodiments to produce two or more sub-beams from a single incident laser beam. In some cases, the disclosed embodiments may include a multiplied laser beam splitter (multi-splitter) to create a multichannel optical system from a single laser source. As an expansion of the classic beam-splitter, the multi-splitter may split a laser beam to a desired number of beams, with desired power ratios. The use of a single laser source may enable a significant reduction of the size of the system, power consumption, and optical components, while enhancing channel synchronization and correlation.

Multi-splitters may be used with lasers of various wavelengths, including 905 nm, 1550 nm, etc. employed by LIDAR systems. Multi-splitters may be made from an industrial dielectric material such as glass for VIS-NIR, GaAs for IR, silicon and various polymers, etc. In addition, either dielectric coatings or thin metal deposition may be used, depending on specific demands such as AOI range, transmission, temperature and polarization invariance, cost, etc. Multi-splitters may be free space beam splitter, or a waveguide (e.g. fiber) splitters, which may typically be selected for single mode 1550 nm lasers) Light from a laser is typically polarized, and the described beam splitters may be made polarization sensitive.

Figure 15:
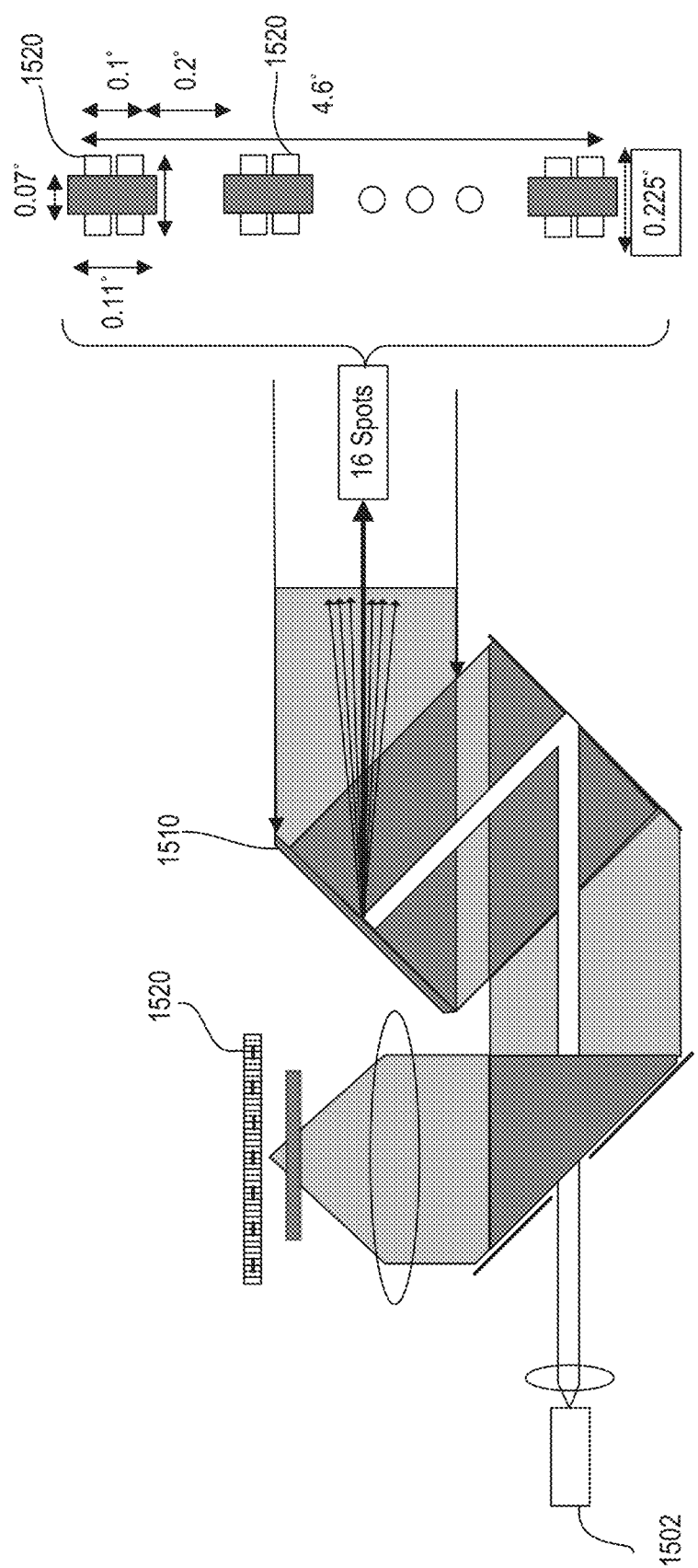
FIG. 15 is a schematic diagram illustrating an exemplary LIDAR system consistent with some embodiments of the present disclosure.

FIG. 15 provides additional details regarding an optical configuration of the disclosed LIDAR system 100. In this example, the laser source 1502 may include 16 laser emitters arranged in a 1-D array, each having a wavelength of about 905 nm. The light emitted from the 16 laser emitters may travel through various optical components associated with the optical path, including, e.g., lenses, collimators, etc. The 2-D scanner 1510 in FIG. 15 may include a 20×20 mm mirror capable of providing a 140 degrees×44 degrees FOV scanned at a frame scan rate of 20 Hz. The scanner may be configured to support a specific scan rate or a scan rate range up to 5-50 Hz depending on the requirements of a specific application. The 16 emitted, pulsed laser light beams may be projected from the 2-D scanner 1510 toward the FOV. As discussed above some or all of the beams projected towards the FOV may be reflected by one or more objects in the FOV. The reflected laser beams may form spots of laser light on a detector (e.g., 1520) associated with LIDAR System 100. As illustrated in FIG. 15, the spots of reflected laser light returned from the FOV may each have a size of about 0.07 degrees by 0.10 or 0.11 degrees. The reflected laser light spots may be received by detector 1520. The vertical arrangement of the reflected laser light spots may also depend on the configuration of the laser sources (or emitters) on the laser source array. For example, an amount of space between adjacent pairs of laser sources may result in a corresponding space between corresponding pairs of spots of laser light reflected from the FOV.

In some embodiments, the at least one processor may be programmed to cause the scanning unit to scan the field of view of the LIDAR system by directing the plurality of beams along a first plurality of scan lines traversing the FOV. In some embodiments, rotation of the biaxial scanning mirror about the scanning axis causes movement of the plurality of laser beams along the first plurality of scan lines and along the second plurality of scan lines traversing the field of view of the LIDAR system. As discussed above, scanning unit (e.g., 720, 860) may be configured to receive a single laser beam or a plurality of laser beams and direct the beam or beams to the FOV. As also discussed above, processor 118 may be configured to cause scanning unit 720, 860 to rotate about a scan axis to direct the laser beams in a left-right direction over portions of the FOV in the form of one or more scan lines (e.g., 1201, 1203, 1205, etc.) As also discussed above, when scanning unit 720, 860 receives a plurality of laser beams, scanning unit 720, 860 may be configured to rotate about a scan axis to direct the laser beams in a left-right direction over portions of the FOV in the form of one or more scan lines (e.g., 1221, 1223, 1225, etc.) in the form of a comb.

In some embodiments, the at least one processor may be programmed to displace the plurality of laser beams from a first set of locations associated with the first plurality of scan lines to a second set of locations associated with a second plurality of scan lines; and directing the plurality of laser beams along the second plurality of scan lines. In some embodiments, rotation of the biaxial scanning mirror about the tilt axis causes displacement of the plurality of laser beams from the first set of locations associated with the first plurality of scan lines to the second set of locations associated with the second plurality of scan lines. As further discussed above, processor 118 may cause rotation of scanning unit 720, 860 about the tilt axis, shifting the plurality of horizontal scan lines (e.g., 1221, 1223, 1225, etc.) vertically, thereby generating a second set of scan lines traversing a second set of locations vertically spaced apart from the first set of locations. FIG. 12B illustrates scan pattern 1220 obtained using a plurality of laser beams. As illustrated in FIG. 12B, the plurality of laser beams may allow generation of horizontal scan lines 1221, 1223, 1224, etc. When scanning unit 720, 860 rotates about the tilt axis the horizontal scan lines (e.g., 1221, 1223, 1224, etc.) may be displaced in a vertical direction by a distance AH corresponding to the rotation of scanning unit (e.g., 720, 860) about the tilt axis.

In some embodiments, a first plurality of scan lines and a second plurality of scan lines may be horizontally oriented relative to the field of view of the LIDAR system. As illustrated in FIG. 15, the laser sources may have a vertical angular dimension of 0.1 degrees and may be spaced apart by about 0.2 degrees (or about a 2:1 ratio of open space to laser emitter). With 16 channels, the overall vertical pattern of the plurality of light beams (or "comb" formed by the plurality of light beams) projected toward the FOV may occupy an angular height of about 4.6 degrees. This comb of laser light beams may be steered horizontally across the width of the FOV by rotating 2-D scanner 1510 about a scan axis, and the horizontal resolution may be determined by the scanning speed and the pulse rate of the laser sources. In one example, when 2-D scanner 1510 reaches its horizontal limit, 2-D scanner 1510 may be incrementally rotated vertically about a tilt axis to continue with the horizontal scanning of the FOV via a new set of horizontal scan lines.

Of course, a variety of pulse rates, scan rates, laser sizes, laser spacing, etc., may be used.

Although 1-D laser arrays have been discussed above, 2-D arrays of laser sources may also be employed. The lasers may be arranged in a square or rectangular pattern or any other type of pattern (e.g., hexagonally packed, etc.). It is also to be understood that scanner 1510 may be similar to one or more scanners (e.g., scanning unit 720 or 860) discussed above.

The example discussed above includes 16 laser channels (or 16 laser light sources in the array). Other numbers of laser sources may be used. For example, some embodiments may include 4, 8, 32, 64 laser sources, or any other desired number of laser sources. The laser light sources may also be arranged in various configurations within the 1-D array. FIGS. 10A-10G discussed above represent several example configurations of laser light sources arranged in a 1-D array.

The available resolution of a LIDAR system may depend upon many factors. In some cases (e.g., a single laser source system), the resolution may depend on factors including the mirror tilt increments used between scan lines and the laser pulse frequency used while scanning over the scan lines. In other cases, such as a multi-laser system, the available resolution may depend on the spacing between laser sources in a laser array (e.g., 950) in addition to the mirror tilt increments and the laser pulse frequency during scanning.

For example, in some LIDAR systems, a single laser source may be scanned over a LIDAR FOV using a scanner, such as a 2-D scanner as described above. As illustrated in FIG. 12A, a 2-D scanning mirror (e.g., MEMs mirror(s), biaxial mechanically rotated mirror, etc.) may be used to scan light from a single laser source over the FOV. Horizontal scan lines 1201, 1203, 1205, etc., may not be evenly spaced. For example, to scan certain regions of the LIDAR FOV, such as the areas above and below the horizon region, a vertical tilt increment for the 2-D scanning mirror may be selected that is greater than a minimum available tilt increment. In the example illustrated in FIG. 12A, the regions above and below the horizon may be scanned using a vertical tilt increment of 0.6 degree which may correspond, for example, to the laser pitch in the array, generating a coarse sampling resolution equal to the laser pitch in the array. In the region including the horizon, however, a minimum vertical tilt angle may be used to provide more closely spaced scan lines in that region and, in turn, higher point cloud resolution in that region.

In the illustrated example of FIG. 12A, the point cloud vertical resolution may depend on the line spacing while the horizontal resolution may depend on the frequency at which the single laser source is pulsed as the 2-D scanning mirror scans along each horizontal scan line. The higher the pulse frequency, the higher the potential resolution of the generated point cloud from the LIDAR system.

In some LIDAR systems, rather than relying on a single light source, multiple light sources may be used. In some cases, light beams from one or more laser sources may be split to provide multiple laser beams available for scanning. In some embodiments, a laser array (e.g., a 1-D laser array as described in the examples in the sections above) may be used to provide multiple laser beams for scanning a LIDAR FOV.

In a multi-beam system including a 2-D scanning mirror, the potential point cloud resolution may continue to depend on the tilt increment (e.g., the vertical tilt increment) with which the laser is driven, and the resolution may also depend on the pulse frequency with which the laser sources are driven. In the multi-beam system, however, the potential point cloud resolution available may also depend on the spacing of the laser sources or generated laser beams. As described below, some multi-beam systems may enable higher resolutions in regions of the FOV that may be of relatively greater interest and lower resolutions in regions of the FOV that may be of relatively lower interest. For example, for a laser source with N1 laser spots (e.g., N1 laser beams), each divided by N2 pixels with the detector, and laser [active:non-active] ratio of [1:N3−1], the highest resolution may be determined as follows: Res=line spacing/ (N1*N2*N3).

The described laser source arrays may be characterized by their effective angular dimension (e.g., the portion of a solid angle over which light from the array is projected toward the FOV). In the examples illustrated in FIGS. 10D-10F, each of the illustrated laser arrays 1000 may have an angular dimension of 2.4 degrees. Therefore, if during a scan of a LIDAR FOV, the scanning mirror is rotated about its tilt axis by 2.4 degrees between each scan pattern line, then the FOV will be scanned with horizontal scan lines spaced apart by an angular dimension dictated by the laser source spacing in each array. For example, the 4-channel array scanned at 2.4 degree vertical increments will result in horizontal scan lines separated by 0.6 degrees. The 8-channel array will provide horizontal scan lines separated by 0.3 degrees, and the 16-channel array will provide horizontal scan lines separated by 0.15 degrees.

It should be noted that the described laser arrays (e.g., the 16 laser source array) can be selectively operated with any number of active channels, and the number of active channels (e.g., active laser emitting sources) may be varied during a single frame scan of the LIDAR FOV, during a scanning along a single scan line of a scan pattern, or over any time interval or spatial region relative a LIDAR FOV scan.

The described laser arrays and scanning systems allow for the possibility of achieving horizontal scan line spacing even closer than the spacing between active laser emitters (or laser emitting regions) in the laser array. For example, in some embodiments, the scanning mirror may be controlled such that it rotates about its vertical tilt axis by an angular increment less than the angular dimension of the laser array (e.g., less than 2.4 degrees for the laser arrays of FIGS. 10D-10F). In such embodiments, controlled rotation of the mirror may provide scan patterns having horizontal line spacings about equal to the spacing between laser sources in the laser array. In some cases, the spacing between scan lines may correspond to an angular dimension of a single laser source in the array (e.g., 0.05 degrees in the 16 channel example, 0.1 degrees in the 8-channel example, and 0.2 degrees in the 4-channel example).

In some embodiments, a laser pulse rate associated with one or more of the plurality of laser beams may be constant over at least the first plurality of scan lines. In some embodiments, a laser pulse rate associated with one or more of the plurality of laser beams may vary over at least the first plurality of scan lines. As discussed above, the horizontal resolution obtained during each scan may be determined by the scanning speed (e.g., rate at which the scanning mirror is rotated about the scanning axis) and the pulse rate of the laser sources (e.g., rate at which laser light pulses are emitted from each laser emitting region of a laser array). It is contemplated that the pulse rate associated with one or more of the plurality of beams used to generate the scan pattern (e.g., the first plurality of scan lines) may be kept constant or may be varied during a single scan of the FOV. For example, a higher pulse rate may be used for some laser beams or over a portion of the FOV to get better resolution over that portion of the FOV.

In some embodiments, the at least one processor may be programmed to activate a first sub-set of laser emitters among the plurality of laser emitters; and scan laser beams generated by the first sub-set of laser emitters over a first plurality of scan lines traversing the field of view of the LIDAR system. As discussed above, in the disclosed LIDAR systems, a plurality of laser beams may be generated by activating only some of the active regions (or emitters) of a laser array (e.g., 950) while leaving the remaining active regions (or emitters) inactive. Thus, in one embodiment, processor 118 may be programmed to activate only some of the active regions (e.g., 956) of, for example, laser array 950 to generate a plurality of light beams. And, as discussed above, processor 118 may be configured to rotate a scanning mirror to direct the generated light beams over a first plurality of scan lines across a FOV.

In some embodiments, the at least one processor may be programmed to de-activate the first sub-set of laser emitters; activate a second sub-set of laser emitters among the plurality of laser emitters; and scan laser beams generated by the second sub-set of laser emitters over a second plurality of scan lines traversing the field of view of the LIDAR system. As explained above, processor 118 may activate or deactivate some or all of the laser emitters in laser array 950. After performing a first scan using laser beams from a first sub-set of laser light emitting active regions of a laser array (e.g., 950), processor 118 may deactivate the first sub-set and instead activate a second sub-set of active regions of the laser array. Further, similar to the first scan, processor 118 may control rotation of a scanning mirror to perform a second scan along a second plurality of scan lines over the FOV. It is contemplated that processor 118 may control rotation of the scanning mirror about the scanning axis without rotating the mirror about the tilt axis, thereby generating a second scan over the same portion of the FOV. As will be described below, however, as an alternative, processor 118 may cause the scanning mirror to rotate about the tilt axis before performing the second scan and/or any subsequent scan.

In some embodiments, none of the second plurality of scan lines may be spatially located between scan lines of the first plurality of scan lines. As illustrated in FIG. 12B, in some embodiments, rotation of scanning unit 720, 860 about the tilt axis may displace each horizontal scan line (e.g., 1221, 1223, 1225, etc.) generated during a first scan by distance AH corresponding to, for example, an angular dimension (e.g., 2.4 degrees) of the laser arrays of, for example, FIGS. 10D-10F. Thus, for example, scan lines 1221, 1223, 1225, etc. may correspond to a first scan pattern. After rotating the scanning mirror by an angle equal to or greater than the angular dimension of the laser array (e.g., ≥2.4 degrees), horizontal scan lines 1231, 1233, 1235, etc., may be generated during a second scan. Because the scanning mirror was rotated by an angle equal to or greater than the angular dimension of the laser array, each of scan lines, for example, 1231, 1233, 1235 may be displaced from horizontal scan lines 1221, 1223, 1225, respectively, by distance AH. Thus, in some embodiments, the at least one processor may cause the scanning unit to displace the plurality of laser beams from the first set of locations associated with the first plurality of scan lines to the second set of locations associated with the second plurality of scan lines by causing the scanning unit to rotate about a tilt axis by a rotational angle greater than or equal to an angular width of the first plurality of scan lines. For example, as explained above, when processor 118 causes the scanning mirror to rotate by an angle equal to or greater than the angular dimension of the laser array (e.g., ≥2.4 degrees), the second scan pattern (including the second set of scan lines) is also displaced by the same rotational angle relative to the first scan pattern (including the first set of scan lines).

Processor 118 may repeat the above identified processes numerous times. Thus, for example, in some embodiments, the at least one processor may be programmed to de-activate the second sub-set of laser emitters; tilt the biaxial scanning mirror by a rotational angle greater than or equal to an angular length of the monolithic laser array; activate the first sub-set of laser emitters; and scan laser beams generated by the first sub-set of laser emitters over a third plurality of scan lines traversing the field of view of the LIDAR system. For example, as explained above, processor 118 may repeat the scanning process by deactivating the second sub-set of active regions of the laser array (e.g., 950) and re-activating the first sub-set of active regions of the laser array to perform a third scan over the FOV. Furthermore, prior to performing the third scan, processor 118 may cause the scanning mirror to rotate about the tilt axis by an angle that may be greater than or equal to the angular length of the laser array. Doing so would ensure that the third plurality of scan lines do not overlap with the second plurality of scan lines. It is contemplated, however, that processor 118 may cause the scanning mirror to rotate about the tilt axis by an angle smaller than the angular length of the laser array. In that case, at least some of the third plurality of scan lines may overlap with at least some of the second plurality of scan lines.

In some embodiments, the at least one processor may cause the scanning unit to displace the plurality of laser beams from the first set of locations associated with the first plurality of scan lines to the second set of locations associated with the second plurality of scan lines by causing the scanning unit to rotate about a tilt axis by a rotational angle less than an angular width of the first plurality of scan lines. For example, processor 118 may cause scanning mirror to be rotated by an angle less than the angular dimension of the laser array (e.g., <2.4 degrees). In this case, each of scan lines, for example, 1231, 1233, 1235 may be displaced from horizontal scan lines 1221, 1223, 1225, respectively, by distance less than AH distance. As a result at least some of the scan lines 1231, 1233, and/or 1235 may be positioned between scan lines 1221, 1223, and/or 1225. Thus, in some embodiments, at least one scan line of the second plurality of scan lines may be spatially located between two scan lines included in the first plurality of scan lines.

In some embodiments, none of the second plurality of scan lines may be spatially located between scan lines of the first plurality of scan lines, and the at least one processor is further programmed to cause the scanning unit to direct the plurality of beams along a third plurality of scan lines traversing the FOV, wherein at least one scan line of the third plurality of scan lines is spatially located between two scan lines included in the second plurality of scan lines. The above described features of rotating the scanning mirror by an angle equal to or greater than the angular dimension of the laser array (e.g., ≥2.4 degrees) or rotating the scanning mirror by an angle less than the angular dimension of the laser array (e.g., <2.4 degrees) may be combined in many different ways. For example, a first scan may be performed and then the scanning mirror may be rotated by an angle equal to or greater than the angular dimension of the laser array (e.g., ≥2.4 degrees) before performing a second scan. As a result, as explained above, none of the scan lines of the second scan may be located between the scan lines of the first scan. Subsequently, the scanning mirror may be rotated by an angle less than the angular dimension of the laser array (e.g., <2.4 degrees) before performing a third scan. As result, as explained above, at least some of the scan lines of the third scan may be spatially located between at least some of the scan lines of the second scan.

In some embodiments, the at least one processor may be further programmed to cause the scanning unit to direct the plurality of beams along a fourth plurality of scan lines traversing the FOV, wherein at least one scan line of the fourth plurality of scan lines is spatially located between two scan lines included in the second plurality of scan lines and also between two scan lines included in the third plurality of scan lines. The above described process of rotating the scanning mirror by different angles may be repeated. For example, after performing the third scan, the scanning mirror may be rotated by an angle less than an angular spacing between active laser emitting regions of the laser array (e.g., less than 0.2 degrees for the laser array of FIG. 10E or less than 0.4 degrees for the laser array of FIG. 10F) before performing a fourth scan. By rotating the scanning mirror by a small angle, the scan lines of the fourth scan may be displaced by less than the distance between adjacent scan lines. As a result, scan lines in the fourth scan may overlap with scan lines associated with the second and third scan pattern. That is at least some scan lines in the fourth pattern may lie between scan lines of the second pattern and at least some other scan lines in the fourth pattern may lie between the scan lines of the third pattern.

In some cases, the vertical rotation of the scanning mirror may be controlled to provide a variable resolution scan. For example, in the scan shown in FIG. 12B, for regions 1280 and 1282 near the top and bottom of the scan, respectively, the scanning mirror may be rotated about its vertical tilt axis by an angular increment at least as large as the angular dimension of the laser array. However, in region 1284 including the horizon (e.g., between +/−5 degrees), the scanning mirror may be rotated about its vertical tilt axis by an angular increment less than the angular dimension of the laser array.

In the scan example of FIG. 12B, an array of 16 laser sources may be used and operated in a 1:2 active source to inactive area ratio as represented in FIG. 15. In the example of FIG. 12B, there may be 16 laser beams, each emitted by a group of two adjacent laser sources. Each beam may have a vertical angular dimension of 0.05 degrees, such that each of the 16 laser beams may be emitted from a two-laser beam group having a total vertical dimension of 0.1 degrees. Active laser groups may be spaced apart by inactive space having a total vertical angular dimension of 0.2 degrees. This may provide a 1:2 ratio of active to non-active space in the array. Thus, the horizontal spacing of lines scanned by the 16-source laser array may be 0.3 degrees. The total vertical angular dimension of the laser array (16 sources having a 0.1 degrees angular dimension separated by 15 interstitial inactive spaces each with a 0.2 degrees angular dimension) may be about 4.6 degrees.

Figure 16:
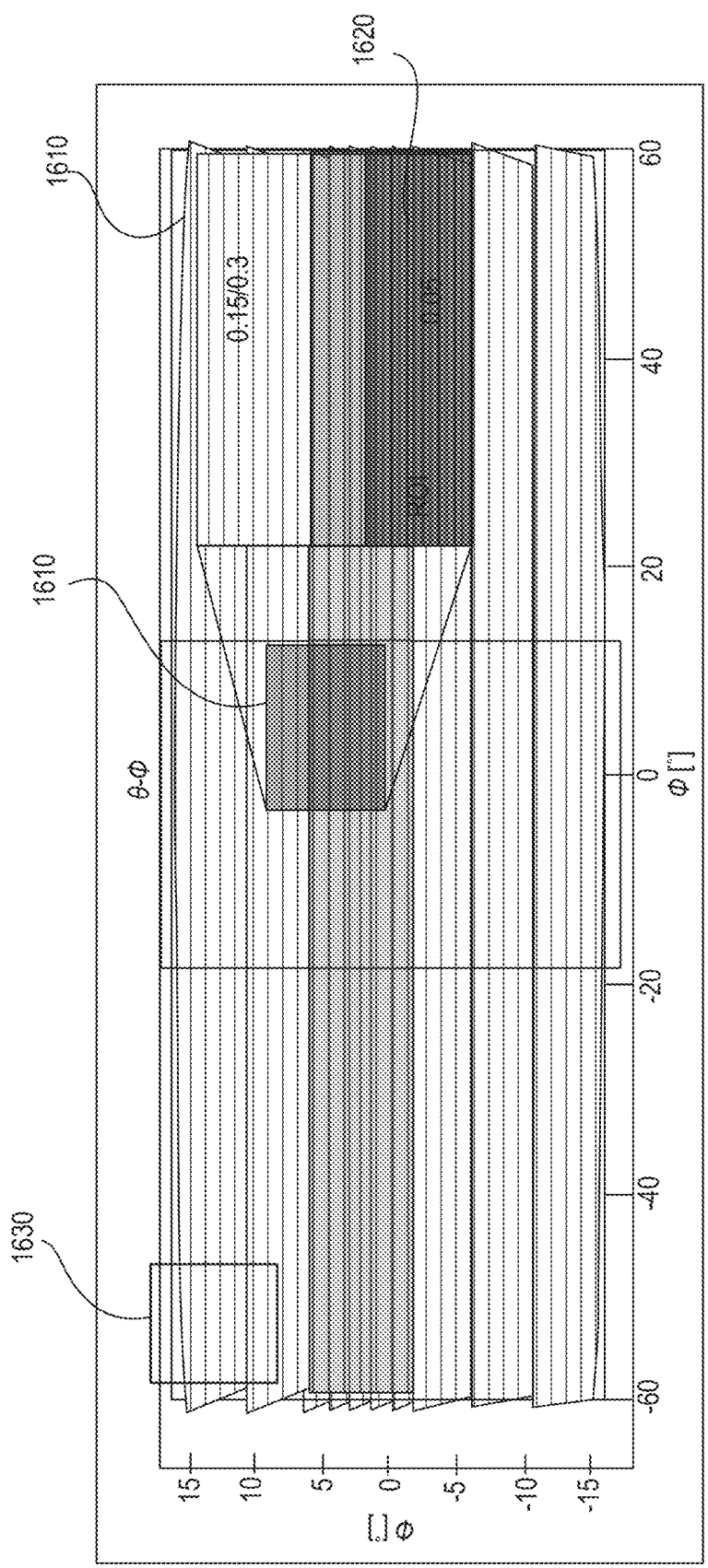
FIG. 16 is a diagram illustrating an exemplary scan pattern obtained using an exemplary LIDAR system consistent with some embodiments of the present disclosure.

FIG. 16 illustrates an exemplary scan pattern that may be obtained using the disclosed LIDAR system 100. As shown in FIG. 16, region 1610 between about −6 degrees to about +6 degrees (which may include the horizon) and may correspond to a region of higher interest where a higher resolution may be desired. This higher resolution may be accomplished, for example, by incrementing the tilt of the scanning mirror about its vertical scanning axis by an amount less than the total angular dimension of the laser array. For example, in the region between about −6 degrees to about +6 degrees, six horizontal scans may be performed. Spacing the horizontal scans of the laser array more closely together may provide a higher resolution in the vertical direction (e.g., 0.1 degrees in the region 1620). Increasing the laser pulse frequency in these regions may increase the resolution in the horizontal direction as well (e.g., 0.1 degrees in region 1620).

The resolution may be increased even further. For example, by generating each of the 16 laser beams from just one of the two laser sources, each of the generated beams may be emitted from a source having a vertical angular dimension of 0.5 degrees. By overlapping subsequent horizontal scans, and further adjusting the laser pulse frequency, a resolution of 0.05 degrees×0.05 degrees (for example) may be provided. Such a technique may be used, for example, to scan certain regions of interest (ROIs), for example, region 1630. Such ROIs may be predetermined within an FOV or may be identified based on a triggering event, such as a detection of a particular object or object type, a partial object detection, detection of an object within a certain distance range, detection of overlapping objects, etc.

Another example of a scan including enhanced resolution in regions including the horizon and/or in regions of interest is represented by region 1610. In these regions, the distance between each scan line (or vertical angular displacement) is smaller than the total length of the multiple beam spots in the laser array. In this way, some of the area scanned "overlaps" with the previous scan line, such that more pixels may be sampled in the overlapping portion.

The higher resolution may be obtained by using multi-beam scanning and controlling the vertical offset of the scan such that there is overlap between some of the regions that were previously scanned, and the subsequent scan. For example, an exploded view of region 1610 in the FOV is illustrated in FIG. 16. It can be seen that the resolution between 5-15 degrees is 0.15×0.3, whereas in the center of the ROI region, the resolution increases to 0.05×0.05. In between these regions, there may be a transition resolution that is between the lower resolution and the higher resolution.

Several examples of overlapping scanning using multiple beam configurations are illustrated in FIGS. 17A, 17B, and 17C (e.g., using 16, 8, or 4 beams). For example, FIG. 17A, illustrates scans with 16 beams, where scans 1702-1708 are scans each with a rotation of the scanning mirror about the tilt axis by about ⅓ of the angular length of the laser array. The resulting combined scan is represented by 1722. As can be seen from the combined scan 1722, the resolution gradually increases towards the center of the scan. Similarly, FIG. 17B, illustrates scans with 8 beams, where scans 1732-1739 are scans each with a rotation of the scanning mirror about the tilt axis by about ⅓ of the angular length of the laser array. The resulting combined scan is represented by 1740. FIG. 17C, similarly illustrates scans with 4 beams, where scans 1752-1758 are scans each with a rotation of the scanning mirror about the tilt axis by about ⅓ of the angular length of the laser array. In these examples, because the distance between scan lines (i.e., corresponding to the angular displacement of the scanning mirror about its vertical scanning axis) is equal to ⅓ of the angular length of the laser array, the resolution may be increased to 3× that of the multibeam resolution. In other words, in an example including a 1:2 active to passive space ratio laser array, shifting the light from the laser array vertically by ⅓ the angular length of the array on subsequent horizontal scans enables scanning of regions (e.g., 1724, 1742, 1762, etc.) overlapped only by passive areas of the laser array during prior scans.

Figure 17D:
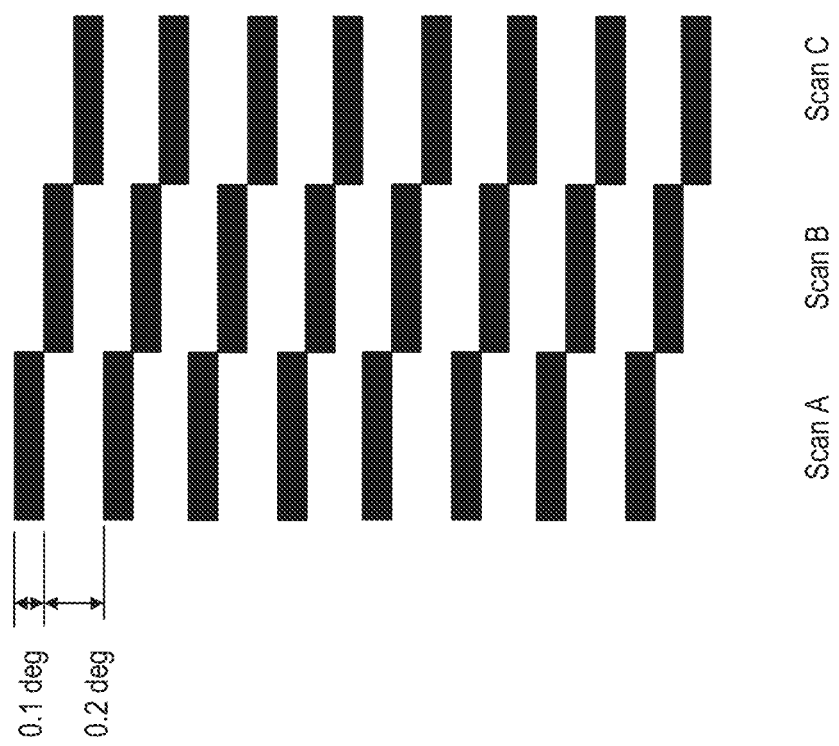
FIG. 17D is a diagram illustrating a close-up view of a portion of FIG. 17A consistent with some embodiments of the present disclosure.

In some embodiments, the at least one processor may cause the scanning unit to displace the plurality of laser beams from the first set of locations associated with the first plurality of scan lines to the second set of locations associated with the second plurality of scan lines by causing the scanning unit to rotate about a tilt axis by a rotational angle less than an angular spacing between one or more adjacent pairs of scan lines of the first plurality of scan lines. FIG. 17D illustrates a close-up view of a portion of FIG. 17A to further illustrate the increased resolution achievable through overlapping scans of a multi-beam light source. As illustrated in FIG. 17D, during Scan A, horizontal lines of the LIDAR FOV will be scanned at a vertical resolution of 0.3 degrees (the spacing between active laser sources in the array)(only six channels are shown from among the 16-channel example). During a subsequent horizontal scan, Scan B, processor 118 may cause the scanning mirror to be angularly displaced only ⅓ of the vertical angular resolution of 0.3 degrees. As a result, Scan B partially overlaps with Scan A. As illustrated in FIG. 17D, this overlap in scans results in ½ of the inactive region of Scan A being scanned during Scan B. Similarly, in a subsequent Scan C where the mirror is again tilted only by ⅓ of the vertical angular resolution of 0.3 degrees, the other half of the inactive region of Scan A is covered by Scan C. As a result, the vertical resolution achievable in this overlapping region may be increased from 0.3 degrees, using Scan A alone, to 0.1 degree using the overlap of Scans A, B, and C.

In some embodiments, the overlapping scans may be performed in two steps. In the first step, a subsequent scan may be performed after the scanning mirror is rotated about the tilt axis by an angle corresponding to an angular width of a collimated beam emitted by an active region of the laser array. This process may be continued for n times, where n=(angular spacing between adjacent collimated beams/angle by which scanning mirror is rotated). After the n scans have been completed, in the second step, an additional scan may be performed after rotating the scanning mirror about the tilt axis by an angle corresponding to the angular spacing between the adjacent collimated beams. For example, consider a situation where the ratio of active regions to inactive regions of the laser array is 1:2, an angular size of each collimated beam is about 0.1° and an angular width between adjacent collimated beams is about 0.2°. In this case, in the first step, three scans may be performed by rotating the scanning mirror about the tilt axis after each scan by about 0.1°. In the second step, a fourth scan may be performed after rotating the scanning mirror by about the angle of the total angular width of a plurality of laser beams emitted by the laser array (e.g. for 16 beams with a ratio of active regions to inactive regions of 1:2, the total angular width of a plurality of laser beams emitted by the laser array is about 4.6°-5°). The angular displacements in this case about the tilt axis will be 0.1°, 0.1°, 4.6°, 0.1°, 0.1°, 4.6°, etc. This multi-step scanning scheme may provide a generally uniform sampling resolution over the entire FOV.

In some embodiments, the at least one processor causes the scanning unit to displace the plurality of laser beams from the first set of locations associated with the first plurality of scan lines to the second set of locations associated with the second plurality of scan lines by causing the scanning unit to rotate about a tilt axis by a rotational angle of between one-quarter to one-half of an angular width of beams produced by the monolithic laser array. Although a tilt angle of ⅓ of the vertical angular resolution of 0.3 degrees has been discussed above, it is contemplated that scanning mirror may be rotated by any amount. For example, in some embodiments, processor 118 may cause the scanning mirror to rotate by ¼ to ½ of the vertical angular resolution or angular width of the beams produced by the laser array.

In some embodiments, the at least one processor may cause the scanning unit to displace the plurality of laser beams from the first set of locations associated with the first plurality of scan lines to the second set of locations associated with the second plurality of scan lines by causing the scanning unit to rotate about a tilt axis by a rotational angle between 0.05 degrees and 5 degrees. Returning to the example of FIG. 15, assuming an active region width of 0.1 degrees, with an active region spacing of 0.2 degrees, rotation about the tilt axis by ⅓ of the angular width of the laser array would mean rotation by about 16×0.1=1.6 degrees. If on the other hand the number of active regions was 32, the amount of rotation would be 3.2 degrees. Thus, the amount of rotation corresponding to a ⅓ shift may depend on the size of the laser array. It is contemplated that the amount of rotation of the scanning mirror about the tilt axis may range between about 0.05 degrees to 5 degrees, although the tilt axis range may vary. For example, in some embodiments, the at least one processor may cause the scanning unit to displace the plurality of laser beams from the first set of locations associated with the first plurality of scan lines to the second set of locations associated with the second plurality of scan lines by causing the scanning unit to rotate about a tilt axis by a rotational angle between 0.05 degrees and 0.5 degrees.

Using the foregoing technique, a resolution compared to laser pitch may be obtained. In cases where the laser spot is split using the receiver, then a vertical resolution of about half of the angular size of the laser spot (e.g., 0.05 degrees) may be achieved. Numerous other configurations may be obtained by adjusting the rotation about the tilt axis. For example, in some cases, one or more overlapping scans may be performed relative to selected ROIs to provide higher resolutions in those regions. The one or more subsequent overlapping scans, however, need not include horizontal scans of the entire LIDAR FOV. Rather, the subsequent scans may be focused on any of one or more sub-regions of the LIDAR FOV having a width less than or equal to the entire FOV.

Figure 18A:
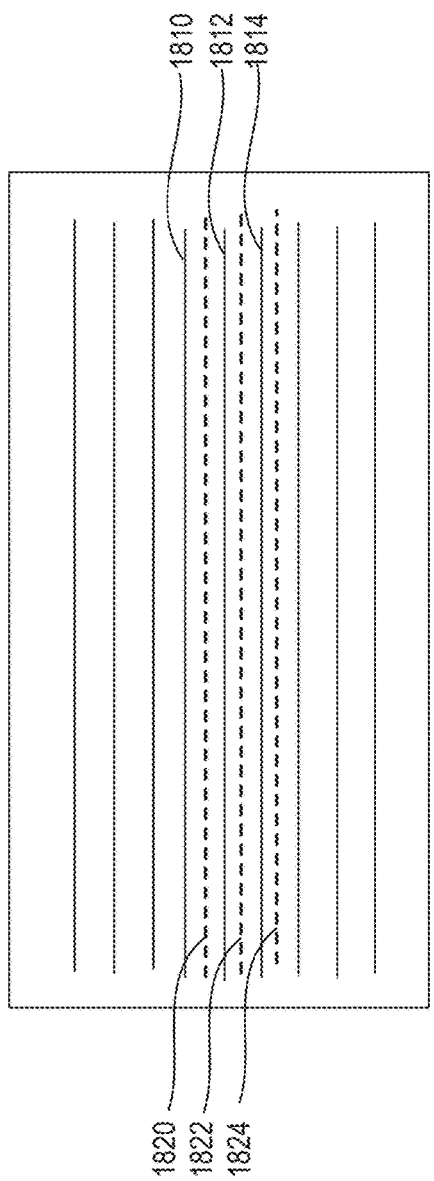
FIGS. 18A and 18B are diagrams illustrating examples of multi-step scans focused on sub-regions of the LIDAR field of view consistent with some embodiments of the present disclosure.
Figure 18B:
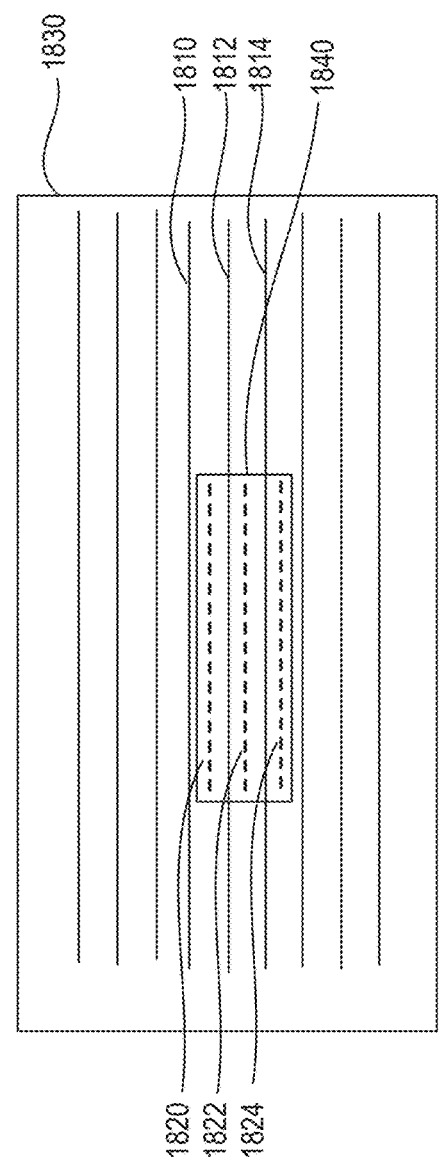

Further examples of multi-step scans focused on sub-regions of the LIDAR FOV are illustrated in FIGS. 18A and 18B. Multi-step scans entail scanning a first region in a consecutive manner during a first time period, and subsequently scanning a second region (e.g., a subregion of the of the LIDAR FOV) during a second time period. For example, as illustrated in FIG. 18A, a first scan (represented by scan lines 1810, 1812, 1814, etc.) may be performed during a first time period and a second scan (represented by scan lines 1820, 1822, 1824, etc.) may be performed during a second time period. As also illustrated in FIG. 18B, the second scan may be performed over a second region 1840 that may be smaller than first region 1830. In some cases, the sub-region of interest may extend across the entire FOV, and in other cases, the sub-region of interest may have a width less than the FOV.

Figure 19:
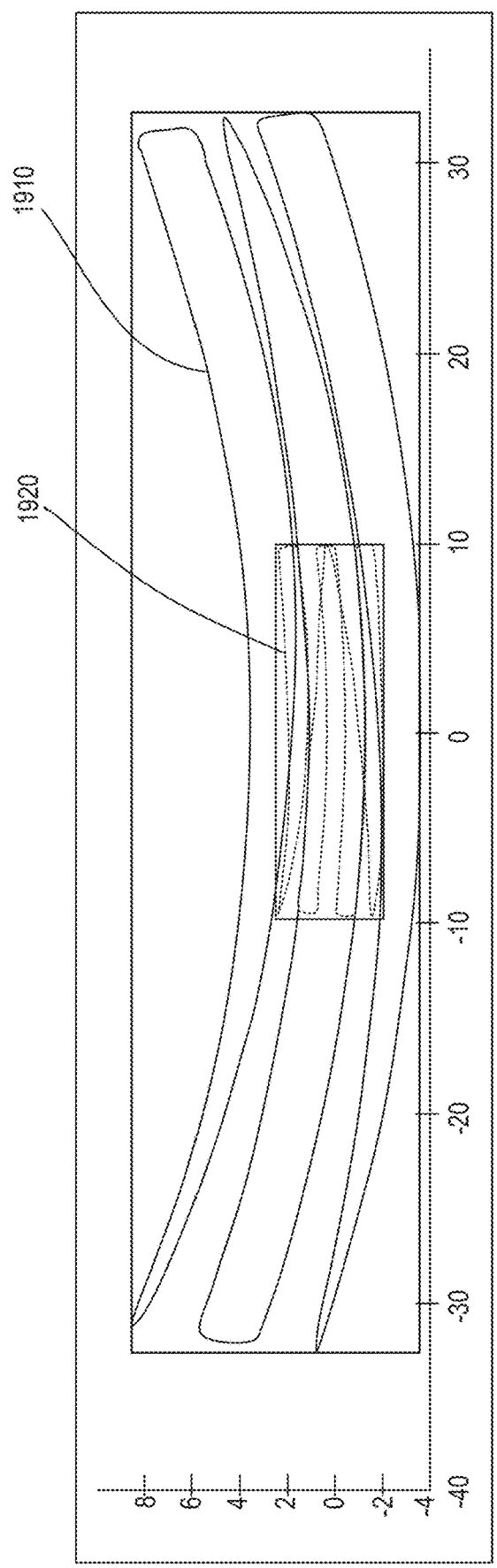
FIG. 19 is a diagram illustrating another example of multi-step scans focused on sub-regions of the LIDAR field of view consistent with some embodiments of the present disclosure.

FIG. 19 illustrates multi-step scans including a scan 1910 of the entire FOV with low resolution, and subsequently scanning a subsection 1920 of the FOV with high resolution (e.g., at a slower rate and higher pulse rate). The subsection may either be of the full horizontal range (this solution may be implemented for a resonant horizontal scan), or for a subsection of the HFOV and VFOV. The multi-step scans including a subsequent scan of a subregion with the full range of the FOV in at least one axis (e.g., horizontal) may advantageously be implemented with a scanner scanning at a resonant oscillation in the horizontal direction. Multi-step scans including a subsequent scan of a subsection of the horizontal range and the vertical range may be accomplished with quasi-static control of the scanning rate in both directions, or by tuning the resonance of the scanner.

In some embodiments, the at least one processor may be further programmed to cause the scanning unit to scan a first region of the field of view of the LIDAR system by directing the plurality of beams along a first plurality of scan line sets and to scan a second region of the field of view by directing the plurality of beams along a second plurality of scan line sets, wherein none of the first plurality of scan line sets overlap with one another and wherein at least some of the second plurality of scan line sets overlap with one another. As discussed above, processor 118, for example, may be configured to rotate a scanning mirror (e.g., scanning unit 720, 860) about a tilt axis by an angle greater than or equal to an angular width of the laser array. Doing so may produce a first plurality of scan line sets, none of which overlap with each other. Processor 118 may obtain the first plurality of scan line sets while scanning a first region of the FOV. As also discussed above, processor 118 may be configured to rotate a scanning mirror (e.g., scanning unit 720, 860) about a tilt axis by an angle smaller than the angular width of the laser array while scanning a second region of interest of the FOV. Doing so may produce a second plurality of scan line sets, at least some of which may overlap with each other and may also overlap with some of the first plurality of scan line sets. For example, as illustrated in FIG. 19, scan line set 1910 may constitute one of the sets in the first plurality of scan line sets, whereas scan line set 1920 may constitute one of the sets in the second plurality of scan line sets.

In some embodiments, the at least one processor may be further programmed to cause the scanning unit to scan a first region of the field of view of the LIDAR system by directing the plurality of beams along a first plurality of scan line sets and to scan a second region of the field of view by directing the plurality of beams along a second plurality of scan line sets, wherein a degree of overlap among the first plurality of scan line sets is less than a degree of overlap among the second plurality of scan line sets. Instead of obtaining a first plurality of non-overlapping scan line sets, in some embodiments, processor 118 may be configured to obtain the first plurality of scan line sets by also rotating the scanning mirror by an angle smaller than the angular width of the laser array while scanning the first region of the FOV. However, processor 118 may rotate the scanning mirror while obtaining the first plurality of scan line sets by an angle larger than an angle by which the scanning mirror is rotated while obtaining the second plurality of scan line sets. Doing so may allow greater resolution of the first region of the FOV while also providing an even greater resolution in the second region of the FOV.

In some embodiments, the second region of the field of view may be a region of interest. As discussed above, there may be substantially more overlap between the scan line sets in the second region of the FOV. The substantial overlap may help improve the resolution in the second region of interest that may include a specific portion of the FOV that may be of interest. In some embodiments, the region of interest may include a horizon. In some embodiments, the region of interest may include a detected object. For example, the specific portion of the FOV may be of interest because the LIDAR system may have detected the presence of an object. In some embodiments, the object may be a pedestrian. In some embodiments, the object may be a vehicle. For example, in LIDAR systems implemented on a vehicle (e.g., autonomous vehicle) it may be desirable to determine whether a detected object in a field of view is, for example, a pedestrian or another vehicle to enable the autonomous vehicle to potentially take evasive action to minimize a likelihood of collision with the detected object.

In some embodiments, the at least one processor may be programmed to identify the region of interest based on a type of an object detected in the second region of the field of view. For example, processor 118 may obtain a first plurality of scan line sets corresponding to a first region of the FOV. Processor 118 may determine the presence of an object in a second region of the FOV, which may be included in the scanned first region of the FOV. based on the first plurality of scan line sets. Processor 118 may also determine a type of the detected object (e.g., pedestrian, vehicle, stationary object, moving object, etc.) Based on the determination of the type of object in the second region, processor 118 may identify the second region as a region of interest. For example, in vehicle-based LIDAR system implementations, when processor 118 determines that the object in the second region is a stationary object, processor 118 may identify the second region as a region of interest. In some embodiments, the object may be detected based on reflections signals received from a previous full frame scan of the field of view. In some embodiments, the object may be detected based on reflections signals received from one or more previous scan lines associated with a current frame scan of the field of view. It is contemplated that the object in the second region of the FOV may be detected based on scan line sets obtained during a previous scan of a large portion of the FOV. Additionally or alternatively, the object in the second region of the FOV may be detected based on scan line sets obtained from a current scan of the FOV.

In some embodiments, the at least one processor is further programmed to cause the scanning unit to scan a portion of the field of view of the LIDAR system to provide a partial frame scan of the field of view, wherein the scan of the portion of the field of view is performed using a plurality of overlapping scan line sets. As discussed above, processor 118 may cause the scanning mirror (e.g., scanning unit 720 or 860) to scan either the entire FOV or only a portion of the FOV. Thus, in some embodiments, processor 118 may control the scanning mirror to obtain a scan of a portion of the FOV (e.g., partial frame scan). While obtaining the partial frame scan, processor 118 may be configured to cause scanning mirror to rotate about the tilt axis by an angle (e.g., less than an angular width of a laser array) such that the scan line sets obtained during the scan overlap. In some embodiments, the portion of the field of view may be a region of interest identified based on an object detected in the portion of the field of view. In some embodiments, the object may be a pedestrian or a vehicle. In some embodiments, the object may be a moving object. As discussed above, processor 118 may identify a region of interest based on an object determined based on the scan line sets. It is contemplated that processor 118 may be programmed to detect an object using the scan line sets obtained over a portion of the FOV. As also discussed above, processor 118 may be programmed to identify the object as a pedestrian, a vehicle, a stationary or moving object, etc. It is also contemplated that in some embodiments, instead of using the scan line sets obtained by scanning a portion of the FOV, the object may be detected based on reflection signals received from a previous full frame scan of the field of view. Thus, for example, processor 118 may detect the object using scan line sets obtained by scanning the FOV during a previous time period.

In some embodiments, the laser emission unit is a monolithic laser array including a plurality of laser emitters. In some embodiments, the monolithic laser array is a one-dimensional array. In some embodiments, the LIDAR system may include a plurality of laser emitters configured to generate a plurality of laser beams. In some embodiments, the monolithic laser array may include a plurality of active regions corresponding to the plurality of laser emitters and a plurality of inactive regions, wherein the plurality of laser emitters are spaced apart from one another by one or more of the plurality of inactive regions. In some embodiments, the monolithic laser array includes between 4 and 64 laser emitters. In some embodiments, a length of the monolithic laser array is between 0.5 mm and 20 mm. As discussed above, with respect to FIGS. 9A, 9B, emission unit 102 of LIDAR system 100 may include a laser array (e.g., 900, 950) that may include a plurality of active laser light emitting regions separated by inactive non-laser light emitting regions. As also discussed above, the number of active regions in laser light array 900, 950 may range from 1 to any desired number. For example, laser array 900 or 950 may include 4, 8, 32, 64, etc., active regions, or any other desired number of active regions. As also discussed above, a length of laser array 900 or 950 may range between 0.5 mm and 20 mm. It is to be understood that the features of one or more laser arrays discussed above also apply to any of the laser arrays used in the disclosed LIDAR system.

Figure 20:
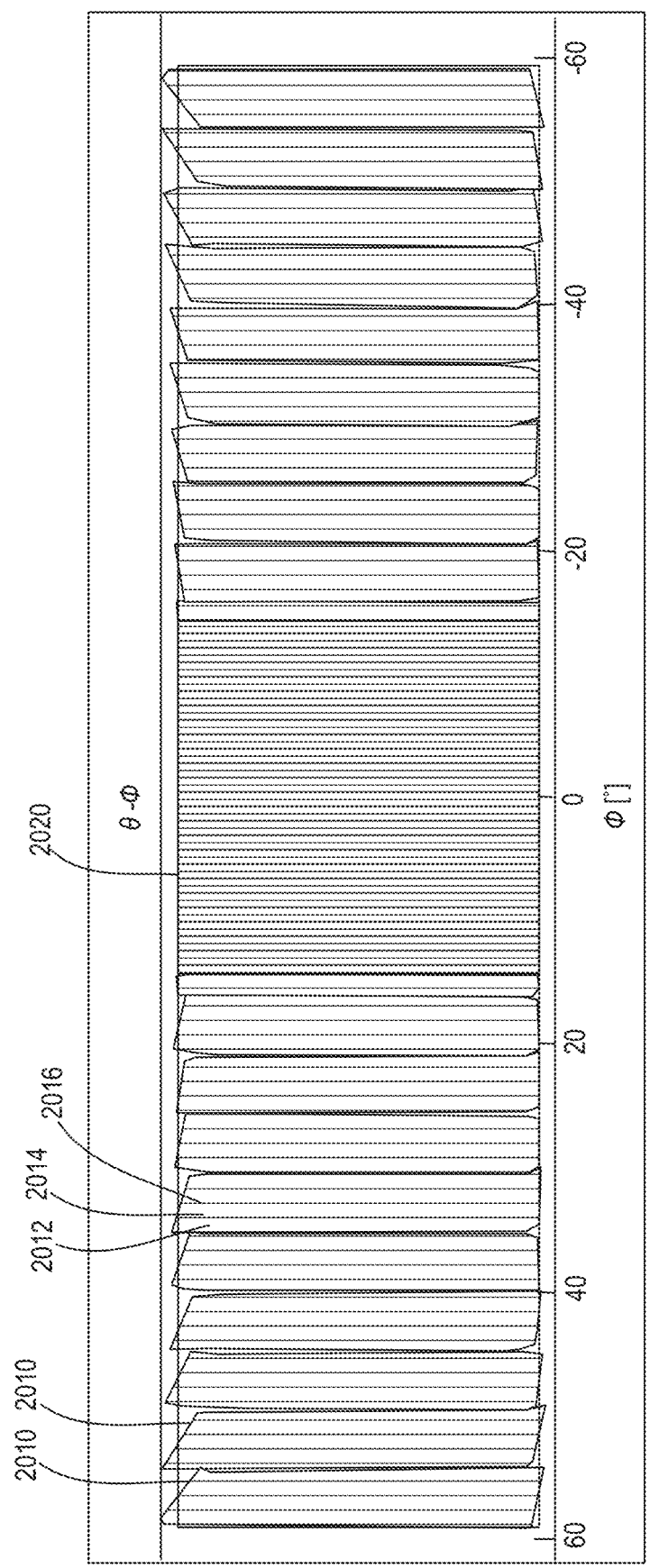
FIG. 20 is a diagram illustrating an exemplary scan pattern obtained using an exemplary LIDAR system consistent with some embodiments of the present disclosure.

In some embodiments, the first plurality of scan lines and the second plurality of scan lines may be vertically oriented relative to the field of view of the LIDAR system. Although the above description discloses a vertical comb pattern scanned horizontally over the FOV, some embodiments may employ a horizontally oriented light source array in which a horizontally oriented 1-D array of transmitted laser light spots are scanned vertically over the FOV. All of the principles, configurations, and embodiments discussed above also apply to vertical scanning systems, in which the scanning mirror is incremented angularly about its horizontal scanning axis after each vertical scan of the LIDAR FOV accomplished by rotating the scanning mirror about its vertical scanning axis. Such a technique may provide, for example, scan patterns as represented by FIG. 20. FIG. 20 illustrates an exemplary scan pattern including a plurality of scan line sets 2010 corresponding to a plurality of laser beams being scanned in an up-down direction followed by rotation of the scanning mirror in the left-right direction. Each scan line set may include vertical scan lines 2012, 2014, 2016, etc. As also illustrated in FIG. 20, region 2020 may include scan lines that may be closer together and that may have been obtained by rotating the scanning mirror in a left-right direction by an angle less than an angular width of the laser array (e.g., 900, 950, etc.) It is contemplated that, in such systems, the laser array (900, 950, etc., of FIGS. 9A and 9B) may be oriented horizontally along the left-right direction instead of in the up-down direction.

Figure 21:
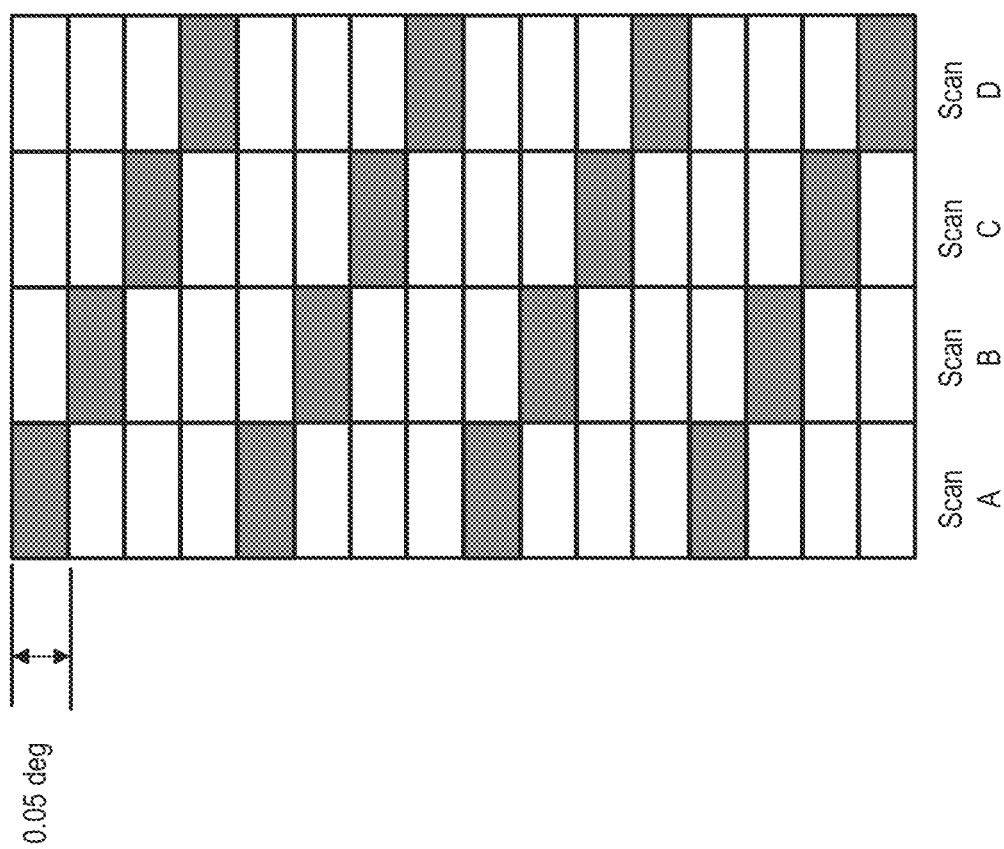
FIG. 21 is a diagram illustrating movement of laser beams emitted by a laser array during four sequential scans of a LIDAR field of view.

As described above, in some cases, a laser array may include a fixed number of laser channels each spaced apart by inactive, non-light emitting material. In such cases, higher resolutions may be achieved in certain ROIs along the vertical (or horizontal) direction using the partially overlapping technique described above. In other cases, as illustrated in FIG. 21, the laser array may include an array of closely spaced lasers that can be operated according to various illumination timing schemes. Such electronic control may enable variable and selectable ratios of active to non-active space along the laser array and may enable high-resolution scanning through electronic control of the laser source illumination. For example, FIG. 21 represents a laser array comprising 16 closely spaced laser sources each having a vertical angular dimension of 0.05 degrees. During a first scan (Scan A) of a region of interest (for example) in an FOV, every fourth laser source is activated such that there is an inactive space between laser sources of 0.15 degrees, and each active source is spaced apart by 0.2 degrees. During Scan A, lasers 1, 5, 9, and 13 are active. This example results in an active to inactive space ratio of 1:3.

During a subsequent scan B, rather than angularly displacing the scanning mirror to a new vertical orientation to perform the next set of horizontal scan lines, the mirror may remain at the same vertical orientation that was used for scan A (whether that is a fixed orientation or a certain predetermined rotational path to correct for keystone effects). And instead of rotating the mirror vertically to scan lines previously included in the inactive space associated with the array during Scan A, a different set of lasers may be illuminated during horizontal Scan B. In the example shown, lasers 2, 6, 10, and 14 are illuminated. Similarly, in Scan C, the mirror can again remain in the same vertical orientation as used during Scans A and B. In Scan C, lasers 3, 7, 11, and 15 may be activated. And in Scan D, lasers 4, 8, 12, and 16 may be activated. In this way, four sequential, horizontal scans may be made of a region of a FOV without changing the vertical scan orientation/pattern. In this region, however, the effective resolution achieved is greater than the resolution available from any one of Scans A, B, C, or D. Where Scan A may offer a vertical resolution of 0.2 degrees, the potential vertical resolution achievable with the aggregate of Scans A, B, C, and D is 0.05 degrees.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system, comprising:
   a laser emission unit configured to generate a plurality of laser beams;
   a scanning unit configured to direct the plurality of laser beams toward a field of view of the LIDAR system, the field of view extending in a first direction from a minimum extent to a maximum extent, the plurality of laser beams being spaced apart from each other in a second direction transverse to the first direction; and
   at least one processor programmed to cause the scanning unit to:
      direct each of the plurality of laser beams from the minimum extent to the maximum extent in the first direction along a plurality of parallel first scan lines, the plurality of parallel first scan lines grouped into a first portion and a second portion, each of the first portion and the second portion including more than one of the plurality of parallel first scan lines;
      displace the plurality of laser beams from a plurality of first locations associated with the plurality of parallel first scan lines to a plurality of second locations associated with a plurality of parallel second scan lines, such that
         none of the plurality of parallel second scan lines is spatially located in the first portion of the plurality of parallel first scan lines, and
         at least one of the plurality of parallel second scan lines is spatially located in the second portion of the plurality of parallel first scan lines;
         at least one of the plurality of parallel second scan lines is spatially located in the second portion between two of the plurality of parallel first scan lines; and
      direct each of the plurality of laser beams from the minimum extent to the maximum extent of the field of view in the first direction along the plurality of parallel second scan lines, thereby enabling increased resolution for the second portion.

2. The LIDAR system of claim 1,
   wherein the plurality of parallel second scan lines are grouped into a third portion and a fourth portion, each of the third portion and the fourth portion including more than one of the plurality of parallel second scan lines, and
   wherein the at least one processor is further programmed to:
      displace the plurality of laser beams from the plurality of second locations associated with the plurality of parallel second scan lines to a plurality of third locations associated with a plurality of parallel third scan lines, such that
         none of the plurality of parallel third scan lines is spatially located in the third portion of the plurality of parallel second scan lines, and
         at least one of the plurality of parallel third scan lines is spatially located in the fourth portion of the plurality of parallel second scan lines; and direct each of the plurality of laser beams from the minimum extent to the maximum extent of the field of view in the first direction along the plurality of parallel third scan lines.

3. The LIDAR system of claim 2, wherein the at least one of the plurality of parallel third scan lines is spatially located in the second portion of the plurality of parallel first scan lines.

4. The LIDAR system of claim 2, wherein none of the plurality of the parallel third scan lines is located in the second portion of the plurality of parallel first scan lines.

5. The LIDAR system of claim 1, wherein the first portion includes at least half of the plurality of parallel first scan lines.

6. The LIDAR system of claim 1, wherein the at least one processor is further programmed to displace the plurality of laser beams from the plurality of first locations to the plurality of second locations by causing the scanning unit to rotate about a tilt axis by a rotational angle greater than or equal to an angular width of at least one scan line of the plurality of parallel first scan lines.

7. The LIDAR system of claim 6, wherein
the angular width of each scan line in the plurality of parallel first scan lines is 0.1 degree and an angular spacing between adjacent scan lines in the plurality of parallel first scan lines is 0.2 degrees, and
the rotational angle is 0.4 degrees.

8. The LIDAR system of claim 1, wherein the laser emission unit is a monolithic laser array including a plurality of laser emitters.

9. The LIDAR system of claim 8, wherein the monolithic laser array is a one-dimensional array.

10. The LIDAR system of claim 8, wherein the monolithic laser array includes a plurality of active regions corresponding to the plurality of laser emitters and a plurality of inactive regions, wherein the plurality of laser emitters are spaced apart from one another by one or more of the plurality of inactive regions.

11. The LIDAR system of claim 1, wherein the at least one processor is further programmed to cause the scanning unit to displace the plurality of laser beams from the plurality of first locations to the plurality of second locations by causing the scanning unit to rotate about a tilt axis by a rotational angle between 0.05 degrees and 5 degrees.

12. The LIDAR system of claim 1, wherein the scanning unit is configured to rotate in two axes, including a tilt axis and a scanning axis.

13. The LIDAR system of claim 12, wherein the at least one processor is further programmed to cause the scanning unit to direct each of the plurality of laser beams from the minimum extent to the maximum extent in the first direction by rotating the scanning unit about the scanning axis.

14. The LIDAR system of claim 1, wherein the scanning unit includes a first single axis scanning mirror and a second single axis scanning mirror, and wherein the plurality of laser beams are made incident upon the first single axis scanning mirror and subsequently made incident on the second single axis scanning mirror.

15. The LIDAR system of claim 1, wherein the plurality of laser beams are directed from the scanning unit towards the field of view with an angular spacing between adjacent beams of at least 2.5 mrad to 6 mrad.

16. The LIDAR system of claim 1, wherein the field of view of the LIDAR system has a vertical angular dimension of between 6 degrees and 90 degrees, and wherein the field of view of the LIDAR system has a horizontal angular dimension of between 20 degrees and 140 degrees.

17. The LIDAR system of claim 1, wherein scanning of the field of view of the LIDAR system by the scanning unit occurs at a frame rate of between 5 Hz and 40 Hz.

18. The LIDAR system of claim 1, wherein the laser emission unit includes a single, monolithic laser array including a plurality of active regions corresponding to a plurality of laser emitters and a plurality of inactive regions, wherein the plurality of active regions are spaced apart from one another by one or more of the plurality of inactive regions.

19. The LIDAR system of claim 18, wherein a ratio of active regions to inactive regions in the monolithic laser array is within a range of 1:1 to 1:10.

20. The LIDAR system of claim 1, wherein the LIDAR system further includes a detector configured to emit electrical signals in response to reflected beams received from the field of view of the LIDAR system.

21. The LIDAR system of claim 20, wherein the detector comprises a single, monolithic array of light sensitive active regions separated from one another by one or more inactive regions.

22. The LIDAR system of claim 21, wherein a ratio of light sensitive active regions to inactive regions in the detector is in between 1:1 and 1:10.

23. The LIDAR system of claim 1, wherein the first portion of the plurality of parallel first scan lines is associated with a first region of the field of view farther from a horizon than a second region of the field of view associated with the second portion of the plurality of parallel first scan lines.

24. The LIDAR system of claim 1, wherein the first portion of the plurality of parallel first scan lines includes a first sub-portion and a second sub-portion, and wherein the second portion is located between the first sub-portion and a second sub-portion.

25. The LIDAR system of claim 1, wherein a resolution obtained for the second portion is higher than a resolution obtained for the first portion.

* * * * *